US011107106B2

United States Patent
Meier

(10) Patent No.: US 11,107,106 B2
(45) Date of Patent: Aug. 31, 2021

(54) BOT RESISTANT NETWORK SERVICE COMMUNICATIONS TO SOCIAL NETWORK SITES

(71) Applicant: Assurant, Inc., Atlanta, GA (US)

(72) Inventor: Keith Meier, Acworth, GA (US)

(73) Assignee: Assurant, Inc., Atlanta, GA (US)

( * ) Notice: Subject to any disclaimer, the term of this patent is extended or adjusted under 35 U.S.C. 154(b) by 253 days.

(21) Appl. No.: 16/444,588

(22) Filed: Jun. 18, 2019

(65) Prior Publication Data

US 2019/0370840 A1 Dec. 5, 2019

Related U.S. Application Data

(62) Division of application No. 14/959,683, filed on Dec. 4, 2015, now abandoned.

(60) Provisional application No. 62/089,429, filed on Dec. 9, 2014.

(51) Int. Cl.
*G06Q 30/00* (2012.01)
*G06Q 30/02* (2012.01)
*G06Q 50/00* (2012.01)

(52) U.S. Cl.
CPC ..... *G06Q 30/0214* (2013.01); *G06Q 30/0242* (2013.01); *G06Q 50/01* (2013.01)

(58) Field of Classification Search
None
See application file for complete search history.

(56) References Cited

U.S. PATENT DOCUMENTS

| 8,904,506 B1* | 12/2014 | Canavor | G06F 16/00 |
| | | | 726/7 |
| 9,449,050 B1* | 9/2016 | Molina | G06F 16/24578 |
| 2007/0282850 A1 | 12/2007 | Sachnoff | |
| 2008/0306830 A1* | 12/2008 | Lasa | G06Q 30/02 |
| | | | 705/14.16 |
| 2013/0007151 A1* | 1/2013 | Chen | H04L 63/1416 |
| | | | 709/206 |
| 2013/0036342 A1* | 2/2013 | Deo | G06F 21/31 |
| | | | 715/202 |

(Continued)

FOREIGN PATENT DOCUMENTS

WO 2016094293 6/2016

OTHER PUBLICATIONS

Varvello, Matteo, and Geoffrey M. Voelker. "Second life: a social network of humans and bots." Proceedings of the 20th international workshop on network and operating systems support for digital audio and video. 2010. (Year: 2010).*

(Continued)

*Primary Examiner* — Michael Bekerman
(74) *Attorney, Agent, or Firm* — Schwegman Lundberg & Woessner, P.A.

(57) ABSTRACT

Systems and methods for subscription-based product referrals are provided. In example embodiments, a user request to refer a subscription is received. A user selection of a social network connection having a social network relationship with the user on a social network service is received. A referral request is transmitted to a device of the social network connection. Acceptance of the referral request is determined. Based on determining acceptance of the referral request, a credit is provided to the user.

20 Claims, 50 Drawing Sheets

(56) References Cited

U.S. PATENT DOCUMENTS

| | | | | |
|---|---|---|---|---|
| 2013/0339186 | A1* | 12/2013 | French | G06Q 20/4016 |
| | | | | 705/26.35 |
| 2014/0039995 | A1 | 2/2014 | Ngo et al. | |
| 2014/0040152 | A1* | 2/2014 | Fang | G06Q 10/10 |
| | | | | 705/319 |
| 2016/0005029 | A1* | 1/2016 | Ivey | G06Q 20/409 |
| | | | | 705/44 |
| 2016/0162923 | A1 | 6/2016 | Meier | |

OTHER PUBLICATIONS

Elgeldawi, Enas, et al. "Detection and Characterization of Fake Accounts on the Pinterest Social Network.", 2014. (Year: 2014).*

Egele, Manuel, et al. "Compa: Detecting compromised accounts on social networks." NDSS. 2013. (Year: 2013).*

"International Application Serial No. PCT US2015 064246, International Search Report dated Feb. 12, 2016", 2 pgs.

"International Application Serial No. PCT US2015 064246, Written Opinion dated Feb. 12, 2016", 4 pgs.

"International Application Serial No. PCT US2015 064246, International Preliminary Report on Patentability dated Jun. 22, 2017", 6 pgs.

"U.S. Appl. No. 14/959,683, Non Final Office Action dated Mar. 22, 2018", 9 pgs.

"U.S. Appl. No. 14/959,683, Response filed Jun. 22, 2018 to Non Final Office Action dated Mar. 22, 2018", 18 pgs.

"U.S. Appl. No. 14/959,683, Notice of Non-Compliant Amendment dated Oct. 17, 2018", 4 pgs.

"U.S. Appl. No. 14/959,683, Response filed Dec. 17, 2018 to Notice of Non-Compliant Amendment dated Oct. 17, 2018", 17 pgs.

"U.S. Appl. No. 14/959,683, Notice of Non-Compliant Amendment dated Apr. 18, 2019", 5 pgs.

"U.S. Appl. No. 16/444,588, Preliminary Amendment filed Aug. 26, 2019", 12 pgs.

* cited by examiner

BOT RESISTANT NETWORK SERVICE COMMUNICATIONS TO SOCIAL NETWORK SITES

RELATED APPLICATIONS

This application is a division of U.S. application Ser. No. 14/959,683, entitled "BOT RESISTANT NETWORK SERVICE COMMUNICATIONS", filed Dec. 4, 2015, which claims the priority benefit to U.S. Provisional Application No. 62/089,429, entitled "REFERRAL SYSTEM FOR SUBSCRIPTION-BASED PRODUCTS," filed Dec. 9, 2014, both of which are hereby incorporated by reference in their entirety.

TECHNICAL FIELD

The present application relates generally to data processing systems and, in one specific example, to techniques for enabling users to refer subscription-based products to other users.

BACKGROUND

Subscription-based products include any product whereby a user pays a periodic fee (e.g., a monthly subscription fee) to receive a product or service. Examples of subscription-based products include product warranties, health club memberships, health insurance, property insurance, miscellaneous insurance, food delivery services, online content streaming services (e.g., NETFLIX®), membership fees for subscribing to websites or online products, pharmacy services, and so on.

BRIEF DESCRIPTION OF THE DRAWINGS

Various ones of the appended drawings merely illustrate example embodiments of the present disclosure and should not be considered as limiting its scope.

DETAILED DESCRIPTION

Example methods and systems for enabling users to refer subscription-based products to other users are described. In the following description, for purposes of explanation, numerous specific details are set forth in order to provide a thorough understanding of example embodiments. It will be evident, however, to one skilled in the art, that the embodiments of the present disclosure may be practiced without these specific details.

According to various example embodiments, a modern subscription-based marketplace, accessed via a referral management system described herein, provides users with the opportunity for discounted or free subscriptions and bank credits, based on those users referring subscriptions to other users. For example, a referral management system allows users to search, find, and purchase subscription-based products through a user-friendly user interface (e.g., via a mobile application installed on a smartphone, or via a website). Moreover, the system allows users to easily refer such subscription-based products, such as to other users including their friends (e.g., their friends on various online social networking services such as FACEBOOK®, LINKEDIN®, TWITTER®, INSTAGRAM®, etc.), or to various groups.

In some embodiments, if one of the referees purchases one of the referred subscriptions, various rewards or incentives may be provided to the referring user. For example, for every subscription purchased by a referee, the referring user may receive a credit for 10% of the value of the referee's subscription. The credit described herein may be provided to the user in the form of anything of value to a user. For example, the credit may refer to a monetary amount (e.g., cash), a discount that may be applied towards one of their existing subscriptions, rewards/points (e.g., credit card rewards point, frequent flyer points, etc.), coupons, promotions, offers, a monetary value embodied in a gift card or pre-paid credit card, and so on. Further, in contrast to a traditional referral discount that is only valid for a specific monetary amount or time period, the referral credit described herein functions as a "perpetual discount", in that it may be awarded to the user and enjoyed perpetually, without any monetary amount limitations or time period limitations. For example, the user can continue to receive other referral credits that can be combined with existing credits continuously in order to perpetually grow their referral credit base over time. Such referral credits provided to the user may be stored in association with a financial account of the user linked to their account on the subscription-based marketplace. Thus, the subscription-based marketplace described herein provides consumers with the ability to monetize their networks by enabling them to purchase subscriptions and then receive discounted/free subscriptions by referring their friends.

Figure 1:
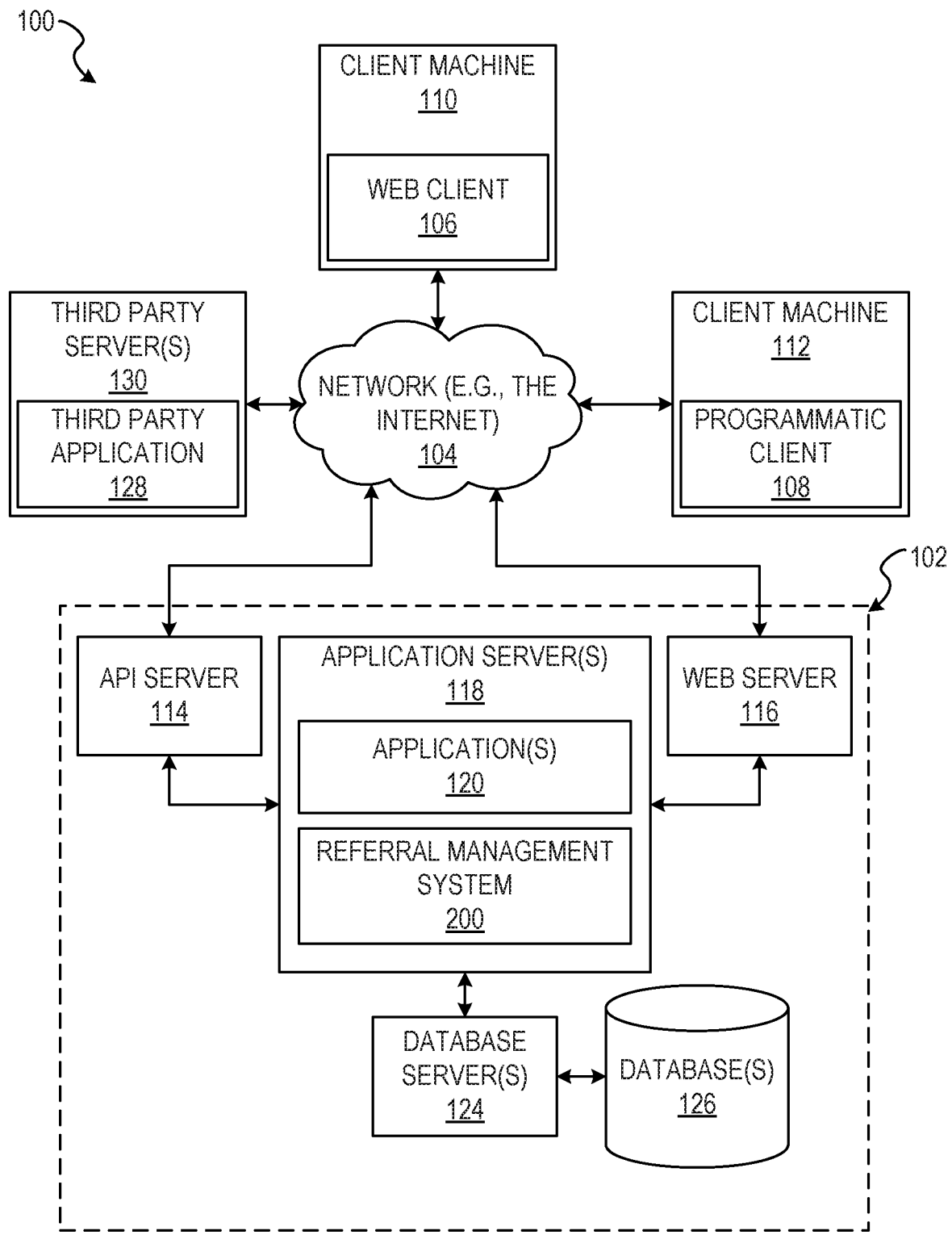
FIG. 1 is a block diagram showing the functional components of a social networking service, consistent with some embodiments of the present disclosure.

FIG. 1 is a network diagram depicting a client-server system 100, within which one example embodiment may be deployed. A networked system 102 provides server-side functionality via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more databases servers 124 that facilitate access to one or more databases 126. According to various example embodiments, the applications 120 may be implemented on or executed by one or more of the modules of the referral management system 200 illustrated in FIG. 2. While the applications 120 are shown in FIG. 1 to form part of the networked system 102, it will be appreciated that, in alternative embodiments, the applications 120 may form part of a service that is separate and distinct from the networked system 102. With some embodiments, the application servers 118 host what is referred to herein as a referral management system 200. The referral management system 200 is described in more detail below in conjunction with FIG. 2.

Further, while the system 100 shown in FIG. 1 employs a client-server architecture, embodiments described herein, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications 120 of the networked system 102.

According to various example embodiments, the referral management system 200 may include a referral engine that provides users with the ability to choose subscriptions to refer friends to, or choose friends to refer a subscription to. Moreover, the referral management system 200 provides a user interface configured to display the status of referrals (opened, accepted, rejected, etc.). The referral management system 200 also provides a user interface configured to display referral history by subscription, referral history by user, etc.

Figure 2A:
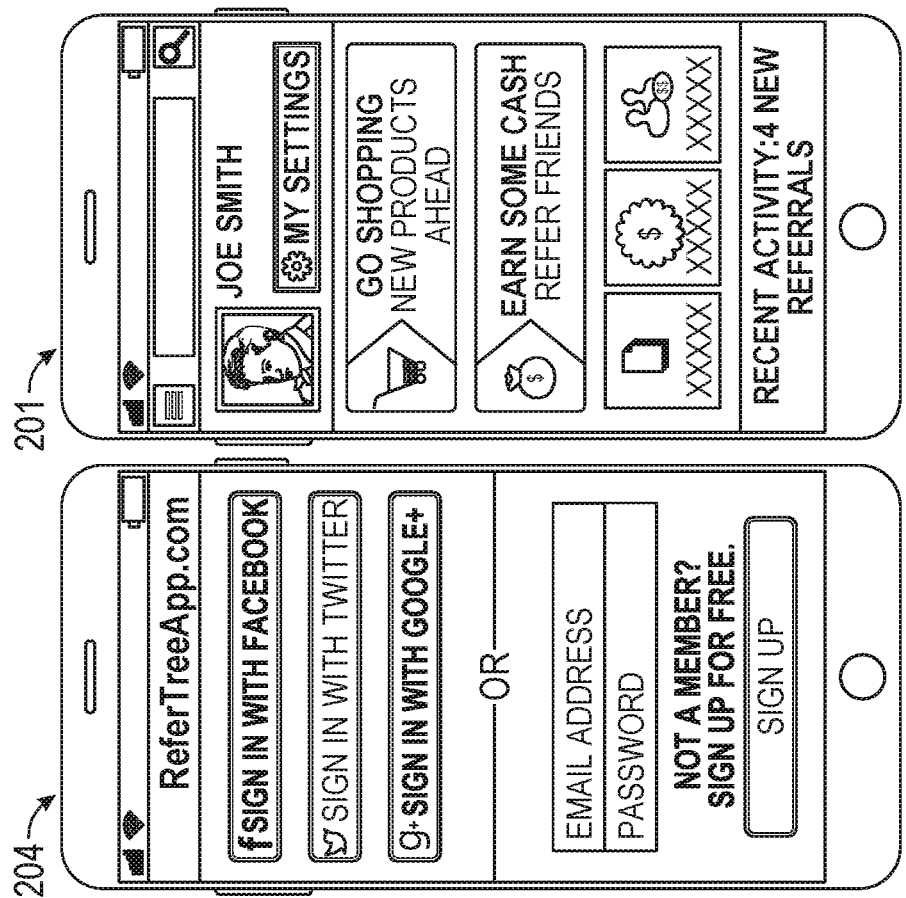
FIG. 2A illustrates example portions of user interfaces, according to various embodiments.
Figure 2B:
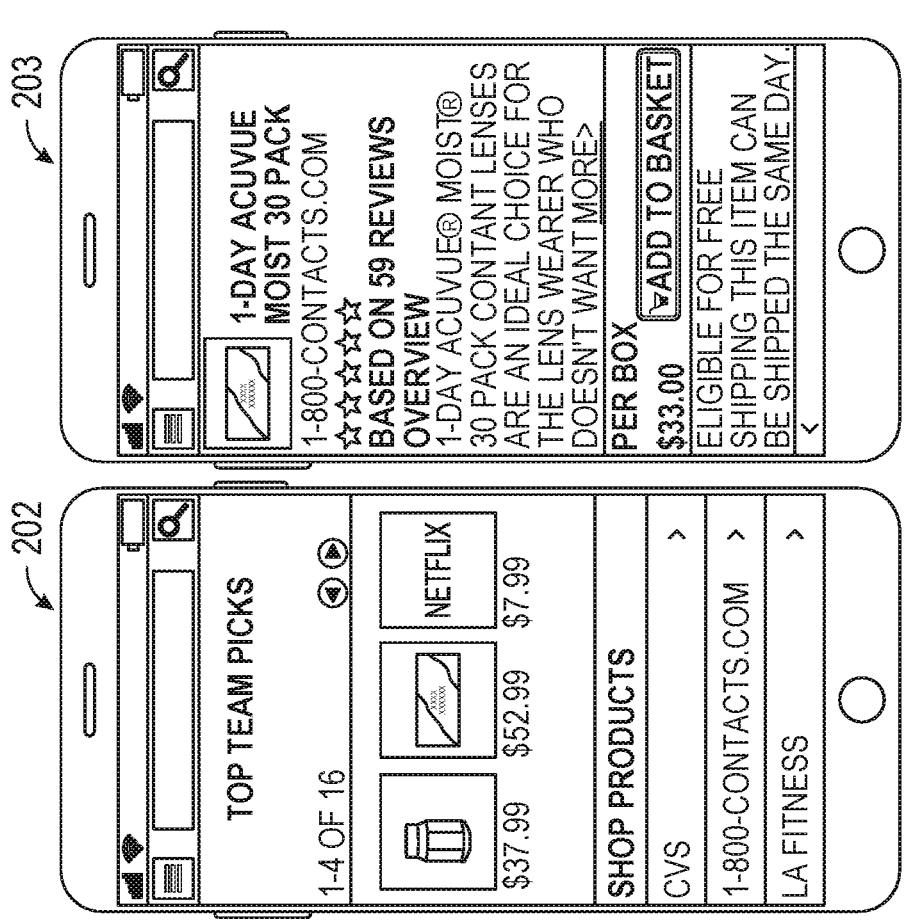
FIG. 2B illustrates example portions of user interfaces, according to various embodiments.
Figure 3A:
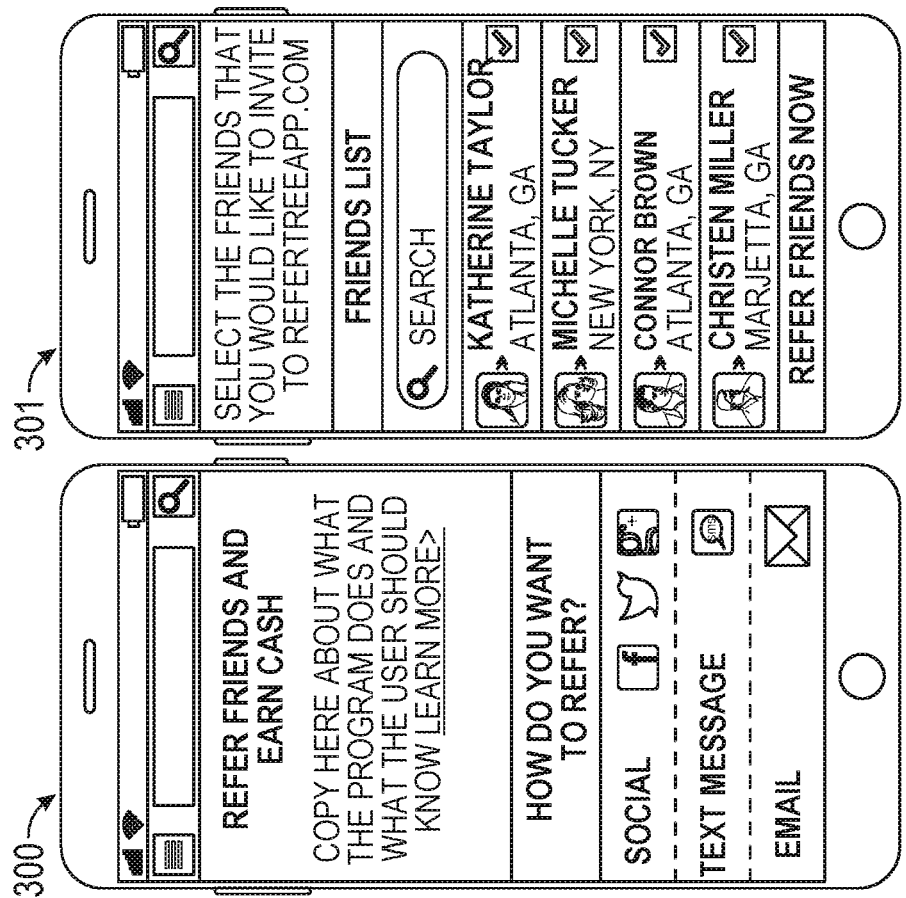
FIG. 3A illustrates example portions of user interfaces, according to various embodiments.
Figure 3B:
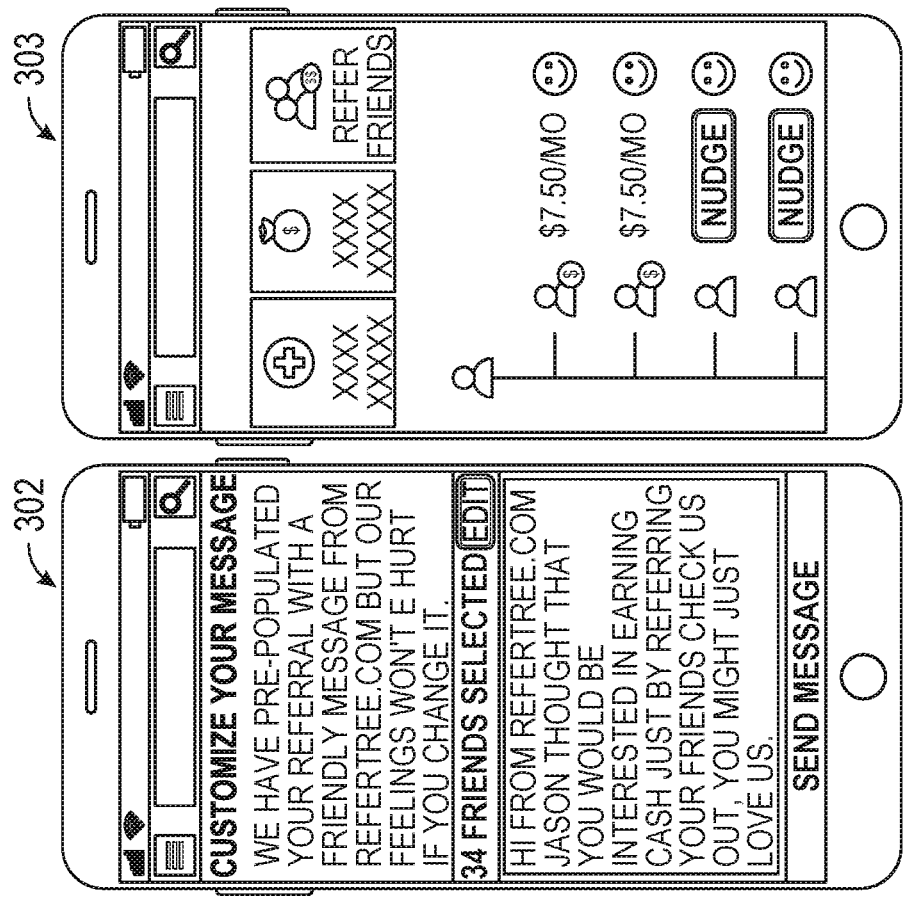
FIG. 3B illustrates example portions of user interfaces, according to various embodiments.

For example, FIG. 2 and FIG. 3 illustrate example portions of user interfaces displayed by the referral management system 200 to a user. In user interface 204, the user can sign in or log into to the referral management system 200, such as by entering an account username and password associated with the subscription-based marketplace, or by signing in via their credentials on a social networking service such as FACEBOOK®, TWITTER®, INSTAGRAM®, LINKEDIN®, etc.

Once the user signs in via user interface 204, the referral management system 200 may display the user interface 201 that displays information about the user's account and enables the user to shop for subscription-based products by selecting the "Go Shopping" button. For example, once the user selects the "Go Shopping" button, the referral management system 200 may display the user interface 202 that identifies various subscription-based products, such as trending or popular subscriptions, recommended subscriptions, and so on, as described in more detail below. In some embodiments, the user may enter search query terms into the search bar at the top of UI 202 in order to search for subscription with matching titles or descriptions. Once the user selects one of the displayed subscription-based products (e.g., "Netflix", as illustrated in 202), the referral management system 200 may display UI 203 that provides various information about that subscription, including price details. The user may select the "Add to Basket" button in order to purchase that subscription-based product.

Referring back to the UI 201, the user may select the "subscriptions" button (e.g., one of the buttons near the bottom of the UI 201) in order to view all subscription-based products that the user is currently subscribed to, as well as associated information with each subscription (e.g., monthly cost, duration of subscription, any applicable discounts for each subscription, etc.). Moreover, the user may select the "Check Bank" button (e.g., one of the buttons near the bottom of the UI 201) to view the value of current credits that have been applied to the user's account. Moreover, the user may select the "Referrals" button (e.g., one of the buttons near the bottom of the UI 201) to view the status of subscriptions referred by the user (as described in more detail in conjunction with UI 303). In some embodiments, the "Recent Activity" UI element in UI 201 may describe either a number of new subscriptions that have been referred to the current user by other users or, alternatively, a number of referrals that have been recently purchased by the current user.

In some embodiments, the user interface 201 enables the user to refer friends to subscription-based products by selecting the "Earn some cash" button. Thereafter, the referral management system 200 may display the UI 300 that provides the user with referral options. For example, in some embodiments, the current user (e.g., a referrer) may select an icon associated with a social network (such as FACEBOOK®, TWITTER®, LINKEDIN®, GOOGLE+®, etc.), and then the referral management system 200 will display the UI 301 that displayed a list of the user's friends or connections on the selected social network. In some embodiments, all the check boxes may be unselected by default, and the user may check the appropriate check boxes for the friends/connections they wish to refer subscriptions to. Alternatively, in some embodiments, all the check boxes may be selected by default, and the user may deselect various check boxes associated with friends/connections they do not want wish to refer subscriptions to. Thereafter, the user may select the "Refer friends now" button in UI 301, and the referral management system 200 may display the UI 302 that enables the user to customize a message of the referral request that will be transmitted to the appropriate friends/connections of the user. Although not illustrated, the referral management system 200 may display an interface to allow the user to select specific subscriptions to refer. Alternatively, the referral management system 200 enables the user to refer the entire subscription-based marketplace/platform to their friends, rather than specific subscriptions. In some embodiments, if the user refers a specific subscription to a friend, the current user will receive a credit based on the friend accepting that subscription (and not based on other subscriptions that the friend purchases). In other embodiments, the current user may receive a credit based on any subscriptions that the friend subsequently purchases (and not just based on the actual subscription that was directly referred to the friend). In some embodiments, if the current user refers the entire subscription-based marketplace to a friend (rather than an individual subscription), the current user will receive a credit based on any subscriptions subsequently purchase by that friend. Once the user clicks the "Send message" button in UI 302, the referral management system 200 will transmit the referral requests to the users selected in UI 301.

Referring back to UI 300, the user may also choose the "Text message" icon in order to specify a phone number, screen name (or select such pre-existing information associated with contacts stored on their smartphone memory), in order to transmit the referral requests via text message to the appropriate recipients. Similarly, the user may also choose the "Email" icon in order to specify emails addresses (or select such pre-existing information associated with contacts stored on their smartphone memory), in order to transmit the referral requests via email to the appropriate recipients. In some embodiments, the messages described herein may be any type of electronic message, including an e-mail, text message (e.g., a short messaging service (SMS) message, a multimedia messaging service (11S) message, etc.), an instant message associated with an online social network (e.g., FACEBOOK®, LINKEDIN®, WECHAT®, WHATSAPP®, etc.), a chat message associated with an online chat service, and so on. According to various example embodiments, the referral management system 200 may provide users with a personalized coupon code accessible by inputting email address or other data. For example, consider a case where a referrer links a social network with the referral network, chooses certain friends to refer a subscription to (whose email addresses are linked to the social network), and those friends can input their email address to see if there are subscription referrals waiting for them.

Referring to UI 303, the referral management system 200 may display a referral summary page identifying the status of subscriptions that have been referred by the current user. For example, each of the user profile icons may correspond to different friends, and may indicate the current number of subscriptions that have been referred to that friend by the current user (e.g., "5"), as well as the total amount of credits (e.g., "$7.50 per month") that have been credited the current user's amount, based on the referrals to that friend. For friends that have not accepted pending subscription requests, the referral management system 200 may display a "Nudge" button that enables the current user to send a reminder to those friends. In some embodiments, the number next to each profile icon (e.g., "5") in UI 303 indicates the size of that user's network. Thus, the current user can determine which users are more engaged with the subscription-based marketplace, based on the size of their network (e.g., users with low network sizes have a higher drop-off risk and, thus, present greater risk for loss of referral-based credits to the current user). In some embodiments, the amount of money listed next to each profile icon (e.g., "$7.50 per month") in UI 303 indicates the amount that referee is paying for the subscription (rather than the amount of credit being refunded to the current user, as described above). In the UI 303, the user may select the "Refer friends" button to refer more subscriptions to their friends (e.g., the referral management system 200 may display the UI 300). Moreover, the UI 303 displays an icon indicating the total amount of credits being received by the current user based on their referrals (e.g., a sum of the credits shown in the UI 303 such as $15.00/mo). Thus, the referral management system 200 provides a UI for easy/direct referral system, (including one-touch referral, segmenting network, central dashboard for monitoring referrals, central management of billing, easy opt-out, alerts, etc.).

Figure 4:
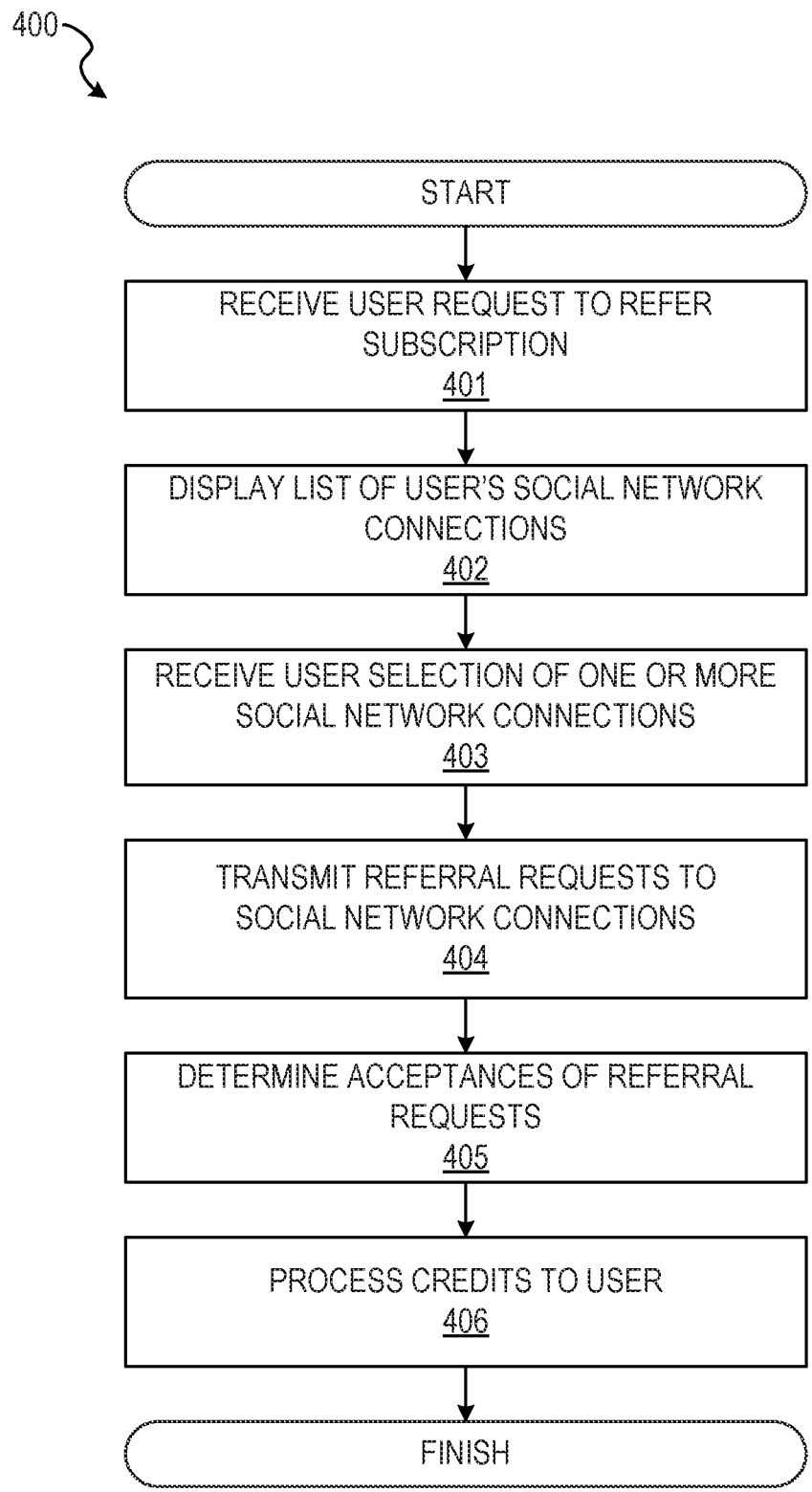
FIG. 4 is a flowchart illustrating an example method, according to various embodiments.

FIG. 4 is a flowchart illustrating an example method 400, consistent with various embodiments described above. The method 400 may be performed at least in part by, for example, the referral management system 200 illustrated in FIG. 1 (or an apparatus having similar modules, such as one or more client machines 110, 112 or application servers 118). In operation 401, the referral management system 200 receives, from a user device or user system of the user (e.g., a smart phone of the user executing at least a portion of or in communication with the referral management system 200), a user request to refer a subscription to one or more friends. For example, the referral management system 200 may detect that the user has selected "Earn some cash" button illustrated in UI 201 in FIG. 2.

In operation 402, the referral management system 200 displays, or causes display of (e.g., transmit an instruction to the user device to display the list on a screen of the user device), a list of the user's friends or connections on an online social network service, such as FACEBOOK®, TWITTER®, LINKEDIN®, etc. (e.g., see UI 301 illustrated in FIG. 3). For instance, the referral management system 200 accesses a list of social network connections (members of a social network service) for the user from a social networking service. In this instance, the social network connections have a social network relationship with the user on the social networking service (e.g., friends, followers, contacts, or another association between the user and a particular member of the social network service).

In operation 403, the referral management system 200 receives a user selection of one or more of the user's social network friends/connections displayed in operation 402. In operation 404, the referral management system 200 transmits referral requests to each of the friends/connections selected in operation 403. In operation 405, the referral management system 200 determines which (and how many) friends/connections have accepted that referral requests that were transmitted in operation 404. In operation 406, the referral management system 200 calculates and processes a credit to the user, based on the number of friends/connections determined in operation 405. Put another way, in operation 406 the referral management system 200 provides a credit to the user or a particular account of a user. For example, for every accepted referral request, the referral management system 200 may provide a credit of 10% of the value of the referred subscription to an account of the user. It is contemplated that the operations of method 400 may incorporate any of the other features disclosed herein. Various operations in the method 400 may be omitted or rearranged, according to certain embodiments.

According to various example embodiments, the referral management system 200 may include a retention & conversion engine that provides various features that help convert and retain customers. For example, in some embodiments, the referral management system 200 is configured to provide variable incentives. For example, in some embodiments, incentives to a user may change dynamically, based on global or individual statistics of that user (e.g. number of referrals accepted globally, or individual performance, etc.).

Figure 5:
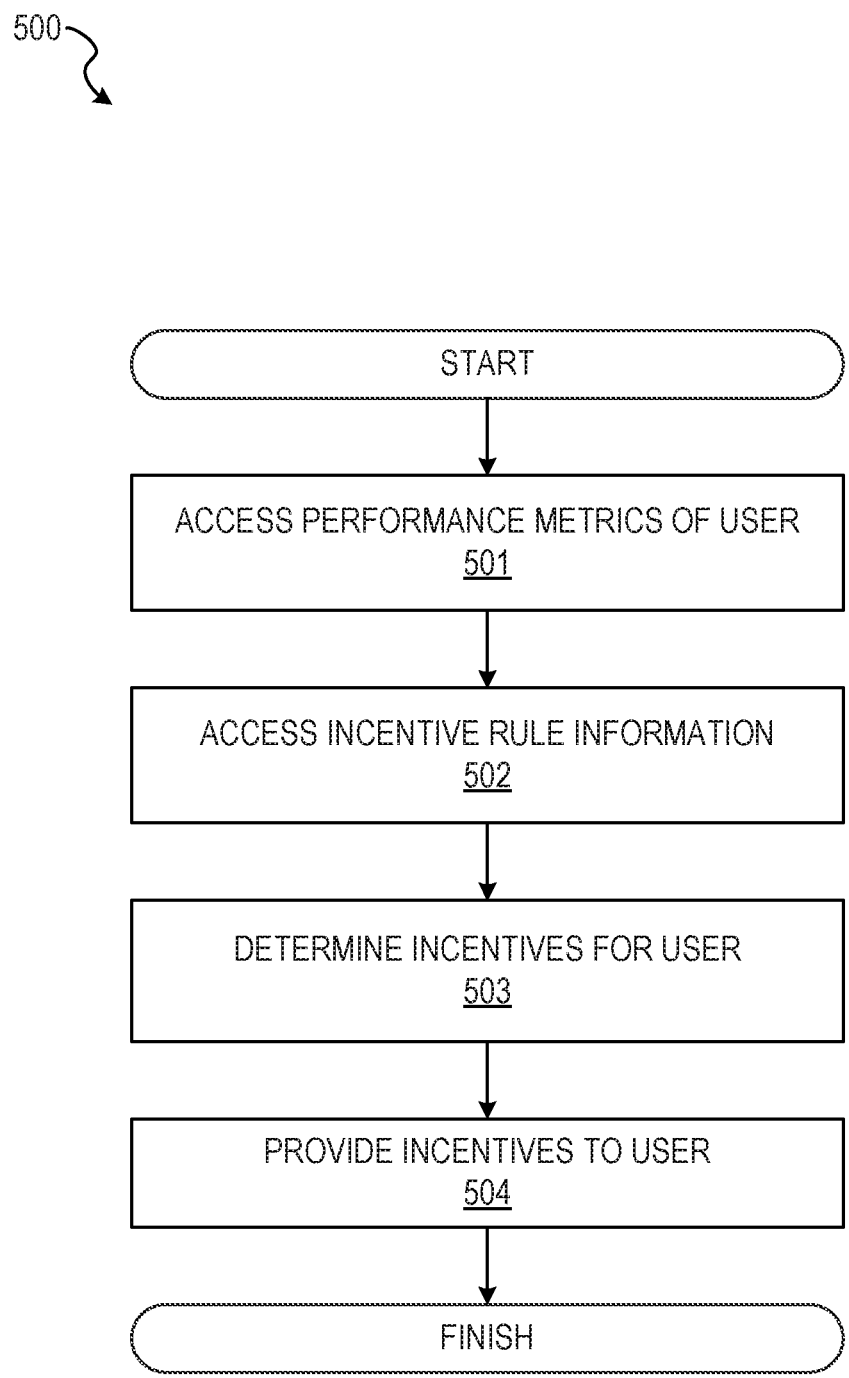
FIG. 5 is a flowchart illustrating an example method, according to various embodiments.

FIG. 5 is a flowchart illustrating an example method 500, consistent with various embodiments described above. The method 500 may be performed at least in part by, for example, the referral management system 200 illustrated in FIG. 1 (or an apparatus having similar modules, such as one or more client machines 110, 112 or application servers 118). In operation 501, the referral management system 200 accesses various performance metrics of a given user (e.g., number of referrals transmitted to others in total or during a given time period, number of referrals accepted by others in total or during a given time period, percentage of referrals accepted by others in total or during a given time period, etc.). In operation 502, the referral management system 200 access incentive rule information specifying various candidate incentives to be awarded to users based on their performance metrics (e.g., if the percentage of referrals accepted by others is greater than X, provide a credit of $Y to the user). In operation 503, the referral management system 200 determines incentives for the user, based on the performance metrics of the user access in operation 501 and the incentive rule information accessed in operation 502. In operation 504, the referral management system 200 provides the incentives determined in operation 503 to the user (e.g., crediting money to an online account of the user). It is contemplated that the operations of method 500 may incorporate any of the other features disclosed herein. Various operations in the method 500 may be omitted or rearranged, according to certain embodiments.

According to various example embodiments, the referral management system 200 may be configured to reflect a "scarcity of incentives" philosophy to limit incentives, in order to encourage users to purchase or refer subscriptions, and to ensure that the value of incentives is not diluted. For example, in some embodiments, incentives may be limited in the way they are offered or distributed, (e.g., the first 5 members that refer subscriptions get a special type of credit, all or some members of the network can only receive x credits/discounts per day, etc.).

According to various example embodiments, the referral management system 200 is configured to calculate a Spam Factor/Quality Score associated with each user of the subscription-based marketplace described herein. For example, in some embodiments, the referral management system 200 may assign a quality score to users based upon their use/misuse of service. For instance, if a user sends out every possible subscription to every person in their network they get a low score; if they have a high conversion rate of referrals (they're targeting the right people with the right subscriptions) they get a high score. In some embodiments, the referral management system 200 may promote, suspend, or ban users, based on the quality scores generated for each of the users. In some embodiments, the referral management system 200 may utilize the quality scores to provide users with certain rewards/gamification element.

Figure 6:
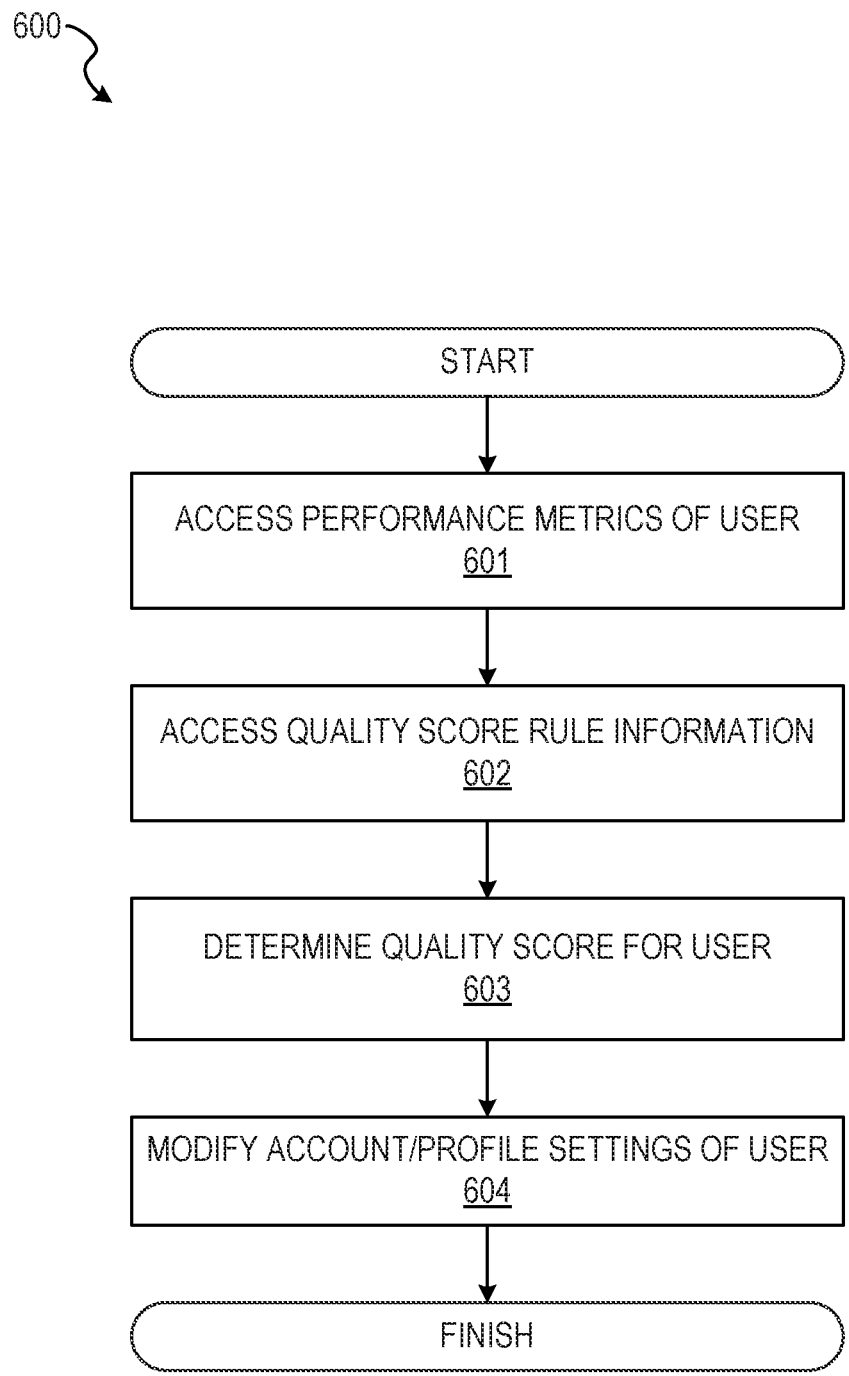
FIG. 6 is a flowchart illustrating an example method, according to various embodiments.

FIG. 6 is a flowchart illustrating an example method 600, consistent with various embodiments described above. The method 600 may be performed at least in part by, for example, the referral management system 200 illustrated in FIG. 1 (or an apparatus having similar modules, such as one or more client machines 110, 112 or application servers 118). In operation 601, the referral management system 200 accesses various performance metrics of a given user (e.g., total number of referrals transmitted to each friend, different types of subscriptions referred to each friend, percentage of friends that referrals have been transmitted to, number of available subscriptions that have been referred, percentage of referrals accepted by others in total or during a given time period, etc.). In operation 602, the referral management system 200 accesses quality score rule information defining various candidate quality scores to be awarded to users based on their performance metrics. For example, if the user has referred all available subscriptions to all friends in a specific network, and few or none (e.g., less than a predetermined threshold number or threshold percentage) sign up for a subscription, then their individual "quality score" will be reduced. On the other hand, if the percentage of referrals accepted by others is high, their quality score will be increased. In operation 603, the referral management system 200 determines a quality score for the given user, based on the performance metrics of the user accessed in operation 601 and the quality score information accessed in operation 602. In operation 604, the referral management system 200 modifies various account/profile settings of the user, based on the quality score determined in operation 603. For example, if the quality score is high, the referral management system 200 may promote the user on the subscription-based marketplace, such as by listing their referral requests higher in a list of referral requests (e.g., in a referee's message inbox). As another example, the referral management system 200 may display information describing how the user compares to other referrers (e.g., top 10%, #2, etc.) on the user's profile or in their referral requests they send on the subscription-based marketplace, which may encourage gamification and users with respect to referral activity. As another example, if the quality score is high, the referral management system 200 may promote the user on the subscription-based marketplace by listing indicia of badges, awards, high status, etc., on the user's profile or in their referral requests they send on the subscription-based marketplace. On the other hand, if the quality score is low, the referral management system 200 may suspend or ban the user on the subscription-based marketplace, remove or de-emphasize their referral requests in a list of referral requests (e.g., in a referee's inbox), or by list warnings, low status, etc., on the user's profile or in their referral requests on the subscription-based marketplace. It is contemplated that the operations of method 600 may incorporate any of the other features disclosed herein. Various operations in the method 600 may be omitted or rearranged, according to certain embodiments.

According to various example embodiments, the referral management system 200 may include a bot detection feature that searches for activity that follows bot behavior rather than human behavior. For instance, if a user sends out every possible subscription to every person in their network, the referral management system 200 may determine that they may be a bot.

Figure 7:
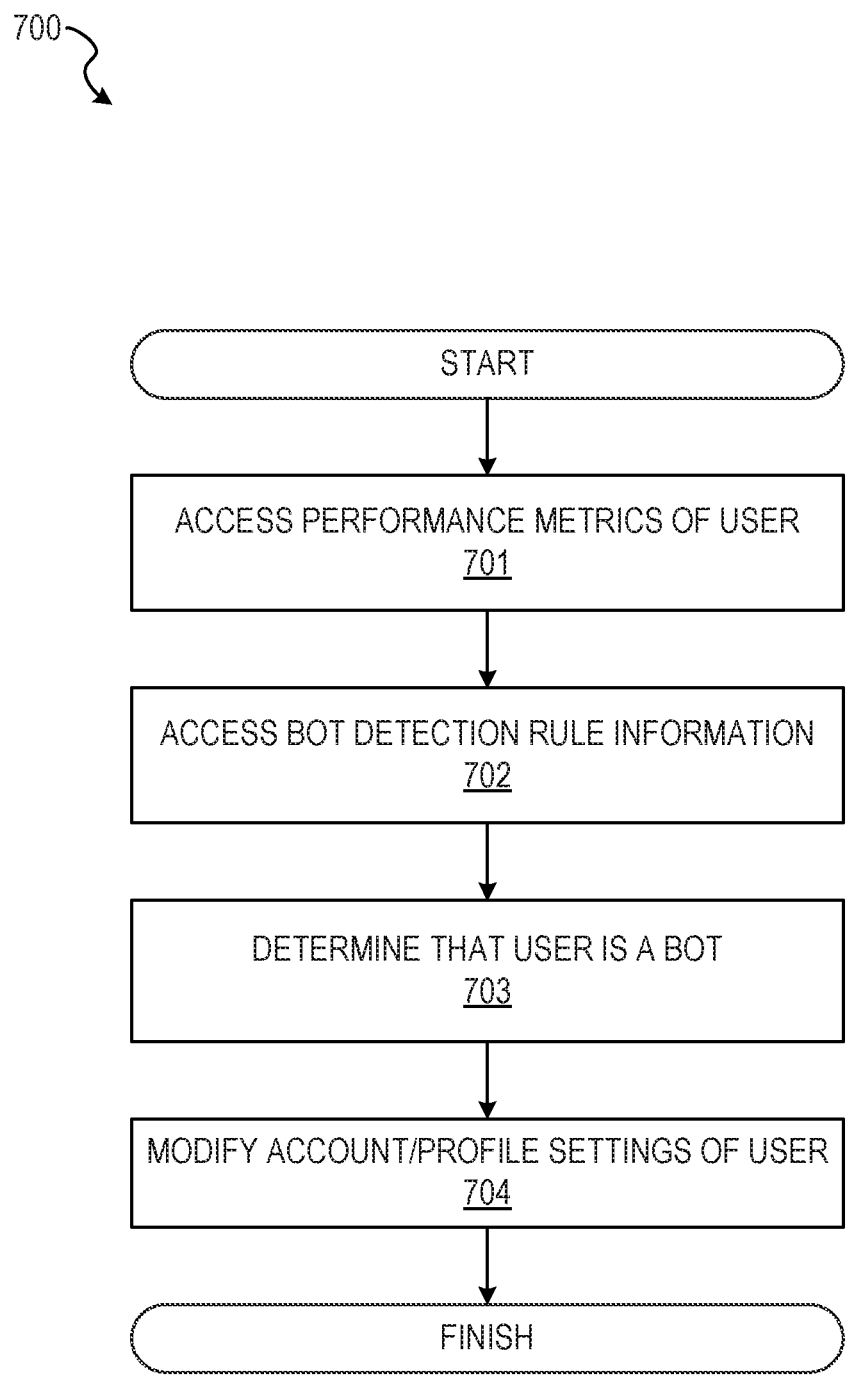
FIG. 7 is a flowchart illustrating an example method, according to various embodiments.

For example, FIG. 7 is a flowchart illustrating an example method 700, consistent with various embodiments described above. The method 700 may be performed, at least in part, by, for example, the referral management system 200 illustrated in FIG. 1 (or an apparatus having similar modules, such as one or more client machines 110, 112 or application servers 118). In operation 701, the referral management system 200 accesses various performance metrics of a given user (e.g., total number of referrals transmitted to each friend, different types of subscriptions referred to each friend, percentage of friends that referrals have been transmitted to, number of available subscriptions that have been referred, percentage of referrals accepted by others in total or during a given time period, etc.). In operation 702, the referral management system 200 accesses bot detection rule information defining rules for determining whether a user is a bot, based on their performance metrics (e.g., if the user has referred all available subscriptions to all friends, then they may be a bot, whereas if percentage of referrals accepted by others is high, the user is not a hot, etc.). In operation 703, the referral management system 200 determines whether the given user, based on the performance metrics of the user accessed in operation 701 and the bot detection rule information accessed in operation 702, is likely to be a bot. In operation 704, the referral management system 200 modifies various account/profile settings of the user, based on the quality score determined in operation 703. For example, if it is determined that the given user is a bot, the referral management system 200 may suspend or ban the user on the subscription-based marketplace, remove or de-emphasize their referral requests in a list of referral requests (e.g., in a referee's inbox), or list warnings, low status, etc., on the user's profile or in their referral requests on the subscription-based marketplace. It is contemplated that the operations of method 700 may incorporate any of the other features disclosed herein. Various operations in the method 700 may be omitted or rearranged, according to certain embodiments.

According to various example embodiments, the referral management system 200 may utilize various degrees of separation for the purposes of calculating discount reach and visibility. For example, In some embodiments, only first-degree referrals reward the referrer (e.g., if A refers B, and B refers C, then A only gets a reward based on their referral to B, and does not get a reward based on the secondary referral to C.).

According to various example embodiments, the referral management system 200 may enable users to set the visibility and privacy of various aspects of their profile information (e.g., what and how many subscriptions they are buying, the size of their network, how many referees they have, what subscriptions they are referring, etc.), where such levels of visibility may include global (e.g., everyone on the subscription-based marketplace), network only (e.g., their connections or friends on the subscription-based marketplace or an online social networking service), first degree referrals, second degree, referrers that have referred products to them, etc.

In some embodiments, the referral management system 200 may allow users to rate or review subscriptions, where such ratings or reviews are posted on their profile pages or in a content feed associated with the subscription-based marketplace. Further, the referral management system 200 may track how many users have viewed their subscription ratings or reviews, how many users have viewed their profile or certain sections of their profile (e.g., a profile section displaying subscriptions purchased, subscriptions referred to other users, etc.). The referral management system 200 may display such tracked information to the user via a user interface.

Figure 8:
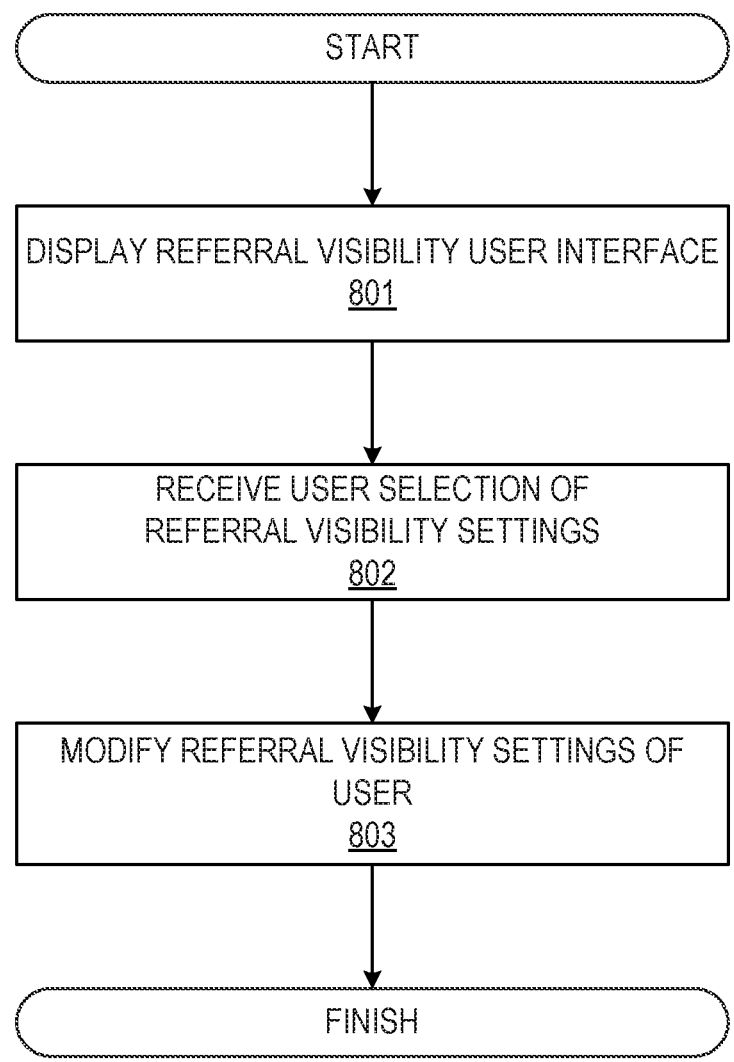
FIG. 8 is a flowchart illustrating an example method, according to various embodiments.
Figure 14:
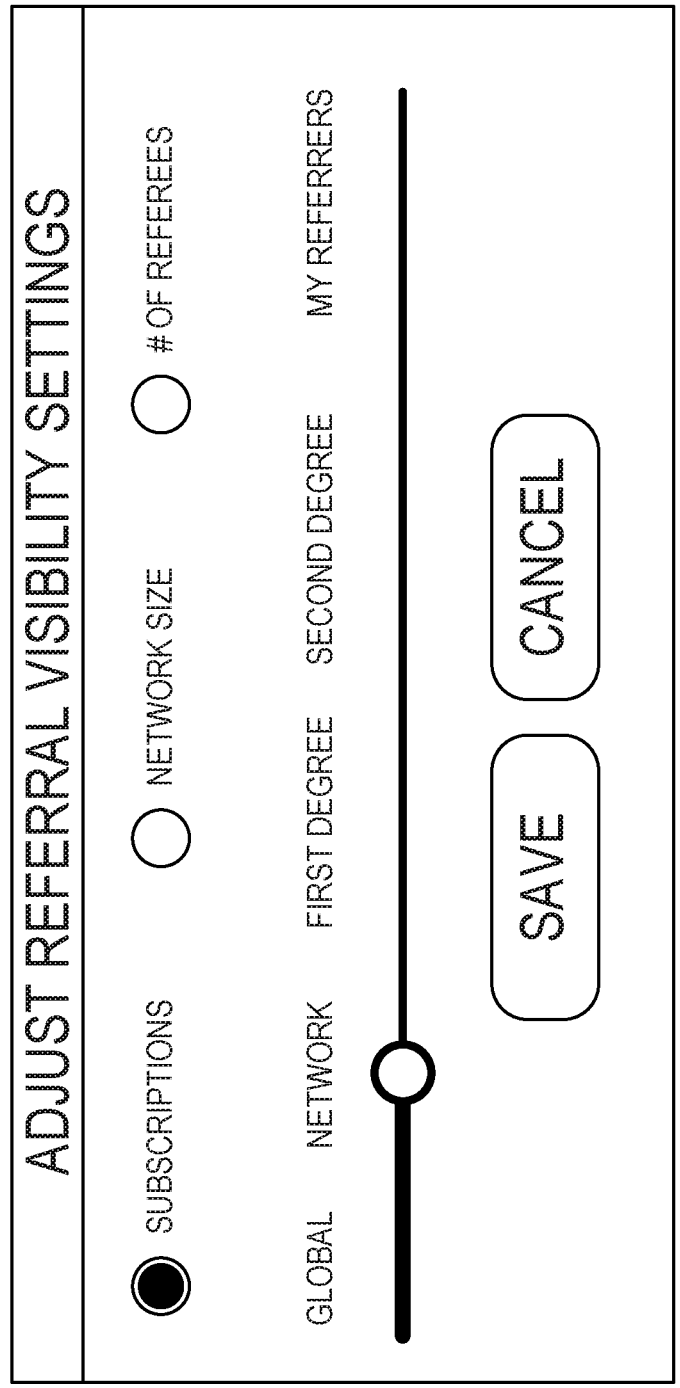
FIG. 14 illustrates an example portion of a user interface, according to various embodiments.

FIG. 8 is a flowchart illustrating an example method 800, consistent with various embodiments described above. The method 800 may be performed, at least in part, by, for example, the referral management system 200 illustrated in FIG. 2 (or an apparatus having similar modules, such as one or more client machines 110, 112 or application servers 118). In operation 801, the referral management system 200 displays a referral visibility user interface configured to receive user specification of various referral visibility settings. For example, FIG. 14 displays a referral visibility user interface 1400 that enables a user to select whether their referral activity is visible globally (all user on the subscription-based marketplace), their network only (e.g., all friends or connections on social networks), their first degree referrals (which may include users outside of their immediate network), second degree referrals (i.e., users that have received referral requests from first degree referrals), and so on. In operation 802, the referral management system 200 receives a user selection of various referral visibility settings, via the referral visibility user interface 1400 displayed in operation 801. In operation 803, the referral management system 200 modifies referral visibility settings of the user, based on the user-specified referral visibility settings received in operation 802. It is contemplated that the operations of method 800 may incorporate any of the other features disclosed herein. Various operations in the method 800 may be omitted or rearranged, according to certain embodiments.

According to various example embodiments, the referral management system 200 is configured to enable a user to broadcast recommendations as a form of passive referrals, rather than targeting recommendations to a specific target user. For example, suppose User A likes a certain subscription service, and they want to broadcast that without specifically targeting other users. The referral management system 200 may display a user interface (e.g., a modified version of UI 301 in FIG. 3) that enables the User A to post that recommendation and to set a visibility of the posted recommendation (e.g., global, network only, etc.), so that other users can use that broadcast referral to subscribe themselves.

According to various example embodiments, the referral management system 200 includes a group buying enablement feature allowing users to come together to pursue a group deal via the subscription-based marketplace. For example, if a given user selects a subscription offer for purchase, the referral management system 200 may display a user interface encouraging them select one or more of their social network friends to enter into a group buy deal (e.g., "if you and 10 friends buy this subscription, the subscription price drops from $10/month to $8/month for each of you, and if you and 20 friends buy this subscription, the subscription price drops from $10/month to $5/month for each of you", etc.). Depending on which friends the user selects, the referral management system 200 may transmit group buy requests to the selected friends requesting them to join in on the deal. As another example, if the user selects a subscription offer for purchase, the referral management system 200 may display a user interface indicating how many other users (whether or not they are friends or connections in the user's network) have purchased the offer, and the resulting price of the subscription (e.g., "500 people have subscribed, so instead of paying X you're going to be paying Y"). Thus, users may get together to all buy the same subscription and receive it at a discounted rate depending on how many of them there are signing up. In some embodiments, the referral management system 200 may impose a time limit on such group buy deals, where the resulting scarcity of time element associated with completing the group buy deal may encourage further sales (e.g., the system 200 may display a prompt that states: "If you and 20 friends buy this subscription, the subscription price drops from $10/month to $8/month for each of you, BUT only if you buy in the next 24 hours!!").

In some embodiments, the referral management system 200 may display a user interface to suppliers enabling them to configure group buy settings (e.g., if X1 number of users buy the subscription, then the price is Y1, if X2 number of users buy the subscription, then the price is Y2, etc.). If a user initiates a group buy deal based on a subscription offer referred to them by a referrer (e.g., person A refers to B, and then person B initiates group buy deal with persons C, D, and E), then the credits to that referrer (A) may be calculated based on the discounted group buy price paid by just the initial referee (e.g., 10% of the discounted group buy price paid by B). Alternatively, the credits to that referrer (A) may be calculated based on the discounted group buy prices paid by the entire group (e.g., 10% of the total discounted group buy price paid by B, C, D, and E).

In some embodiments, the referrer may be an organization, and in this case, the credits normally provided to referrers may be provided back to that organization. For example, the organization may be any entity with a profile on the subscription-based marketplace (e.g., a company, a business, a for-profit organization, a non-profit organization, a group, a club, etc.). The organization may or may not itself be a supplier, merchant, or provider of a subscription offer (e.g., a subscription offer being broadcasted as a post on a content feed of the subscription-based marketplace)

More specifically, in some embodiments, the referral management system 200 enables an organization to solicit its members, followers, connections, friends, etc., to act as proxies on its behalf, where successful referrals by that organization's proxies result in referral credits being awarded to the organization itself. For example, the following method may be performed:

1) The referral management system 200 enables an Organization A to set up an account on the subscription-based marketplace (e.g., a profile page or webpage associated with the organization, where other users of the subscription-based marketplace may select a button to join or become members, followers, connections, friends, etc., of the organization).
2) The referral management system 200 enables Organization A to solicit its members to become "proxies" of the organization and to refer subscriptions on its behalf (e.g., with a code or special interface). For example, the referral management system 200 may transmit a message or display a user interface prompting members as follows: "As part of our fund raising effort here at XYZ church, we are asking our members to please refer subscription ABC to as many of their friends as possible", or "For each person you refer subscription ABC to that purchases the subscription, receive a $1 credit!". (The referral management system 200 may display a user interface to personnel associated with the organization allowing them to draft the aforementioned messages.). Thus, Organization A may rally Person 1, Person 2, Person 3 to buy subscriptions.

3) Person 1, 2 and 3 who are "proxies" under Organization A may refer subscriptions to their friends or network (consistent with various embodiments described), and the Organization A may receive the benefit of those referrals. In other words, instead of the referral benefit (e.g., a credit for 10% of the value of subscriptions successfully referred) going to Person 1, 2 and 3, the system 200 directs that benefit to a financial account associated with Organization A.

In some embodiments, the referral management system 200 may display a user interface (e.g., a version of the UI 204 illustrated in FIG. 2) that organizes the available subscriptions into different categories, channels, topics, or genres (e.g., entertainment, health, warranties, insurance, etc.), as well as displaying individual subscriptions that may or may not fit into various categories. Moreover, in some embodiments, the referral management system 200 may include a feature for learning about subscriptions that users of the subscription-based marketplace would like to purchase, if such subscriptions were available. For example, the referral management system 200 may display a user interface (e.g., a version of the UI 204 illustrated in FIG. 2) that displays prospective individual subscriptions, categories of prospective subscriptions, a comment section where users may describe or request a customized prospective subscription that they would like to purchase, and so on. Moreover, the referral management system 200 may enable users to submit votes, ratings, reviews, etc., in connection with each of the prospective individual subscriptions, prospective subscription categories, requested subscriptions, etc., that they would buy if available. (For example, in conjunction with each displayed subscription or category, the user may click on a "like" button, or click on a "I would buy if available" button, or the user may provide a rating on a scale of 1 to 5 by clicking on each of five displayed stars, and so on). Thus, merchants, suppliers, providers, and others associated with the subscription-based marketplace may gauge and analyse demand for subscriptions that are not yet available, in order to help determine future subscriptions to provide to members of the subscription-based marketplace.

According to various example embodiments, the referral management system 200 may provide recommendations for bundled/curated subscription services to users. For example, the referral management system 200 may display deals exclusive to the network, e.g. discount when you buy NETFLIX® and SPOTIFY® together. As another example, the referral management system 200 may display curated lists or packages of subscriptions based on certain user data that is collected, (e.g. millennials might be presented with a bundle of HBO GO, Spotify, and Stunner of the Month at a discounted price).

Figure 9:
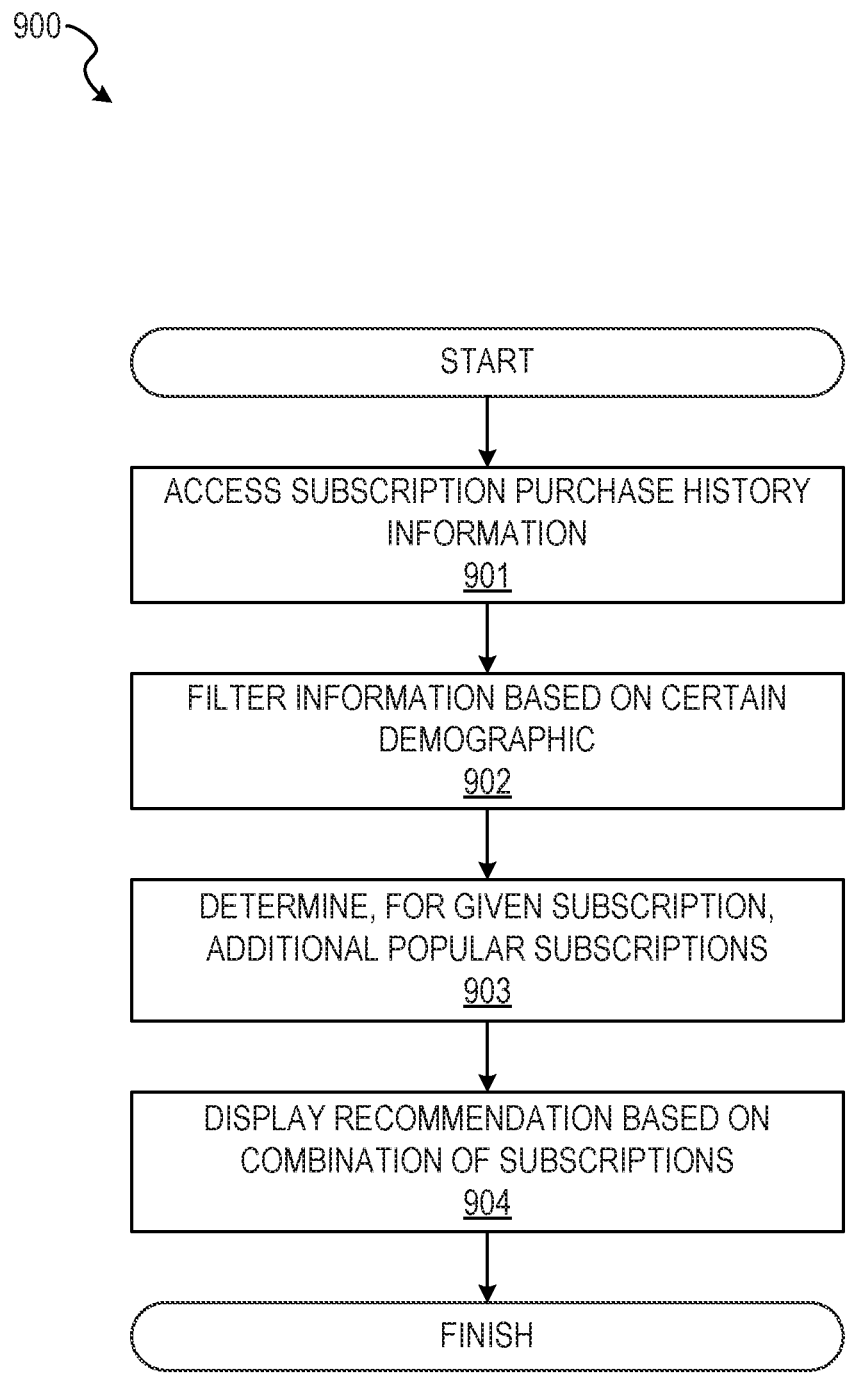
FIG. 9 is a flowchart illustrating an example method, according to various embodiments.

FIG. 9 is a flowchart illustrating an example method 900, consistent with various embodiments described above. The method 900 may be performed, at least in part, by, for example, the referral management system 200 illustrated in FIG. 2 (or an apparatus having similar modules, such as one or more client machines 110, 112 or application servers 118). In operation 901, the referral management system 200 accesses subscription purchase history information identifying a history of subscription purchases on the subscription-based marketplace managed by the referral management system 200. In operation 902, the referral management system 200 filters the subscription purchase history information accessed in operation 901 based on a certain demographic (e.g., age, geography, subscription type such as genre, topic, etc.). In other words, the referral management system 200 identifies a history of subscription purchases by users of a certain age, geographic location, or by a certain type of subscription, etc. In operation 903, the referral management system 200 determines, for a given subscription in the filtered information output in operation 902, other additional subscriptions that tend to be purchased in conjunction with the given subscription (e.g., users that purchase subscription A tend to purchase subscription B). In operation 904, the referral management system 200 displays recommendations for a combination of subscription, based on the determinations in operation 903. For example, if a given user has not yet purchased subscription A, the referral management system 200 may recommend that the user purchase subscriptions A and B together. As another example, if a given user has purchased subscription A, the referral management system 200 may recommend that the user purchase subscription B. It is contemplated that the operations of method 900 may incorporate any of the other features disclosed herein. Various operations in the method 900 may be omitted or rearranged, according to certain embodiments.

According to various example embodiments, the system 200 is configured to determine and identify trending subscriptions (by geography, age, type, etc.). Thus, the referral management system 200 may provide a new mode for users to discover subscriptions. According to various example embodiments, the referral management system 200 may include an endorsement/suggestion/curation/analytics engine configured to structure/aggregate collected data from disparate sources for processing, and analyse the data to provide usable insights (e.g. suggest who to introduce to a specific subscription, and what subscriptions to introduce to a specific person). For example, the referral management system 200 may utilize historic patterns, e.g. users age 18-35 are most subscribing to Subscription A, so suggest that product to users in that age group. Information regarding these trending subscriptions may be of benefit not only to users of the subscription-based marketplace, but also may be informative for providers of subscription-based products (e.g., to see which subscriptions are most successful, and to tailor their own subscription products accordingly).

Figure 10:
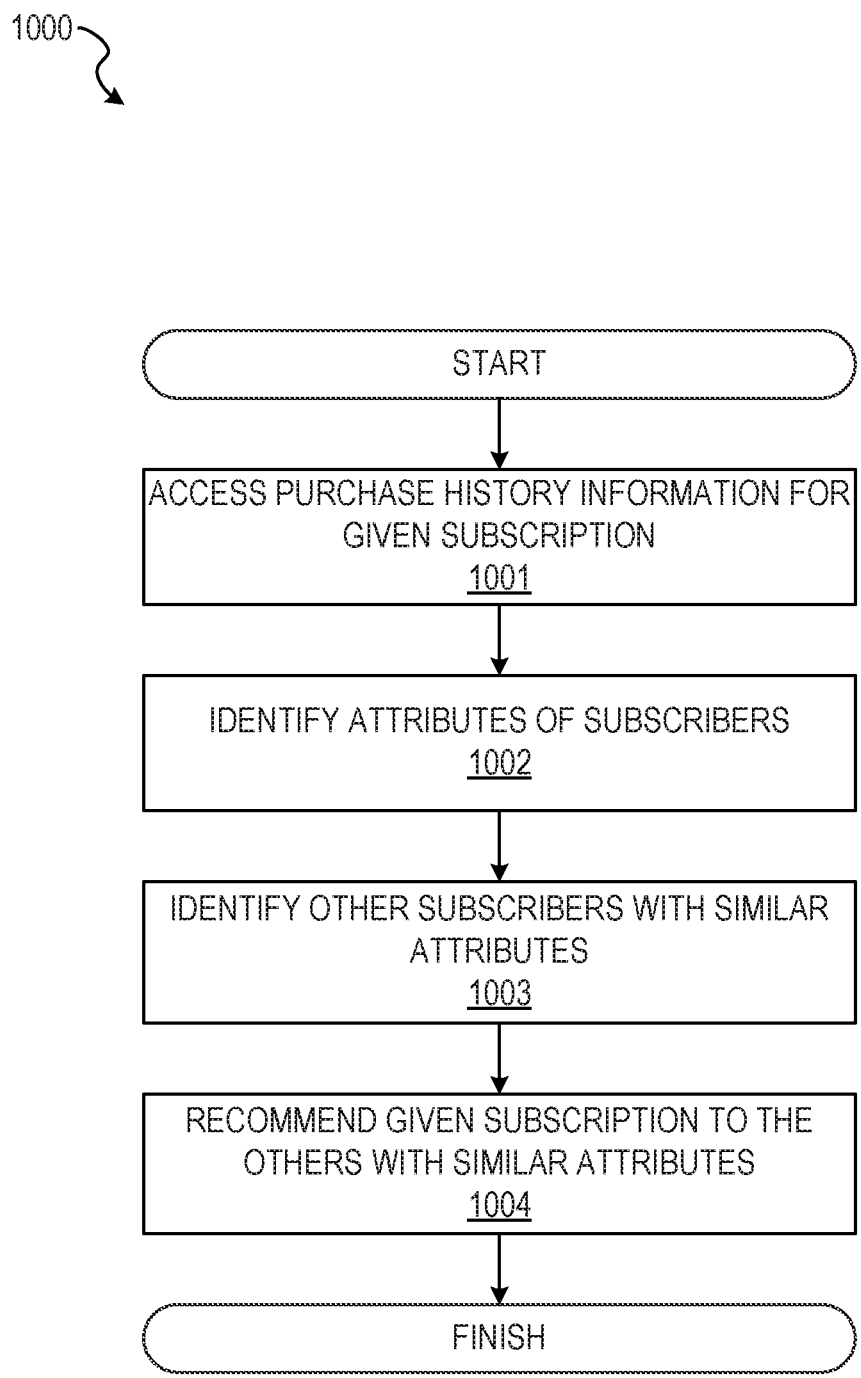
FIG. 10 is a flowchart illustrating an example method, according to various embodiments.

FIG. 10 is a flowchart illustrating an example method 1000, consistent with various embodiments described above. The method 1000 may be performed, at least in part, by, for example, the referral management system 200 illustrated in FIG. 2 (or an apparatus having similar modules, such as one or more client machines 110, 112 or application servers 118). In operation 1001, the referral management system 200 accesses purchase history information for a given subscription identifying which users have purchased the given subscription (e.g., during a predetermined time interval). In operation 1002, the referral management system 200 identifies subscribers of the given subscription, based on the purchase history information accessed in operation 1001. Further, 200 identifies attributes of those subscribers (e.g., age, location, interests, friends/connections, etc.), based on the profile data of those subscribers on the subscription-based marketplace managed by the referral management system 200, or the profile data of those subscribers on linked social network accounts (e.g., FACEBOOK®, LINKEDIN®, TWITTER®, etc.). In operation 1003, the referral management system 200 identifies other users that have attributes similar to the subscribers identified in operation 1002 (e.g., based on the profile data of other users on the subscription-based marketplace managed by the referral management system 200, or the profile data of those subscribers on linked social network accounts (e.g., FACEBOOK®, LINKEDIN®, TWITTER®, etc.)). In operation 1004, the referral management system 200 recommends the given subscription to the other users identified in operation 1003. It is contemplated that the operations of method 1000 may incorporate any of the other features disclosed herein. Various operations in the method 1000 may be omitted or rearranged, according to certain embodiments.

Figure 11:
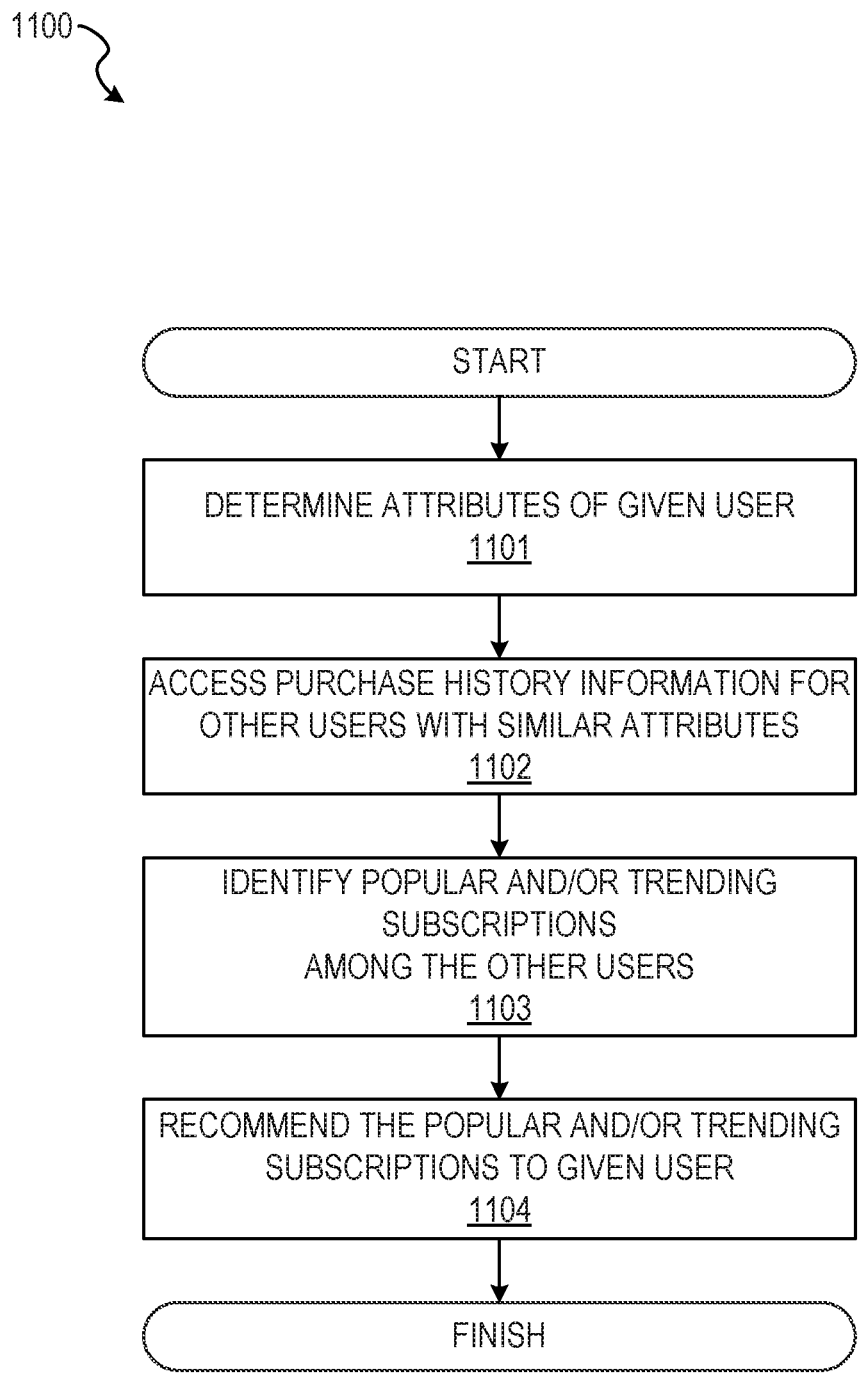
FIG. 11 is a flowchart illustrating an example method, according to various embodiments.

FIG. 11 is a flowchart illustrating an example method 1100, consistent with various embodiments described above. The method 1100 may be performed, at least in part, by, for example, the referral management system 200 illustrated in FIG. 2 (or an apparatus having similar modules, such as one or more client machines 110, 112 or application servers 118). In operation 1101, the referral management system 200 identifies attributes (e.g., age, location, interests, friends/connections, etc.) of a given user of a subscription-based marketplace, based on the profile data of that user on the subscription-based marketplace managed by the referral management system 200, or the profile data of that user on linked social network accounts (e.g., FACEBOOK®, LINKEDIN®, TWITTER®, etc.). In operation 1102, the referral management system 200 identifies other users that have similar attributes to those identified in operation 1101, and accesses subscription purchase history information for these other users that identifies the subscriptions they have purchased. In operation 1103, the referral management system 200 identifies popular and/or trending subscriptions identified in the subscription purchase history information accessed in operation 1102. In operation 1104, the referral management system 200 recommends the popular and/or trending subscription identified in operation 1103 to the given user (e.g., via the UI 202 in FIG. 2). It is contemplated that the operations of method 1100 may incorporate any of the other features disclosed herein. Various operations in the method 1100 may be omitted or rearranged, according to certain embodiments.

Figure 12:
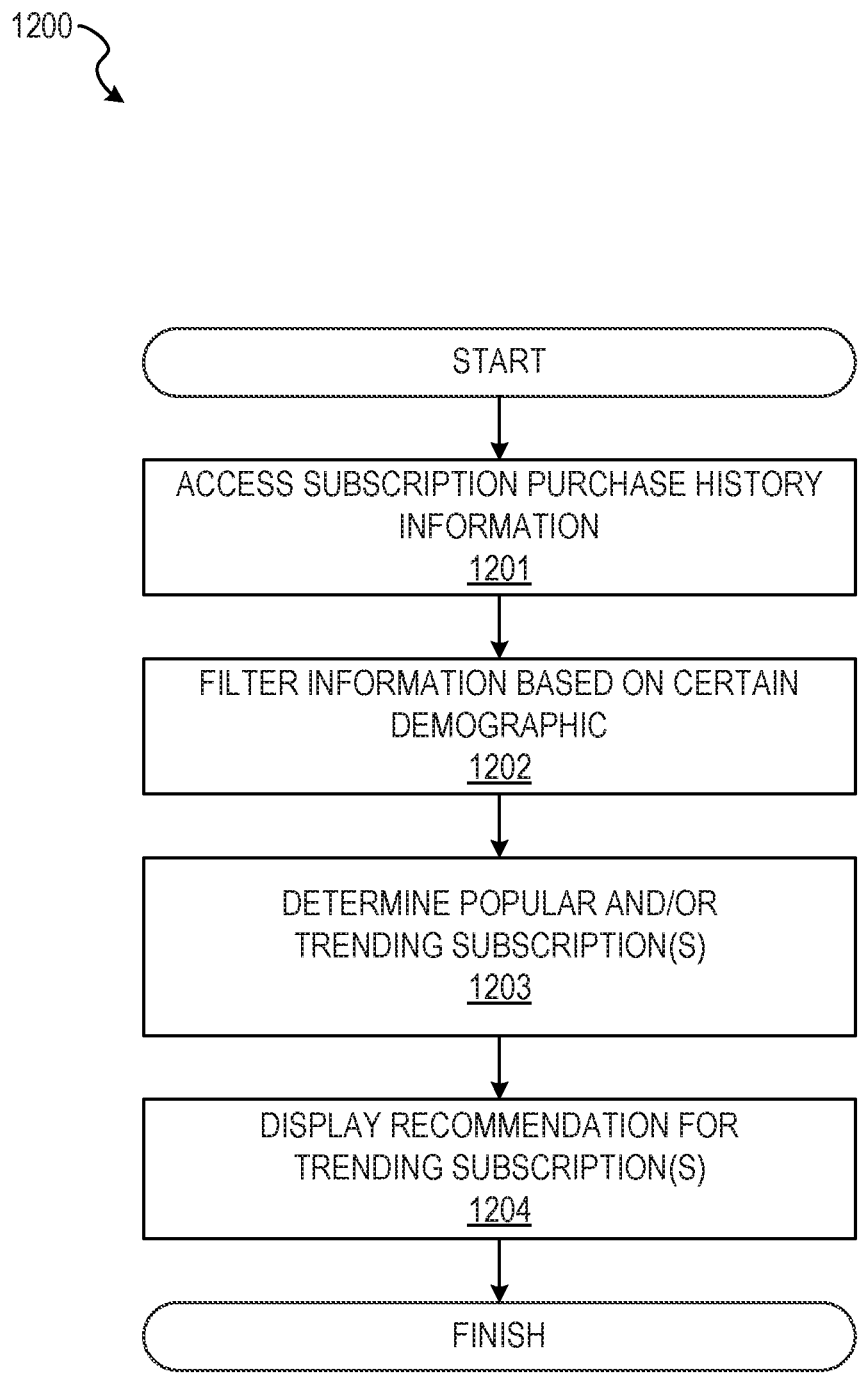
FIG. 12 is a flowchart illustrating an example method, according to various embodiments.

FIG. 12 is a flowchart illustrating an example method 1200, consistent with various embodiments described above. The method 1200 may be performed, at least in part, by, for example, the referral management system 200 illustrated in FIG. 2 (or an apparatus having similar modules, such as one or more client machines 110, 112 or application servers 118). In operation 1201, the referral management system 200 accesses subscription purchase history information identifying a history of subscription purchases on the subscription-based marketplace managed by the referral management system 200. In operation 1202, the referral management system 200 filters the subscription purchase history information accessed in operation 1201 based on a certain demographic (e.g., age, geography, subscription type such as genre, topic, etc.). In other words, the referral management system 200 identifies a history of subscription purchases by users of a certain age, geographic location, or by a certain type of subscription, etc. In operation 1203, the referral management system 200 determines popular and/or trending subscriptions in the filtered information output in operation 1202 (e.g., subscriptions that have a relatively high number of purchases or a relatively high click through rate (CTR) during a given time period). In operation 1204, the referral management system 200 displays recommendations for the trending and/or popular subscriptions determined in operation 1203. For example, such recommendations may be displayed in the UI 202 illustrated in FIG. 2. It is contemplated that the operations of method 1200 may incorporate any of the other features disclosed herein. Various operations in the method 1200 may be omitted or rearranged, according to certain embodiments.

According to various example embodiments, the referral management system 200 may provide a Channel Forensics/Data collection feature configured to ask users to submit certain user data during their onboarding process, and continue to collect data throughout user engagement with the referral management system 200. For example, the referral management system 200 may ask users about the characteristics of the members of their network (e.g. user polls to discover who is interested in what). As another example the referral management system 200 may scrape data from connected social networks (e.g. keyword search for "new phone"). As another example, the referral management system 200 may look at "get" requests that contains device type/ID upon echo-back from email opened by users.

Figure 13:
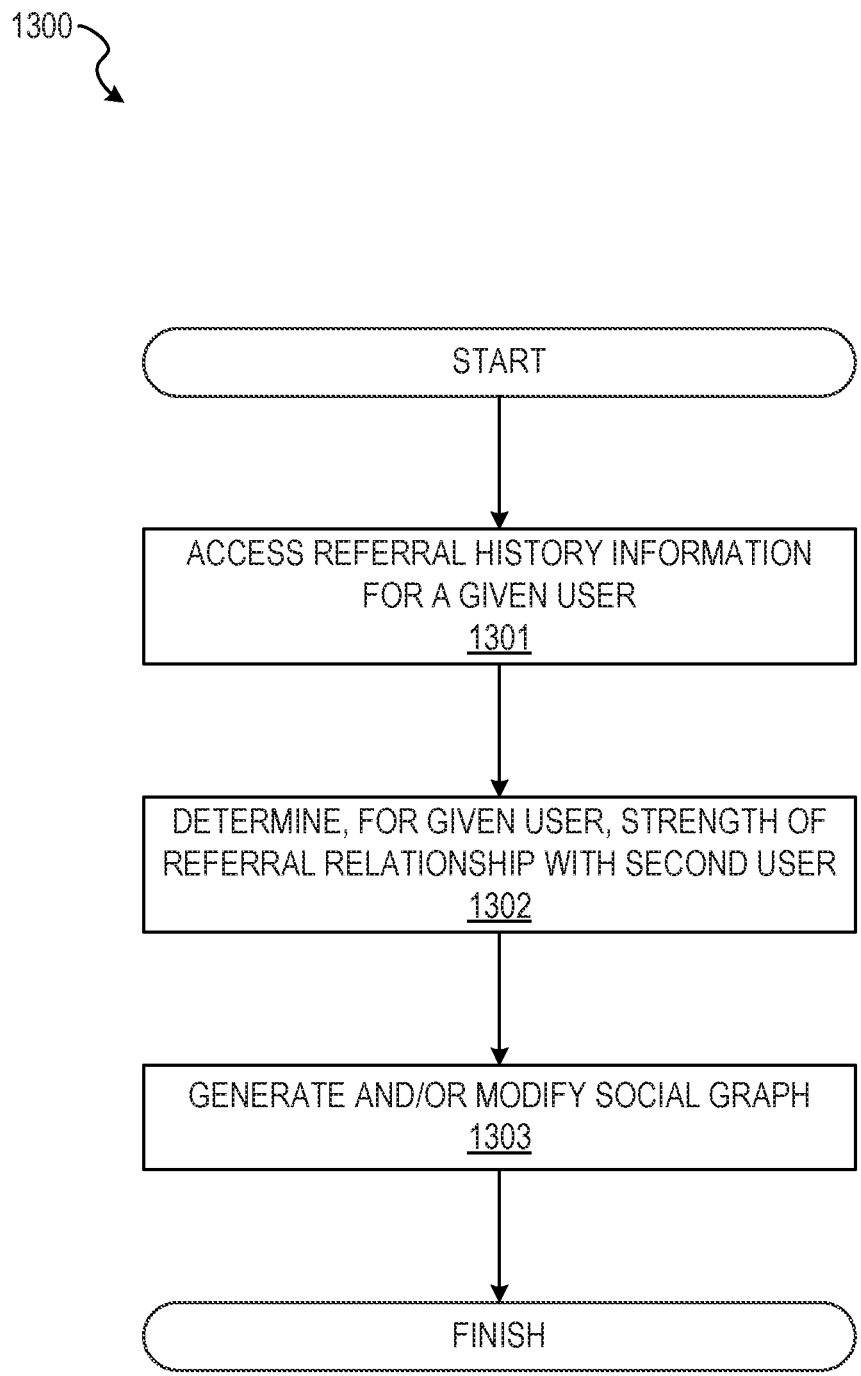
FIG. 13 is a flowchart illustrating an example method, according to various embodiments.

According to various example embodiments, the referral management system 200 is configured to generate a social graph based on purchasing habits of users of the referral management system 200. For example, FIG. 13 is a flowchart illustrating an example method 1300, consistent with various embodiments described above. The method 1300 may be performed, at least in part, by, for example, the referral management system 200 illustrated in FIG. 2 (or an apparatus having similar modules, such as one or more client machines 110, 112 or application servers 118). In operation 1301, the referral management system 200 accesses referral history information for a given user that indicates what subscriptions have been referred by that user to other users, when such referrals have taken place, and whether such referrals have been accepted by the referees. In operation 1302, the referral management system 200 determines, for the given user, a strength of a relationship (e.g., a referral relationship) between that user and a second user, based on the referral history information accessed in operation 1301. For example, if the referral history information indicates a high rate of acceptance by the second user of referrals from the first user, then the referral management system 200 may determine a strong referral relationship between the given user and the second user (which may increase in strength if the acceptance rate is based on a larger number of referrals). On the other hand, if the referral history information indicates a low rate of acceptance by the second user of referrals from the first user, then the referral management system 200 may determine a weak referral relationship between the given user and the second user. Further, if the referral history information indicates no referral requests sent from the given user to the second user, then the referral management system 200 may determine an extremely weak referral relationship between the given user and the second user. In some embodiments, the strength of the relationship between the given user and the second user may be represented by a numerical value or weight generated by the referral management system 200. In operation 1303, the referral management system 200 generates or modifies a social graph, based on the relationship strengths determined in operation 1302. For example, the social graph may include a plurality of nodes representing a plurality of users of the subscription-based marketplace managed by the referral management system 200, including nodes corresponding to a given user and a second user. Moreover, the social graph may include edges between nodes indicating a strength of the relationship between the users corresponding to those nodes. Thus, the referral management system 200 may modify a weight of an edge between nodes, based on the weights or relationship strengths between the corresponding users as calculated in operation 1302. It is contemplated that the operations of method 1300 may incorporate any of the other features disclosed herein. Various operations in the method 1300 may be omitted or rearranged, according to certain embodiments.

In some embodiments, the referral management system 200 may utilize the generated/modified social graph to provide recommendations to a given user as to who they should refer subscriptions to. For example, the referral management system 200 may identify other users with the strongest relationship with the given user, and may recommend that the given user refer subscriptions to these friends (e.g., via the UI 301 illustrated in FIG. 3), based on the fact that these friends are more likely to accept the referral request.

According to various example embodiments, the referral management system 200 may include a paid promotions module configured to display a supplier-facing dashboard where suppliers or subscription providers may pay to host content, or to drive increased purchases for their own subscription offers through incentives, funded discounts, and promotions through the subscription-based marketplace. For example, the referral management system 200 may display a user interface for suppliers allowing them to create or modify a subscription offer by uploading an image and description associated with the subscription offer, setting a monthly price for the subscription offer, setting a start and end date for the subscription offer, setting a credit amount for referrers (e.g., referrers receive 10% of the value of $1^{st}$ degree referrals by the referrer), set variable incentives (e.g., if a referrer refers more than X subscriptions that are purchased, the referrer receives a bonus of Y or an increased credit amount of Z, etc.), discount/promotions (e.g., if more than 5000 subscriptions are sold, the cost of each subscription will be reduced to a new value), and so on. Further, the referral management system 200 may display a user interface to suppliers enabling them to configure group buy settings (e.g., if X1 number of users buy the subscription, then the price is Y1, if X2 number of users buy the subscription, then the price is Y2, etc.). Moreover, the supplier may select from predefined types of promotions (e.g., where the user-selectable values described above are predefined). Thus, suppliers are given access to specify promotions through a dashboard, and to control different promotional aspects for their services based on different timing and scale. In some embodiments, the referral management system 200 may enable integration with existing payment platforms. For example, the referral management system 200 may provide an API to existing platforms (e.g., one-touch referral on a provider's website).

According to various example embodiments, the referral management system 200 may provide dynamic/elastic discounting of subscriptions. For example, because there is a savings on user acquisition costs, and that savings is variable depending on how successful the service is (from the point of view of providers) at any given time, the discount passed on to users could change dynamically, in order to maximize revenue and user engagement. For example, if a given subscription offer is particularly successful, the benefit to the provider (e.g., as measured in terms of revenue), may be utilized to calculate a discount for users.

Figure 15:
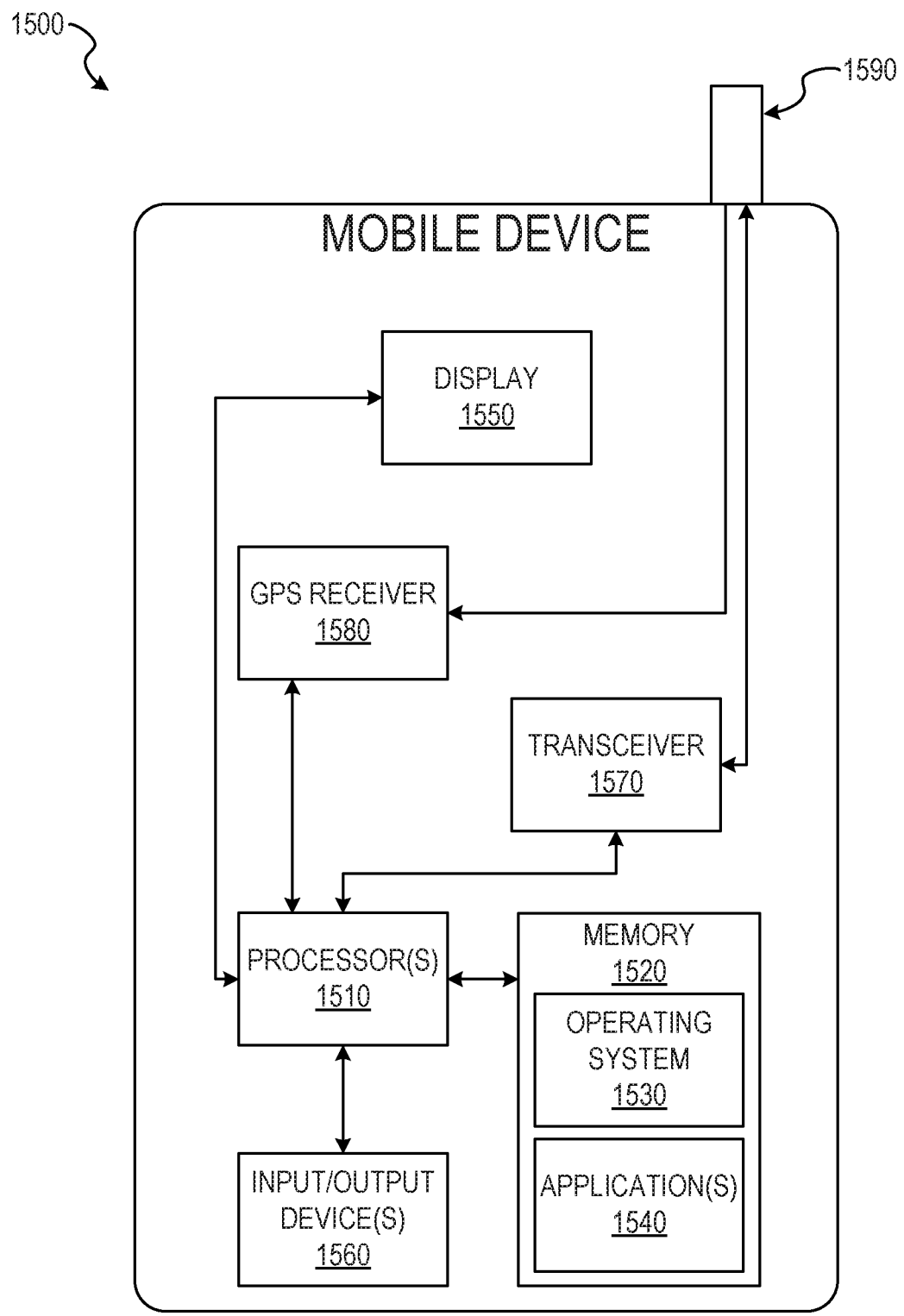
FIG. 15 illustrates an example mobile device, according to various embodiments.

FIG. 15 is a block diagram illustrating the mobile device 1500, according to an example embodiment. The mobile device 1500 may correspond to, for example, one or more client machines 110, 112 or application servers 118. One or more of the modules of the system 200 illustrated in FIG. 2 may be implemented on or executed by the mobile device 1500. The mobile device 1500 may include a processor 1510. The processor 1510 may be any of a variety of different types of commercially available processors suitable for mobile devices 1500 (for example, an XScale architecture microprocessor, a Microprocessor without Interlocked Pipeline Stages (MIPS) architecture processor, or another type of processor). A memory 1520, such as a Random Access Memory (RAM), a Flash memory, or other type of memory, is typically accessible to the processor 1510. The memory 1520 may be adapted to store an operating system (OS) 1530, as well as application programs 1540, such as a mobile location enabled application that may provide location based services to a user. The processor 1510 may be coupled, either directly or via appropriate intermediary hardware, to a display 1550 and to one or more input/output (I/O) devices 1560, such as a keypad, a touch panel sensor, a microphone, and the like. Similarly, in some embodiments, the processor 1510 may be coupled to a transceiver 1570 that interfaces with an antenna 1590. The transceiver 1570 may be configured to both transmit and receive cellular network signals, wireless data signals, or other types of signals via the antenna 1590, depending on the nature of the mobile device 1500. Further, in some configurations, a GPS receiver 1580 may also make use of the antenna 1590 to receive GPS signals.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network 104 (e.g., the Internet) and via one or more appropriate interfaces (e.g., Application Program Interfaces (APIs).)

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network 104.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network 104. The relationship of client and server arises by virtue of computer programs running on the respective computers and having a client-server relationship to each other. In embodiments deploying a programmable computing system, it will be appreciated that that both hardware and software architectures can be considered. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 16:
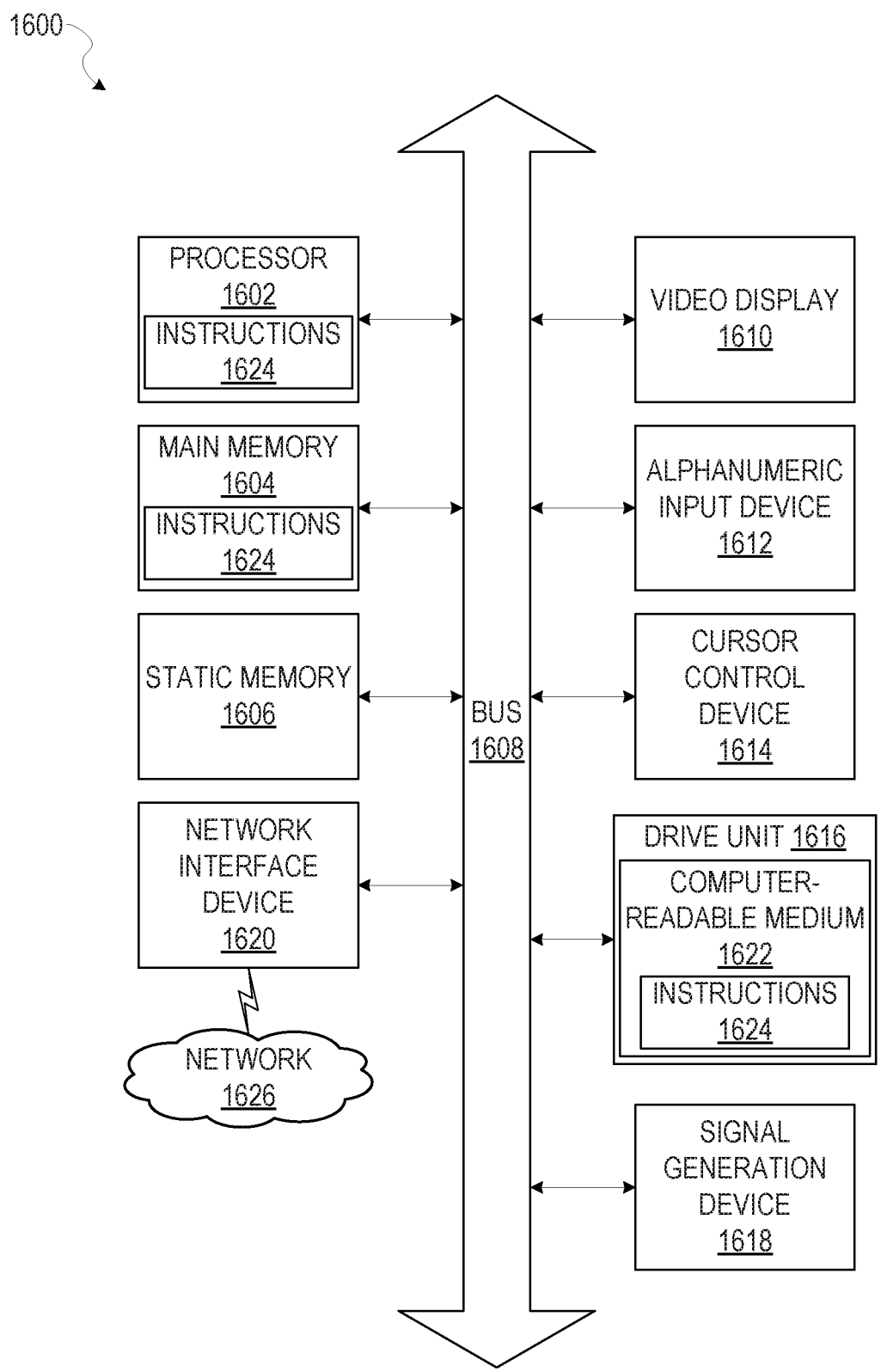
FIG. 16 is a diagrammatic representation of a machine in the example form of a computer system within which a set of instructions, for causing the machine to perform any one or more of the methodologies discussed herein, may be executed.

FIG. 16 is a block diagram of a machine in the example form of a computer system 1600 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine 110, 112 in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., a central processing unit (CPU), a graphics processing unit (GPU) or both), a main memory 1604 and a static memory 1606, which communicate with each other via a bus 1608. The computer system 1600 may further include a video display unit 1610 (e.g., a liquid crystal display (LCD) or a cathode ray tube (CRT)). The computer system 1600 also includes an alphanumeric input device 1612 (e.g., a keyboard or a touch-sensitive display screen), a user interface (UI) navigation device 1614 (e.g., a mouse), a disk drive unit 1616, a signal generation device 1618 (e.g., a speaker) and a network interface device 1620.

The disk drive unit 1616 includes a machine-readable medium 1622 on which is stored one or more sets of instructions and data structures (e.g., software) 1624 embodying or utilized by any one or more of the methodologies or functions described herein. The instructions 1624 may also reside, completely or at least partially, within the main memory 1604 and/or within the processor 1602 during execution thereof by the computer system 1600, the main memory 1604 and the processor 1602 also constituting machine-readable media 1622.

While the machine-readable medium 1622 is shown, in an example embodiment, to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1624 may further be transmitted or received over a communications network 1626 using a transmission medium. The instructions 1624 may be transmitted using the network interface device 1620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi, LTE, and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Figure 17:
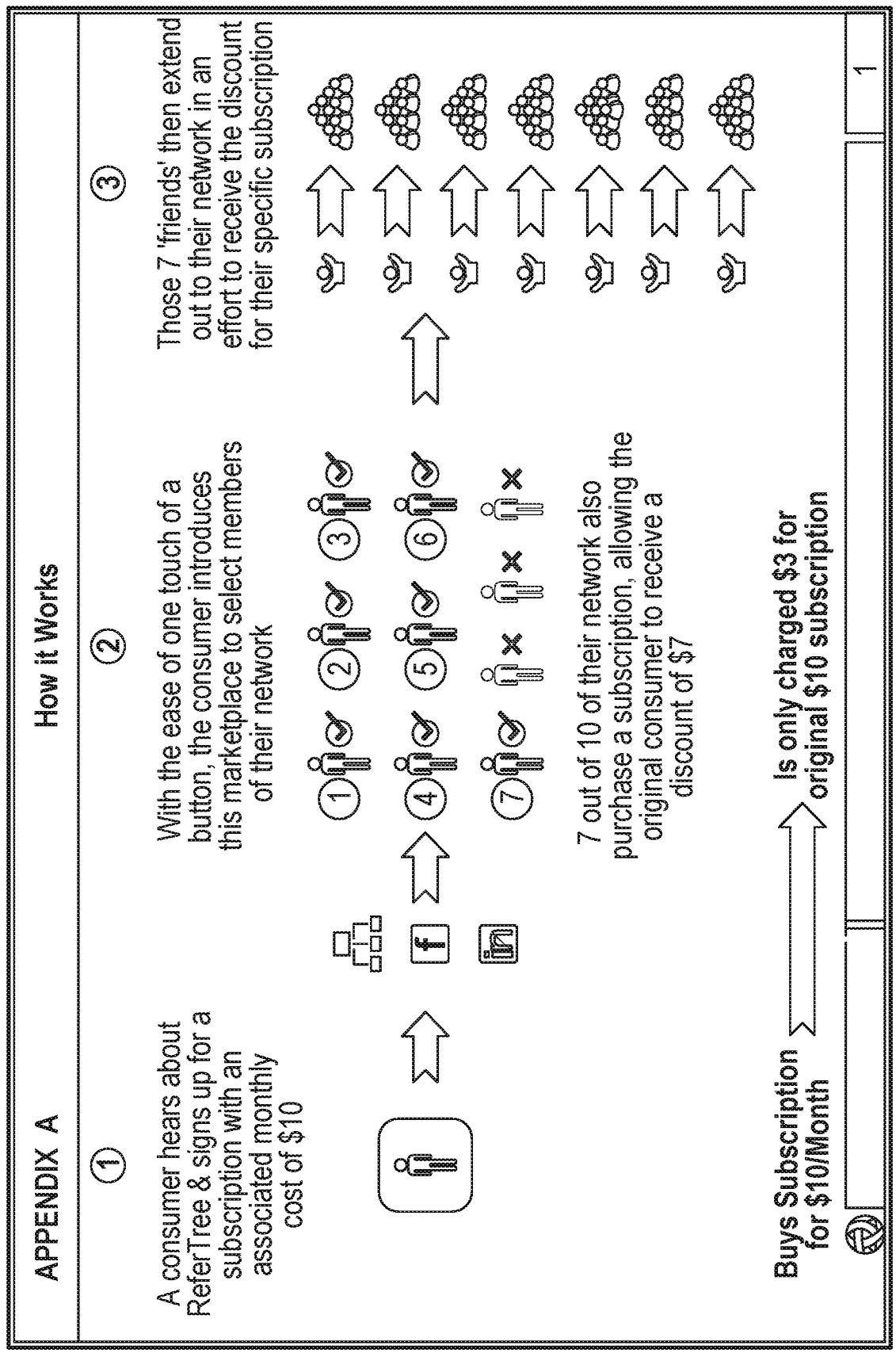
FIG. 17 is a diagram depicting various example aspects of the referral management system, according to various example embodiments.
Figure 18:
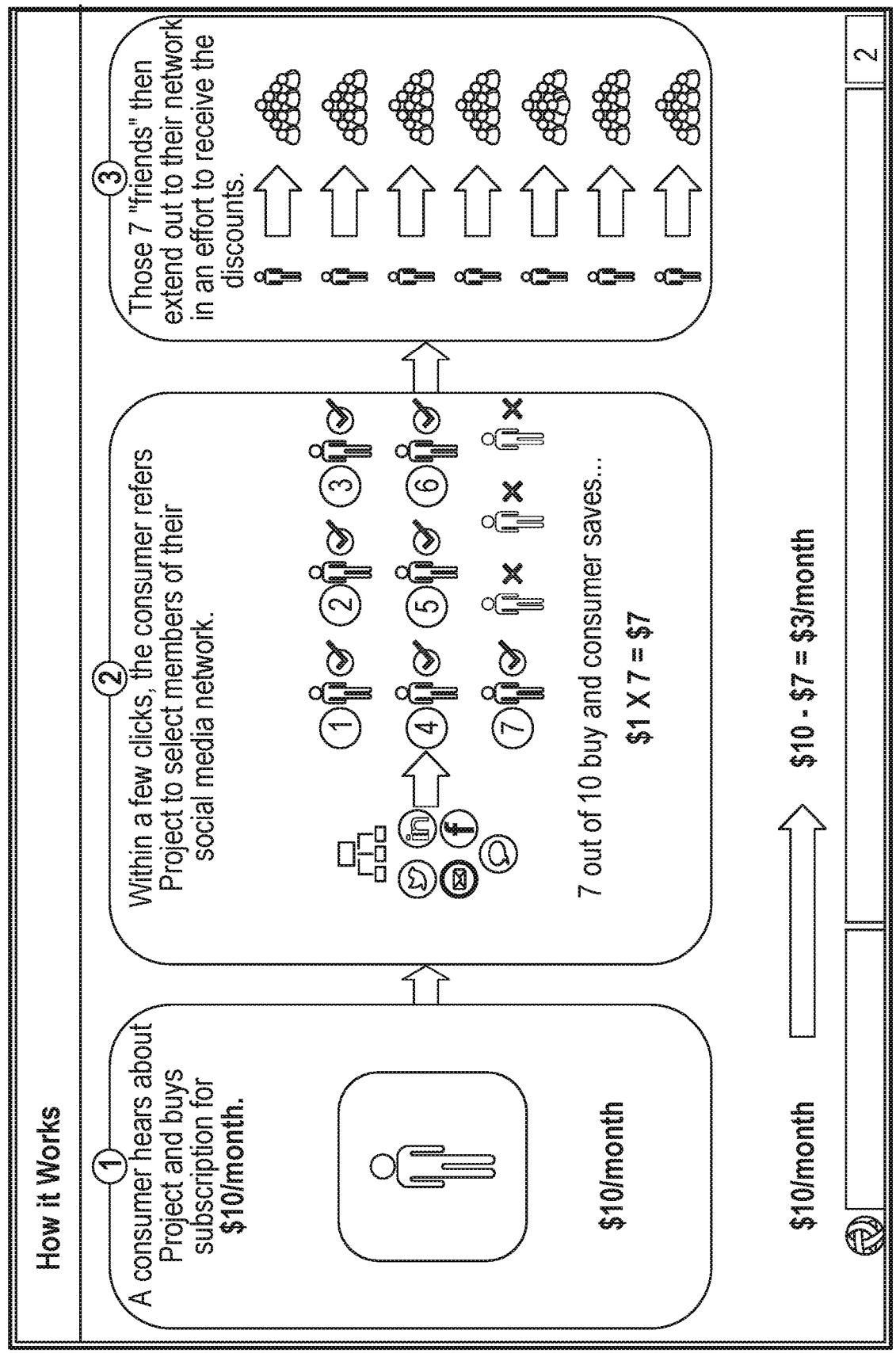
FIG. 18 is a diagram depicting various example aspects of the referral management system, according to various example embodiments.
Figure 19:
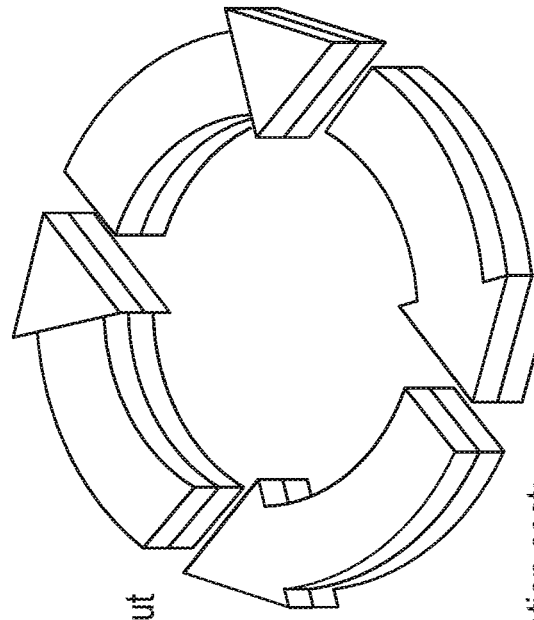
FIG. 19 is a diagram depicting various example aspects of the referral management system, according to various example embodiments.

FIGS. 17-19 are diagrams depicting various example aspects of the referral management system 200, consistent with various embodiments described above. For example, the diagrams of FIGS. 17-19 illustrate concepts associated with the viral aspect of referring subscriptions to contact members of a particular member of social networking service. In a specific example, a single instance of a referral can trigger a viral sharing of the referral across various social networking services.

Figure 20:
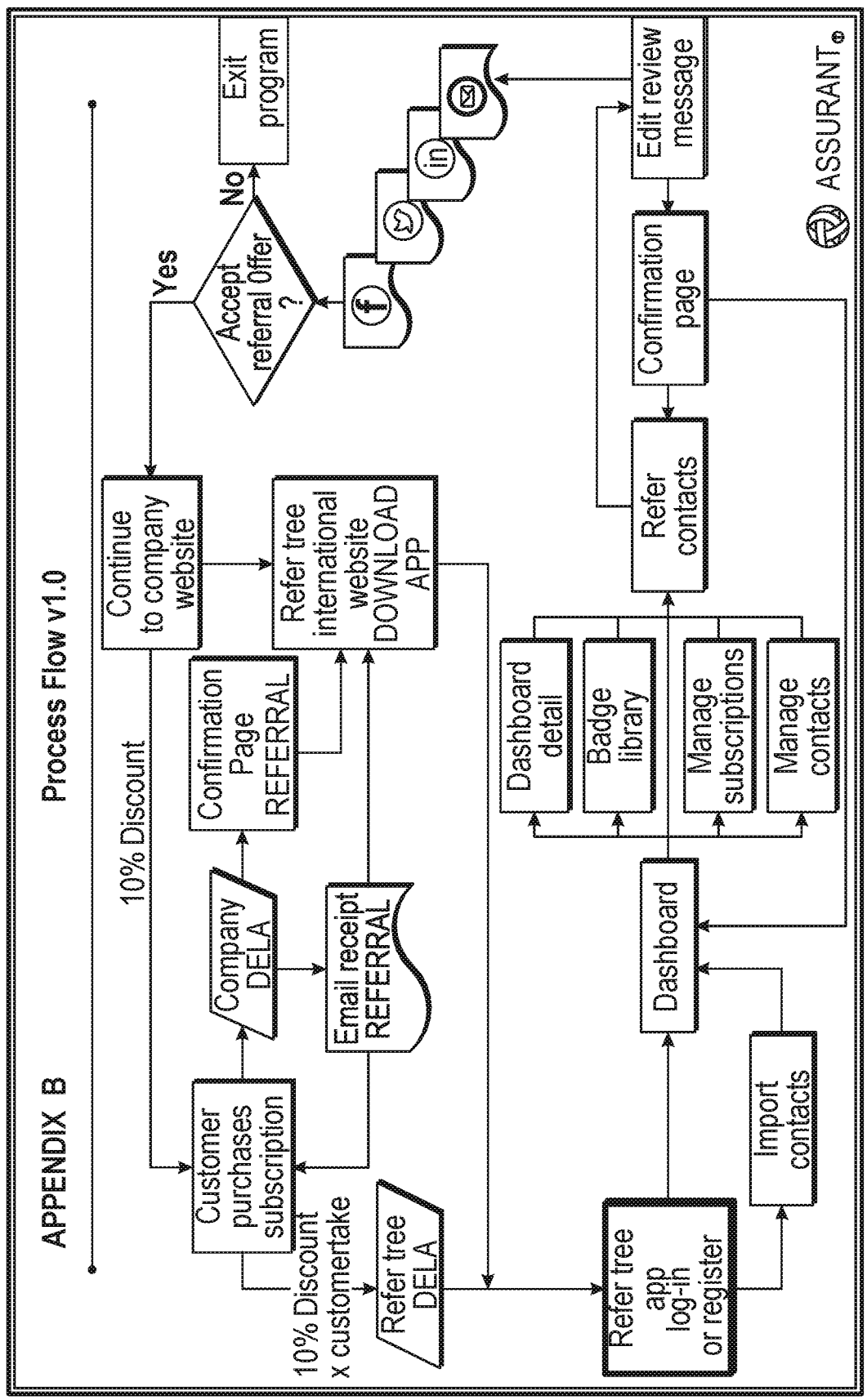
FIG. 20 is a flow diagram depicting various example aspects of the referral management system, according to various example embodiments.
Figure 21:
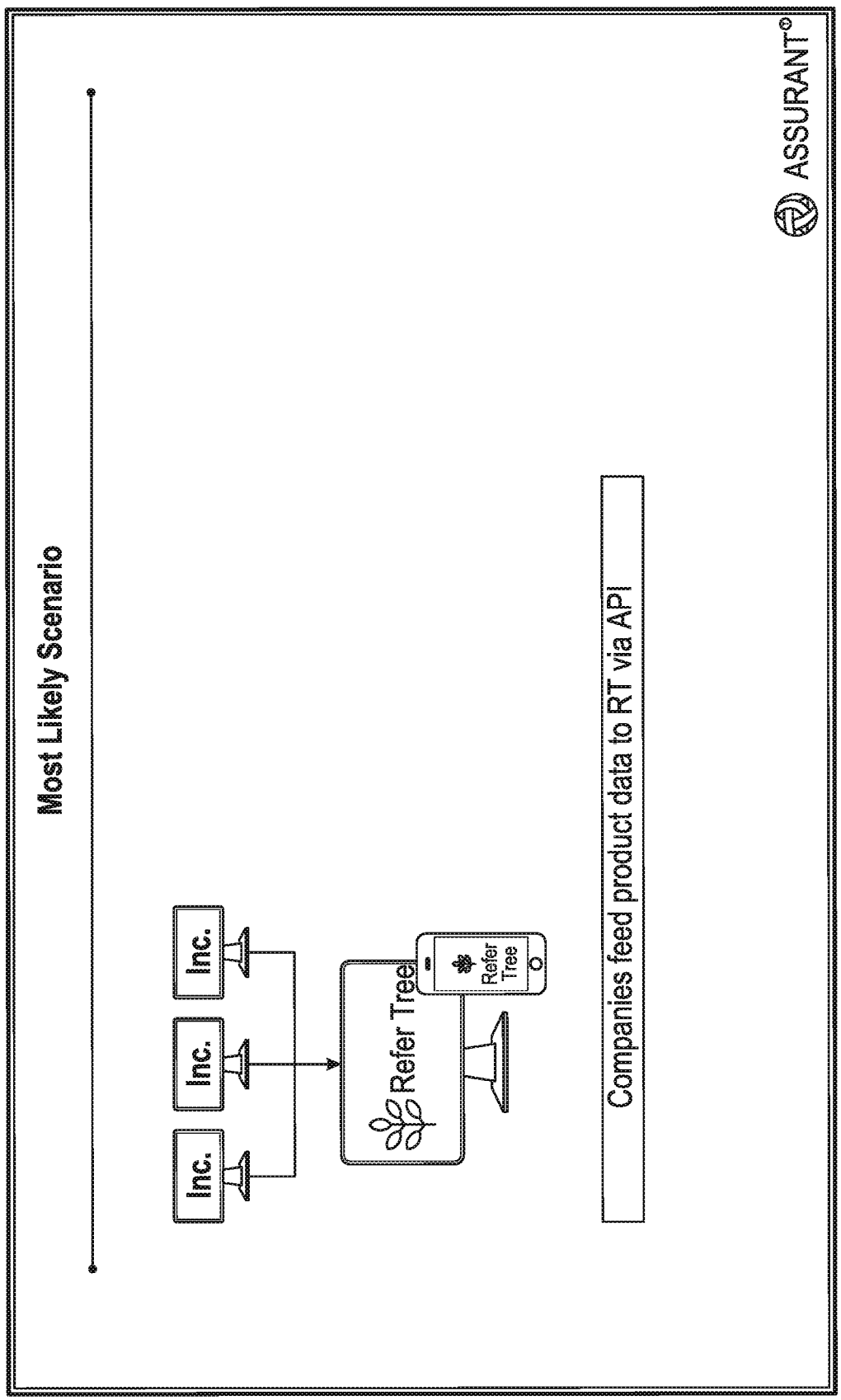
FIG. 21 is a diagram depicting various example aspects of the referral management system, according to various example embodiments.
Figure 22:
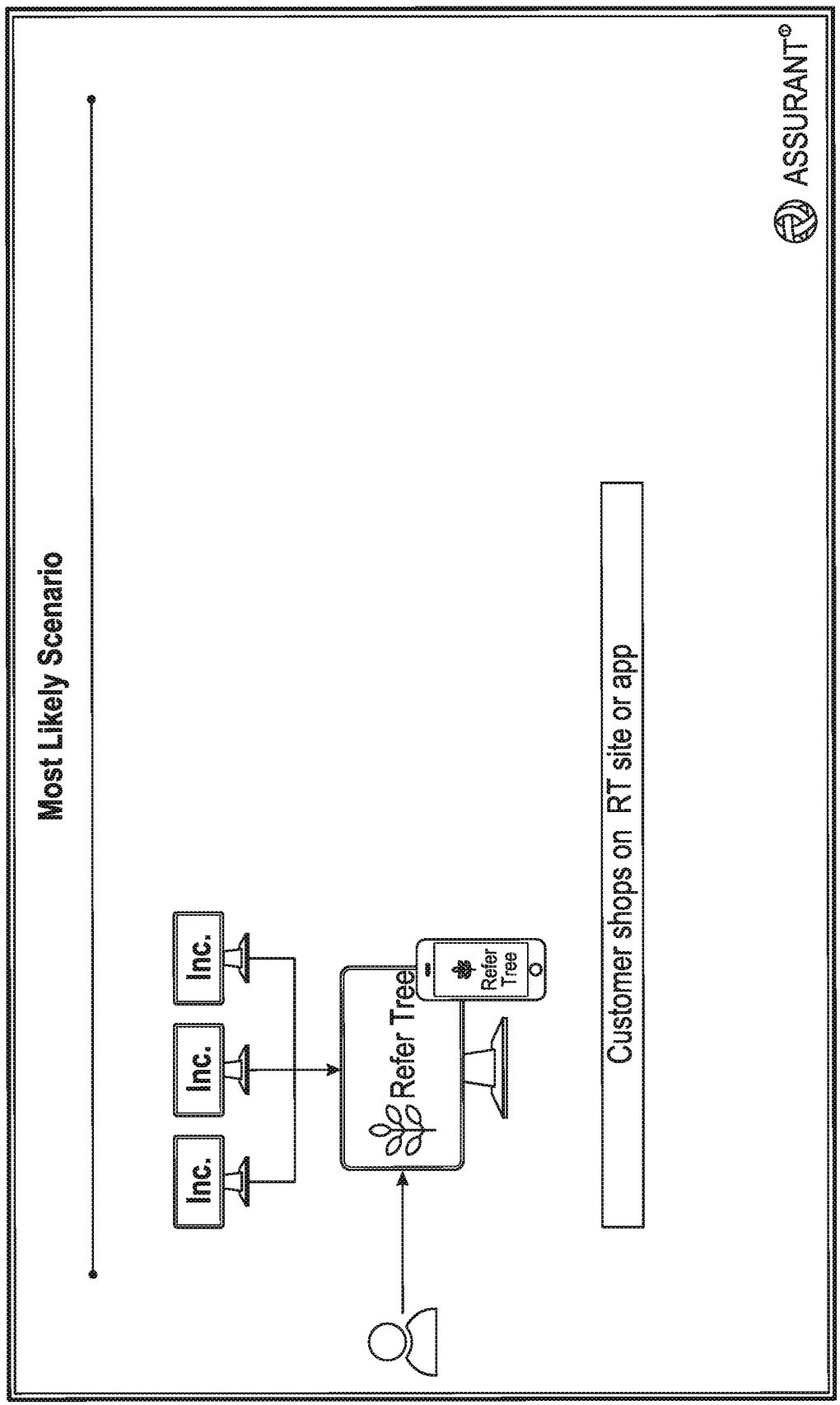
FIG. 22 is a diagram depicting various example aspects of the referral management system, according to various example embodiments.
Figure 23:
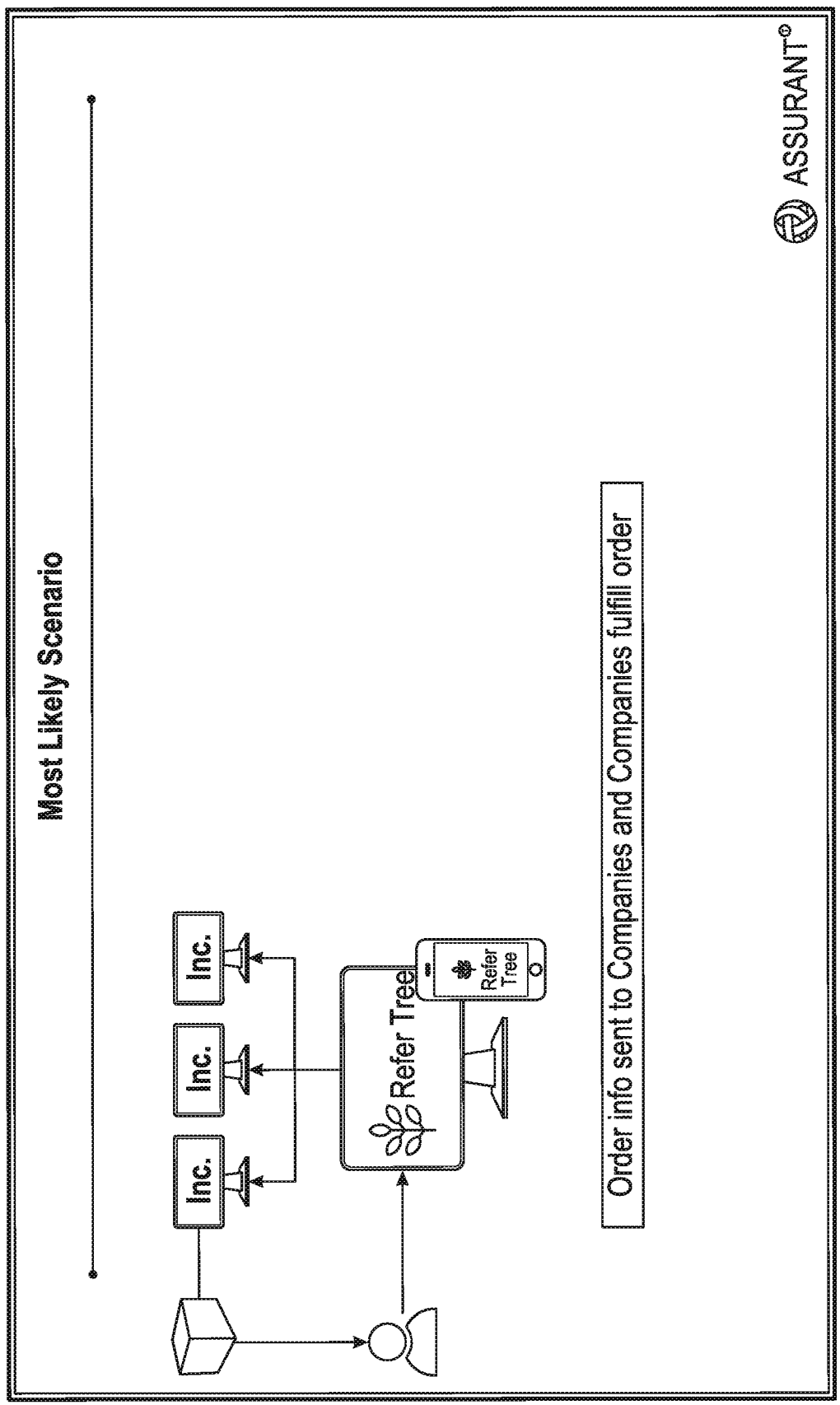
FIG. 23 is a diagram depicting various example aspects of the referral management system, according to various example embodiments.
Figure 24:
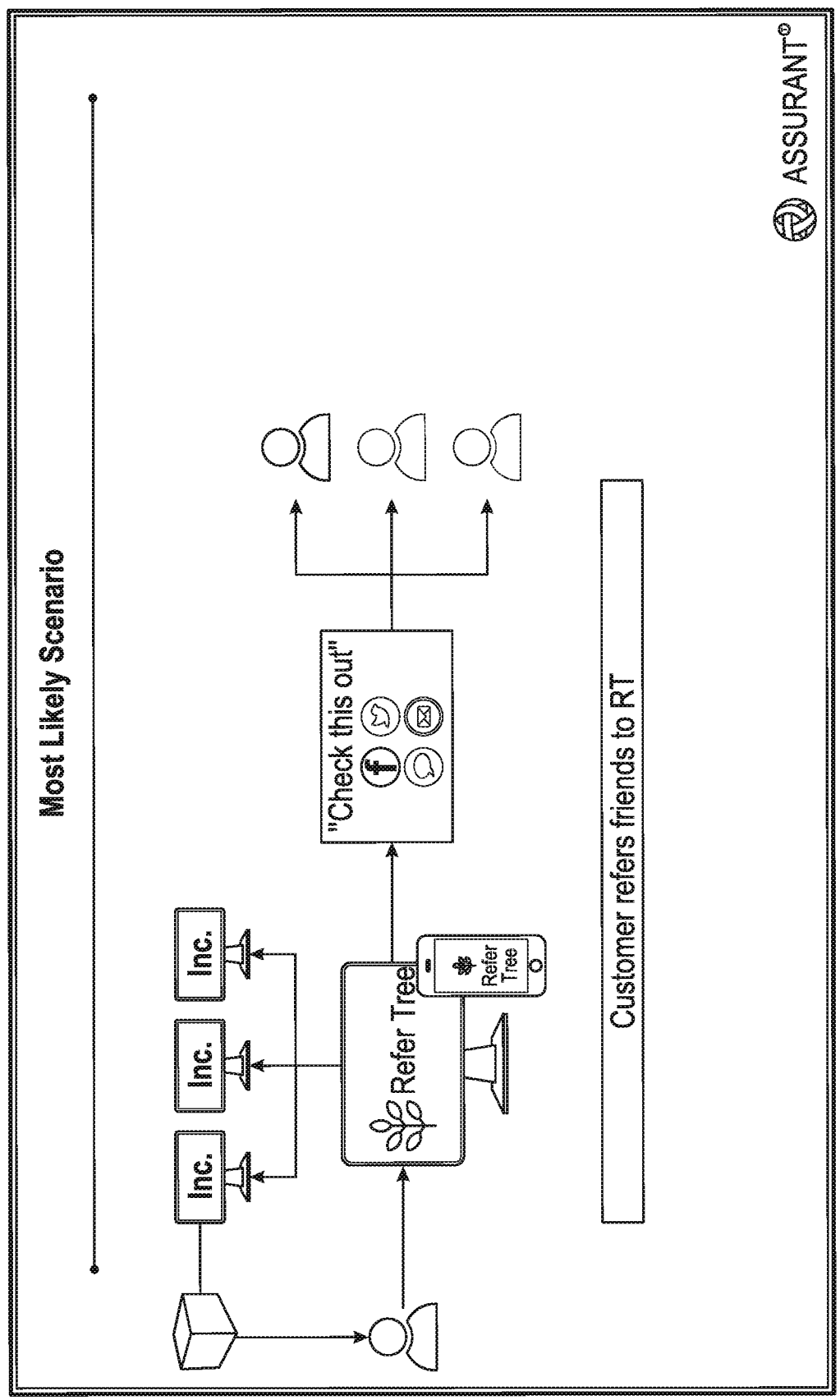
FIG. 24 is a diagram depicting various example aspects of the referral management system, according to various example embodiments.
Figure 25:
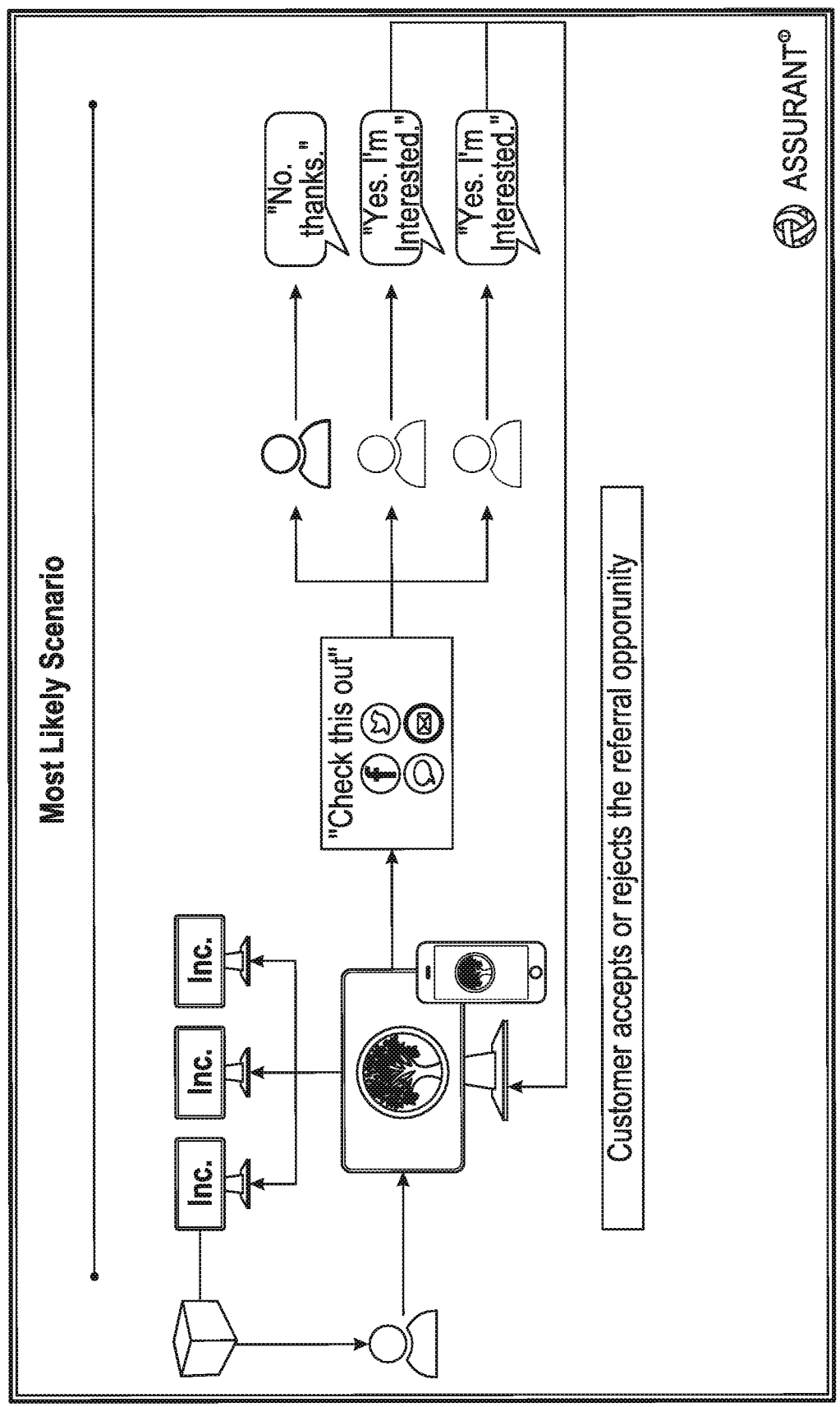
FIG. 25 is a diagram depicting various example aspects of the referral management system, according to various example embodiments.
Figure 26:
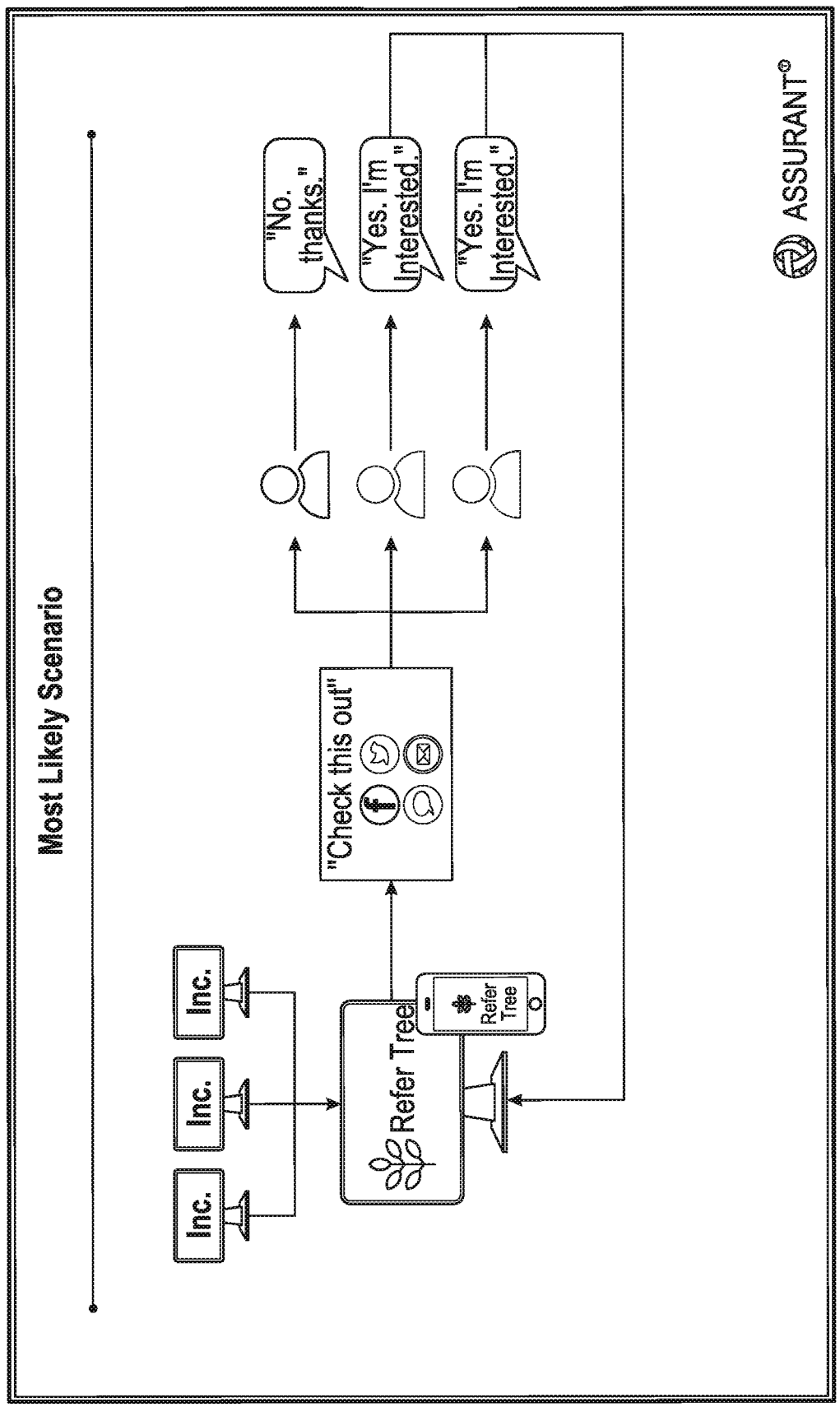
FIG. 26 is a diagram depicting various example aspects of the referral management system, according to various example embodiments.
Figure 27:
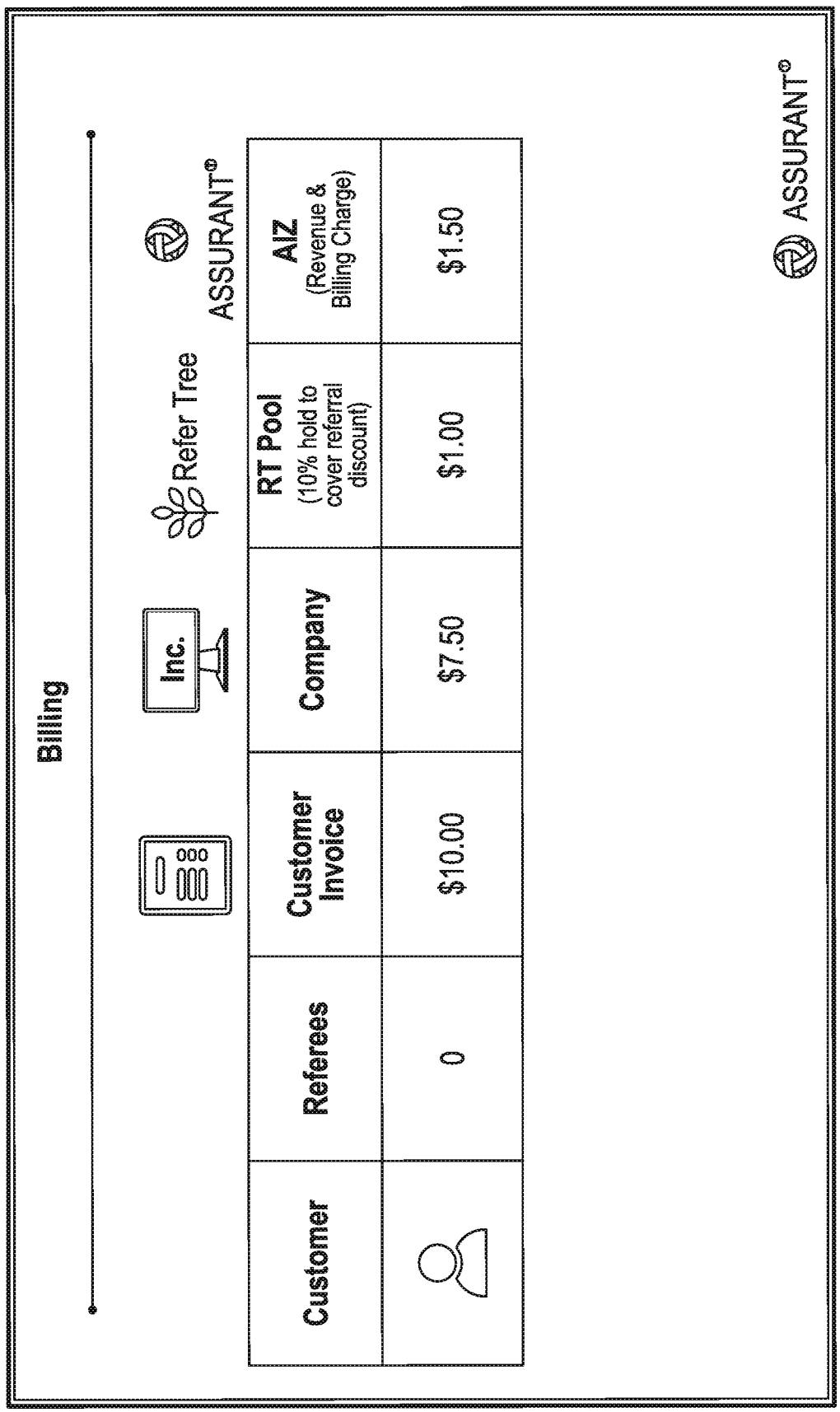
FIG. 27 is a diagram depicting various example aspects of the referral management system, according to various example embodiments.
Figure 28:
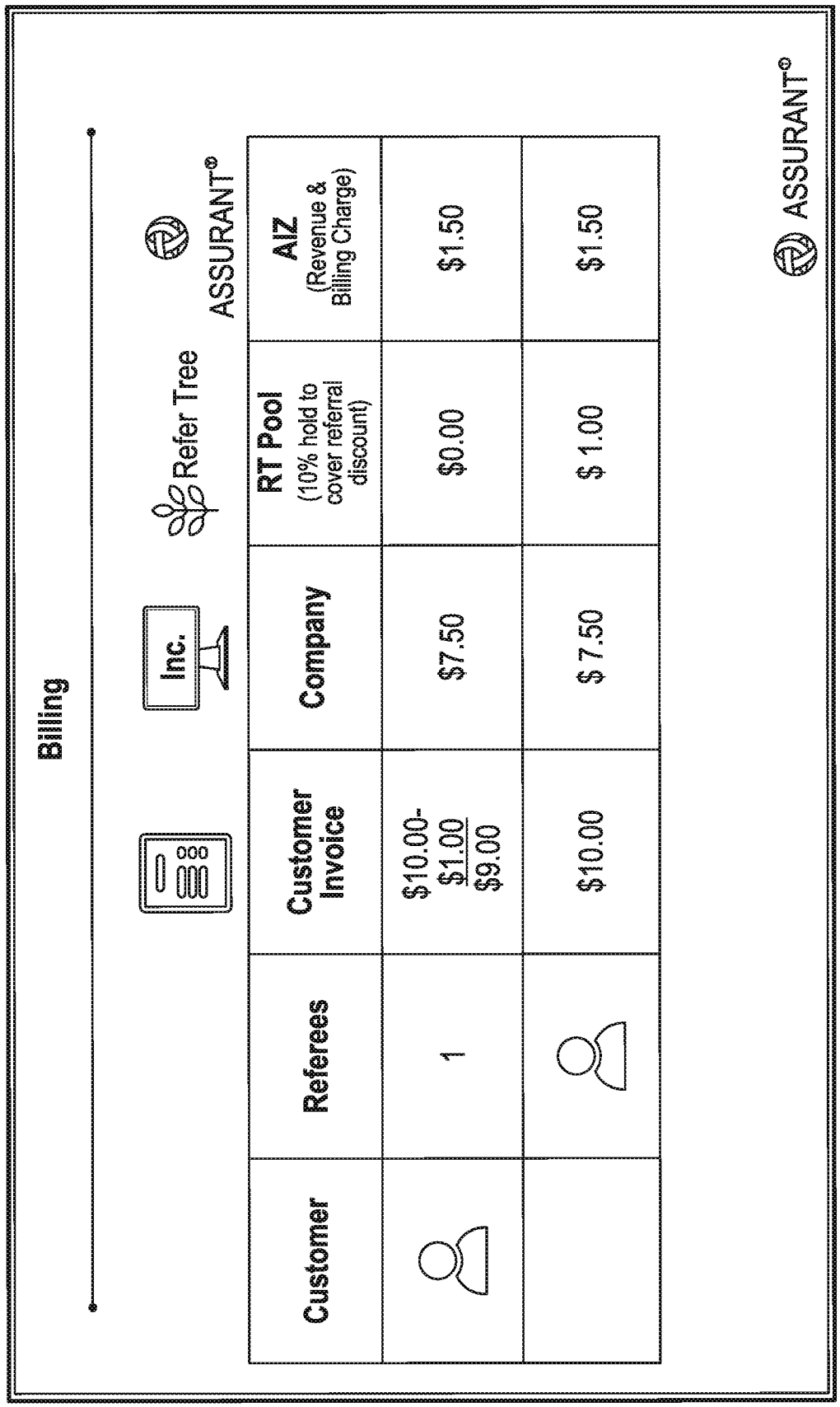
FIG. 28 is a diagram depicting various example aspects of the referral management system, according to various example embodiments.

FIG. 20 is a flow diagram depicting various example aspects of the referral management system 200, consistent with various embodiments described above. For example, the flow diagram of FIG. 20 shows an example process flow for a user of the referral management system 200.

FIGS. 21-28 are diagrams depicting various example aspects of the referral management system 200, consistent with various embodiments described above. For example, the diagrams of FIGS. 21-28 illustrate various user interactions with the referral management system 200.

Figure 29:
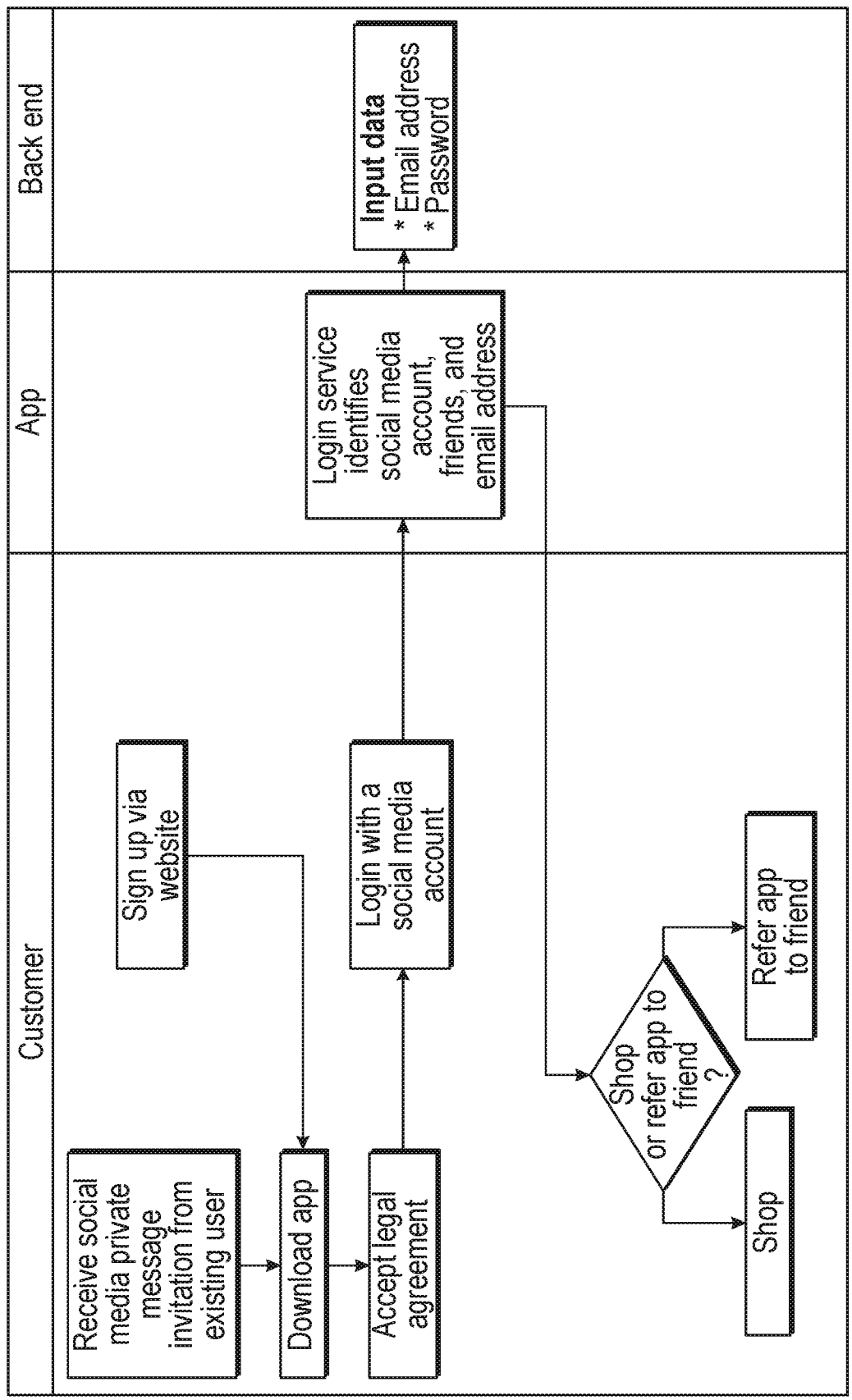
FIG. 29 is a flow diagram depicting various example aspects of the referral management system, according to various example embodiments.

FIG. 29 is a flow diagram depicting various example aspects of the referral management system 200, consistent with various embodiments described above. For example, the flow diagram of FIG. 29 illustrates a download, registration, and login process associated with the referral management system 200.

Figure 30A:
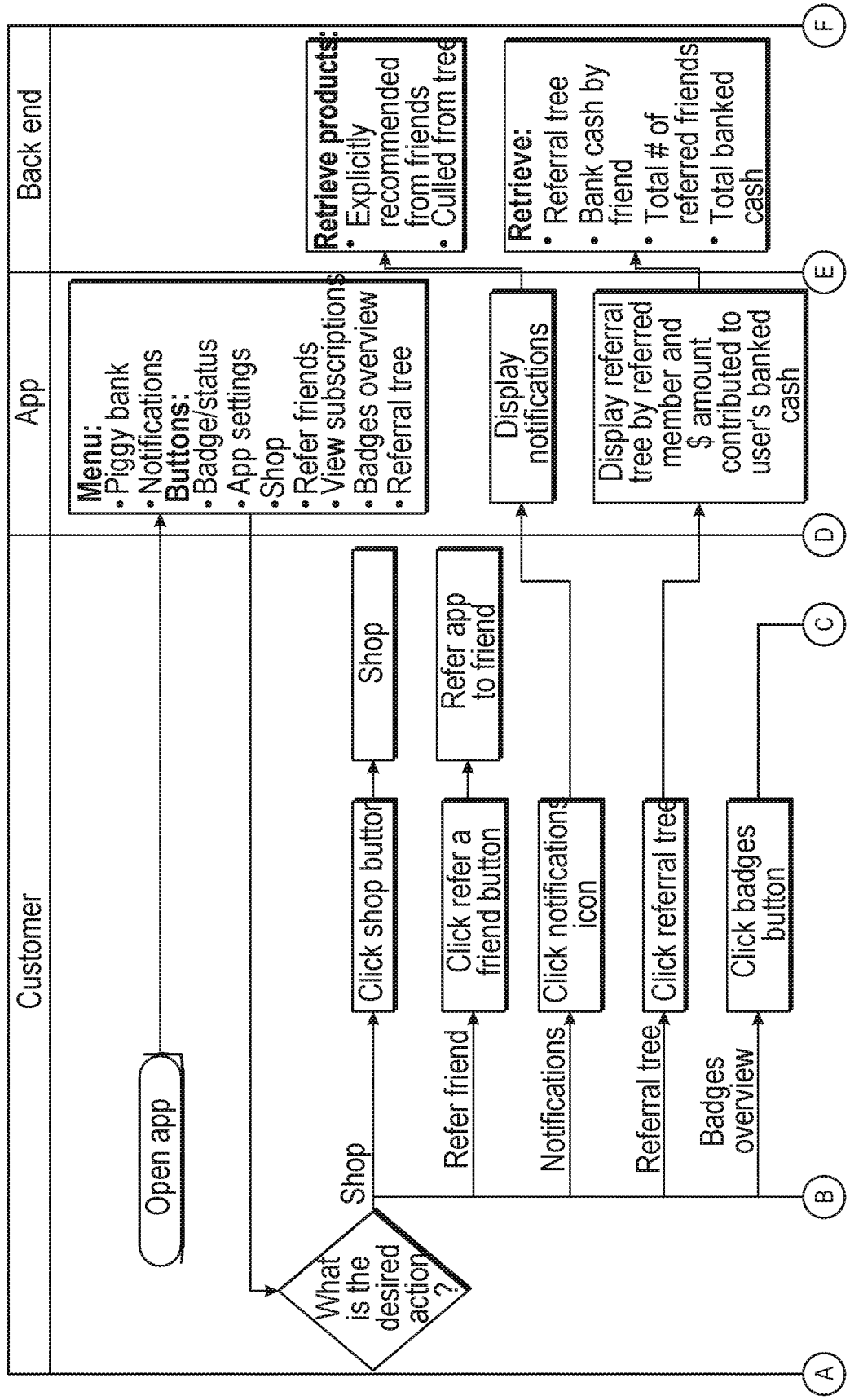
FIG. 30A is a flow diagram depicting various example aspects of the referral management system, according to various example embodiments.
Figure 30B:
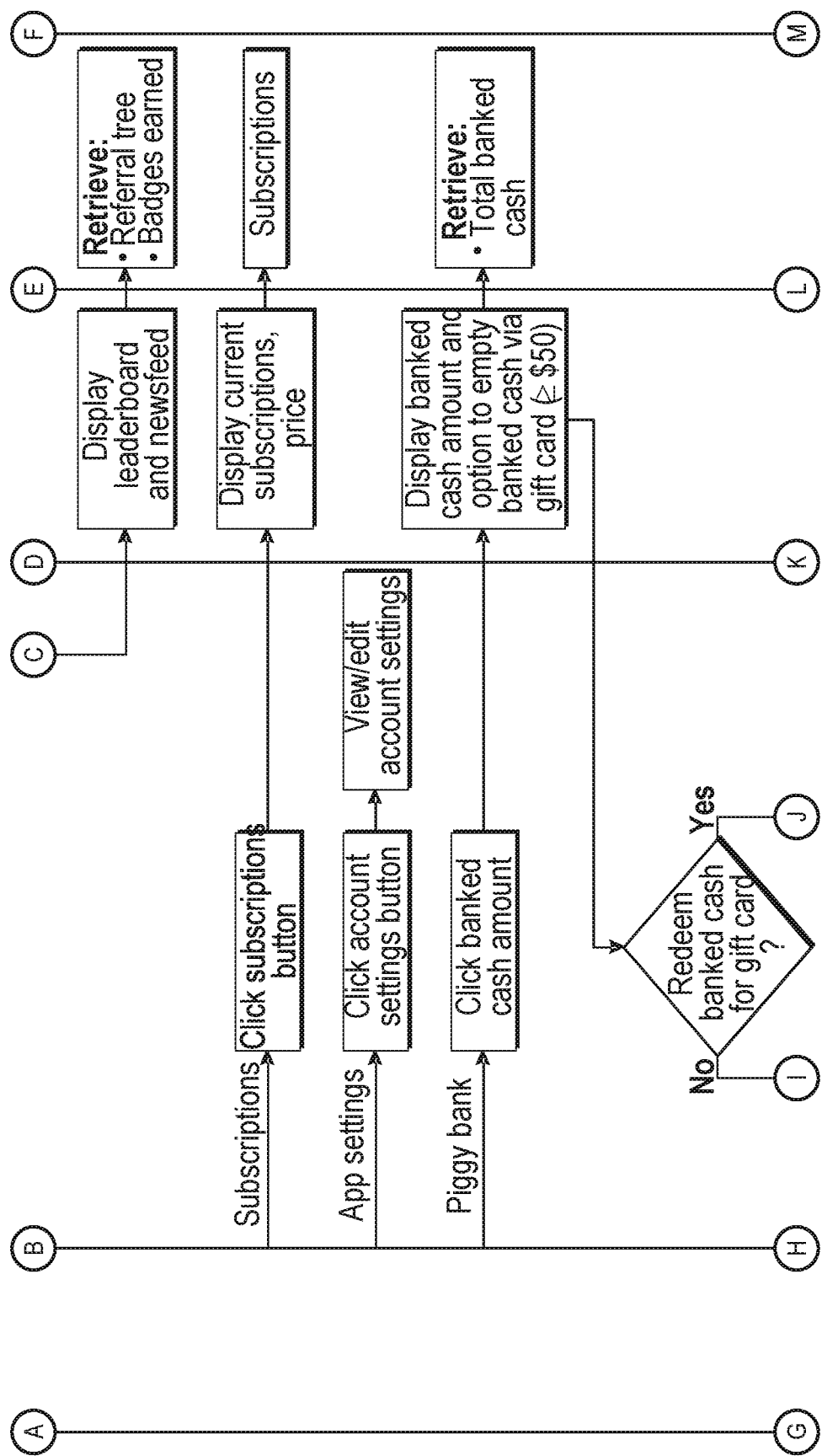
FIG. 30B is a flow diagram depicting various example aspects of the referral management system, according to various example embodiments.
Figure 30C:
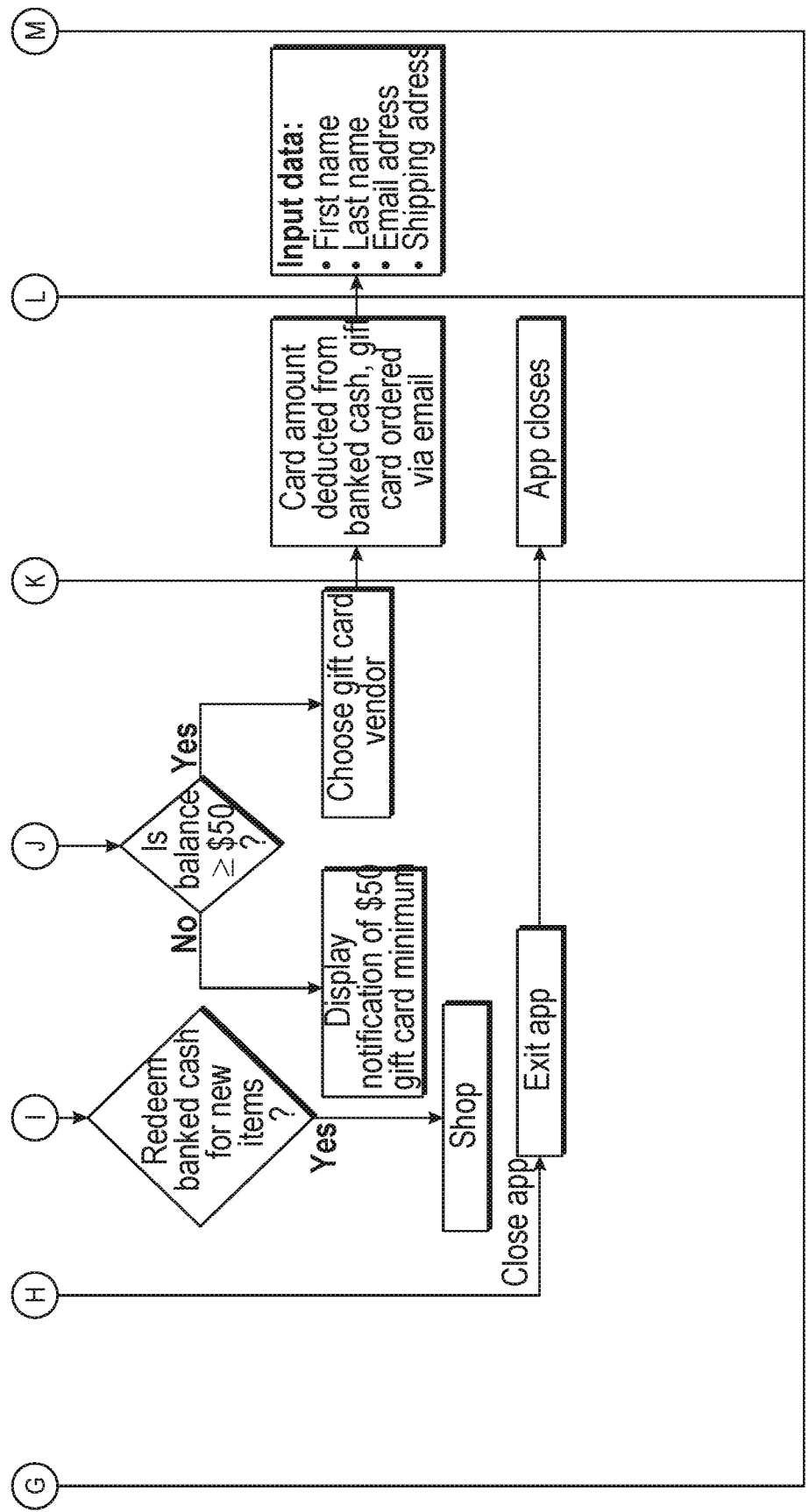
FIG. 30C is a flow diagram depicting various example aspects of the referral management system, according to various example embodiments.

FIGS. 30A, 30B, and 30C are a flow diagram depicting various example aspects of the referral management system 200, consistent with various embodiments described above. For example, the flow diagram of FIGS. 30A, 30B, and 30C illustrates various operations for referring a subscription via the referral management system 200.

Figure 31A:
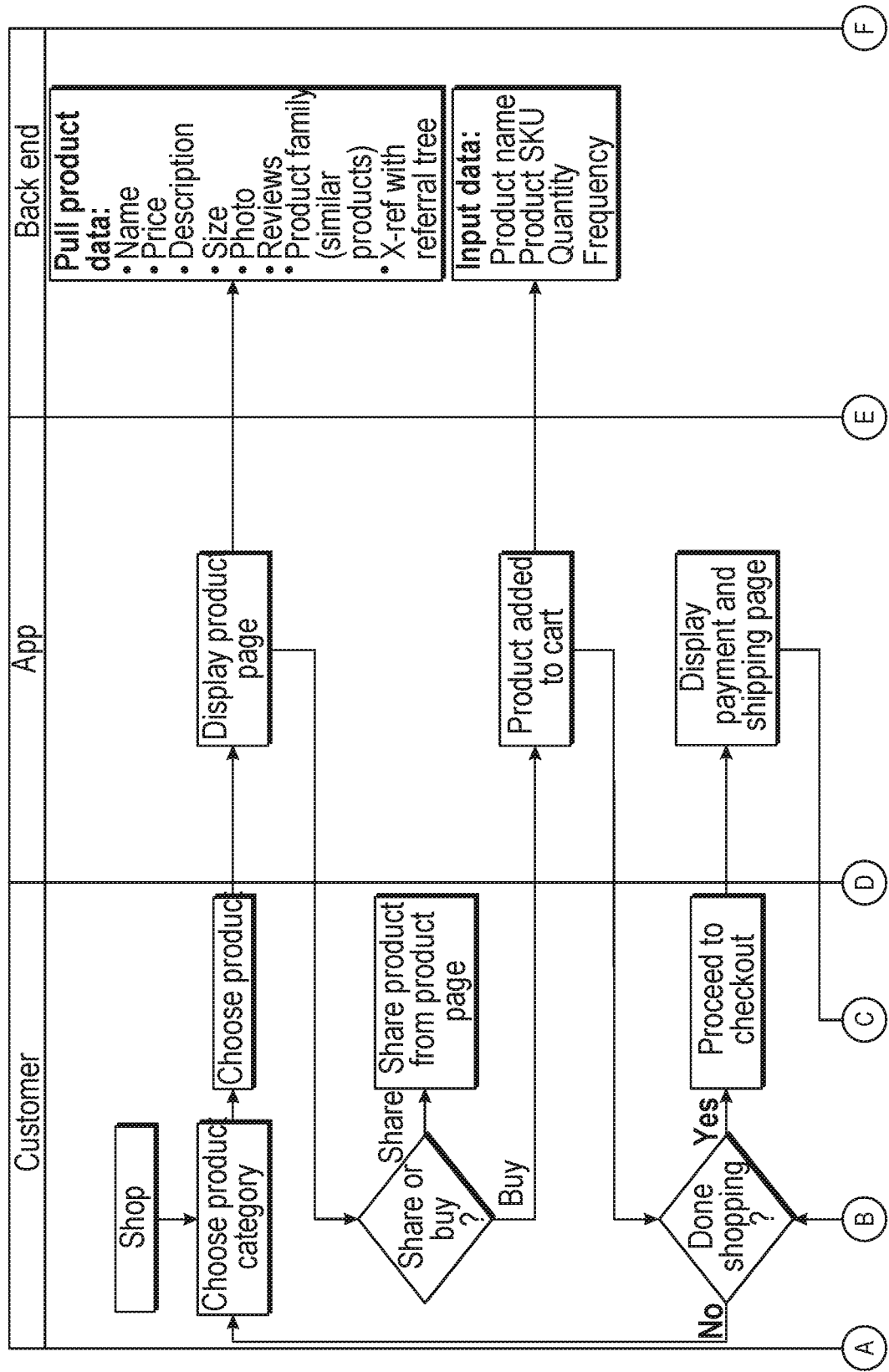
FIG. 31A is a flow diagram depicting various example aspects of the referral management system, according to various example embodiments.
Figure 31B:
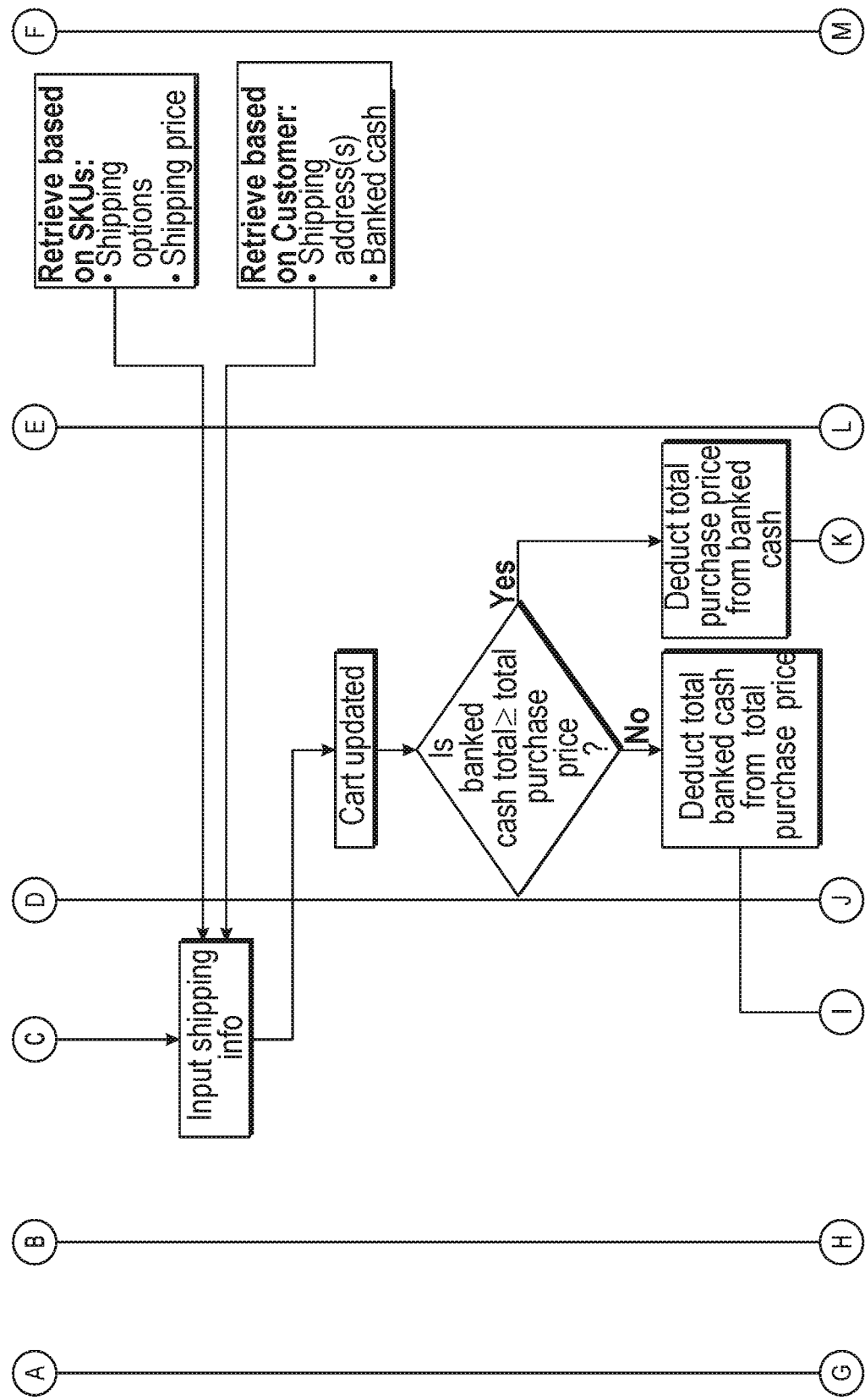
FIG. 31B is a flow diagram depicting various example aspects of the referral management system, according to various example embodiments.
Figure 31C:
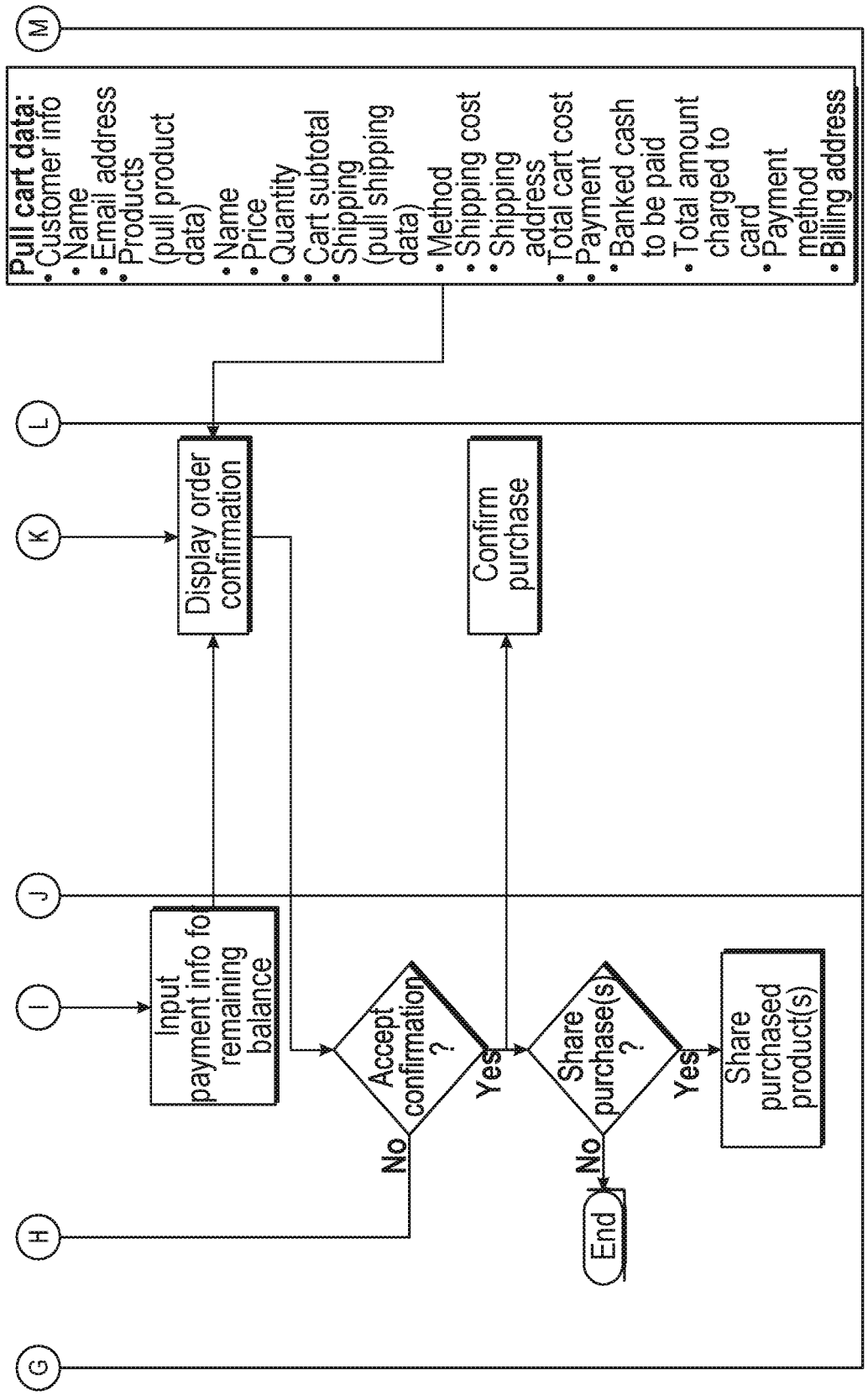
FIG. 31C is a flow diagram depicting various example aspects of the referral management system, according to various example embodiments.

FIGS. 31A, 31B, and 31C are a flow diagram depicting various example aspects of the referral management system 200, consistent with various embodiments described above. For example, the flow diagram of FIGS. 30A, 30B, and 30C illustrates various operations associated with a purchase order using the referral management system 200.

Figure 32A:
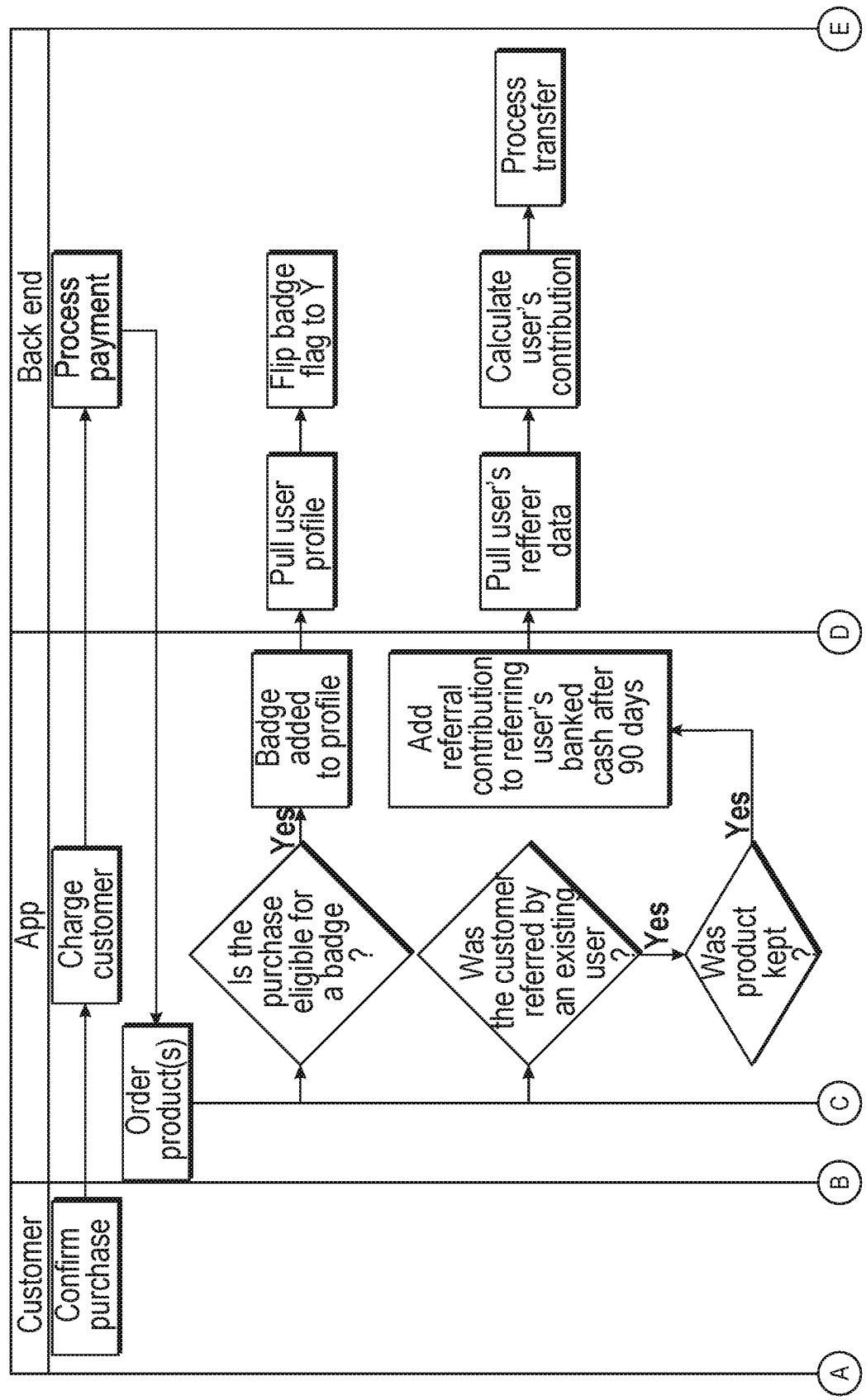
FIG. 32A is a flow diagram depicting various example aspects of the referral management system, according to various example embodiments.
Figure 32B:
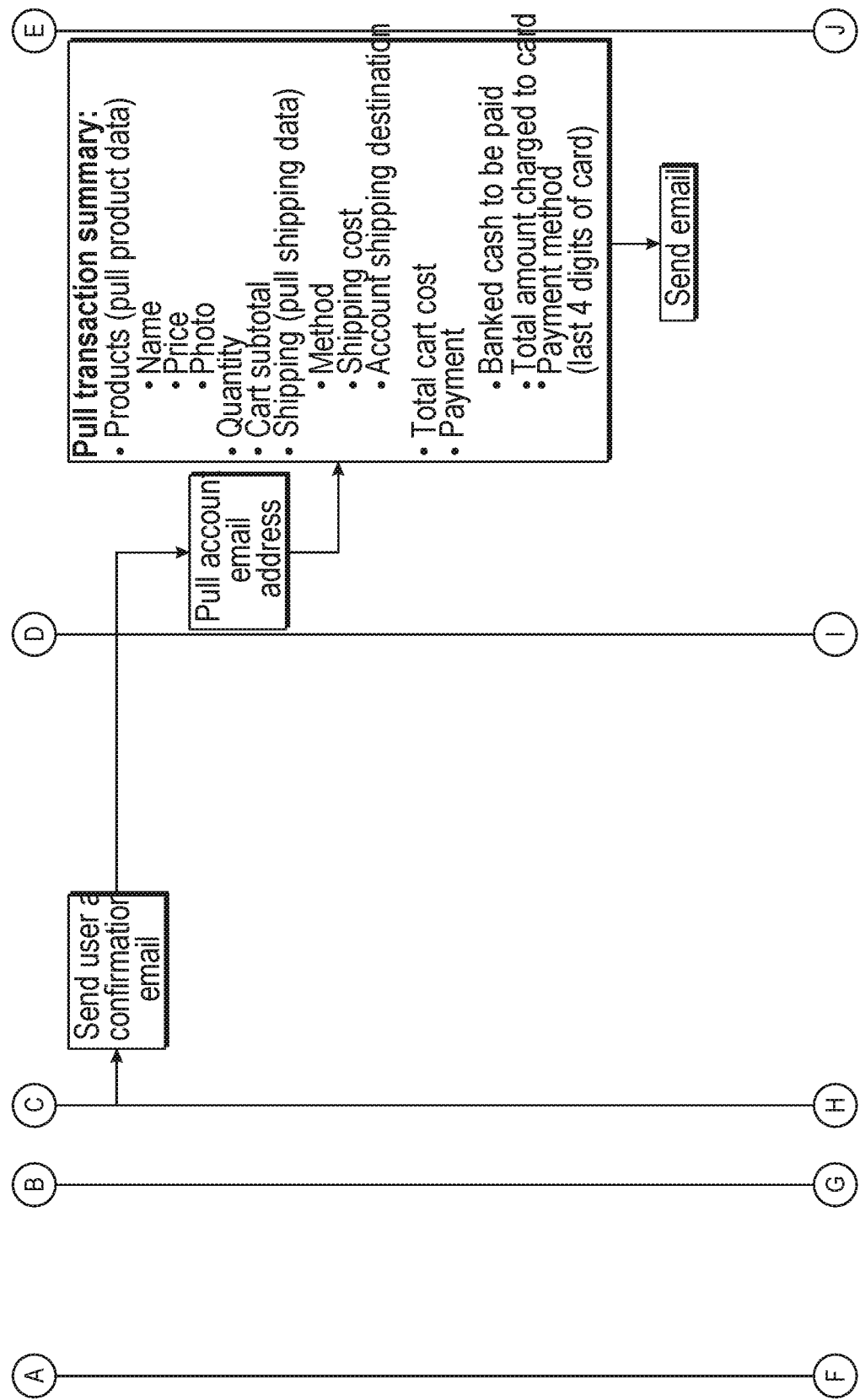
FIG. 32B is a flow diagram depicting various example aspects of the referral management system, according to various example embodiments.
Figure 32C:
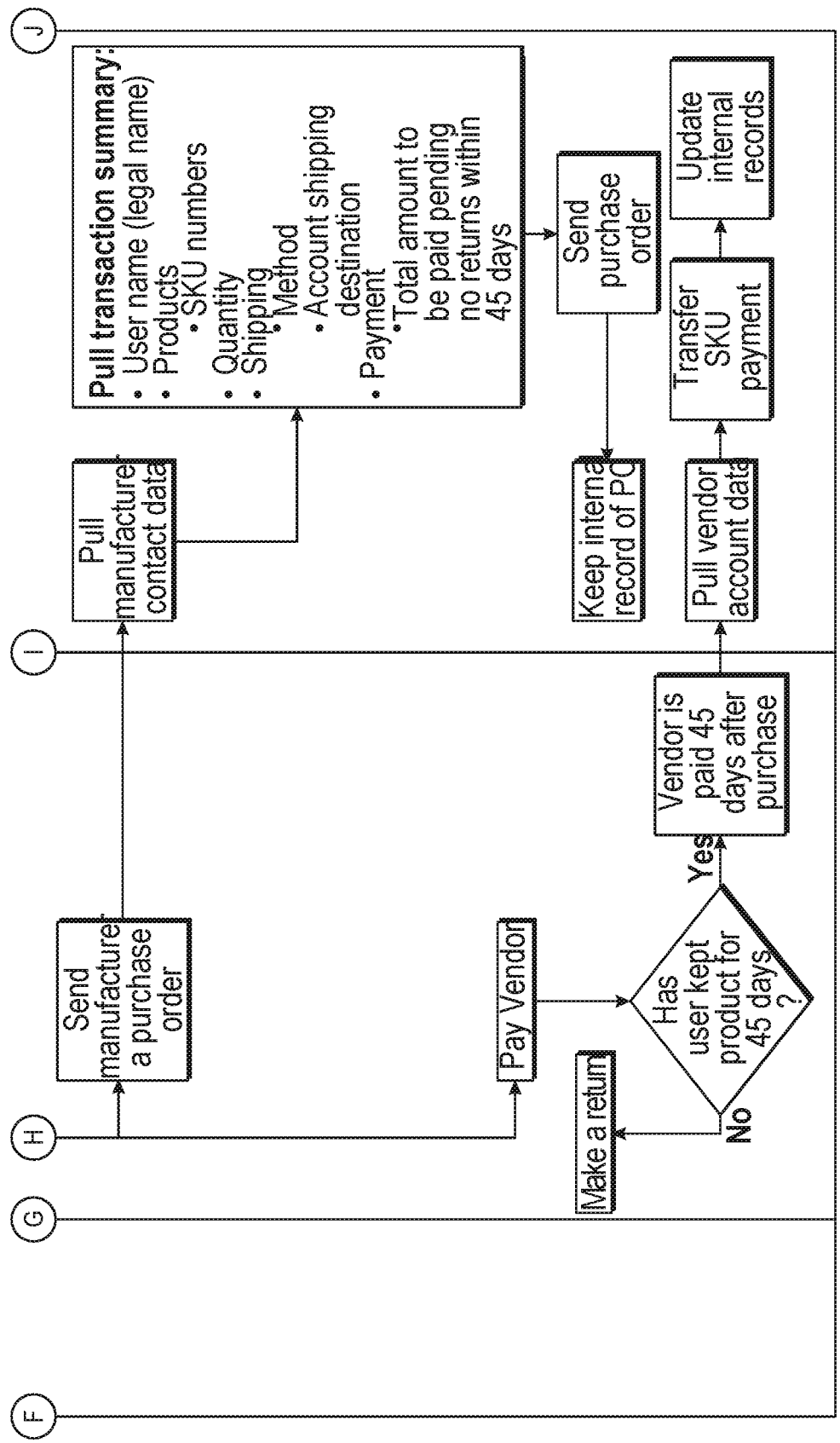
FIG. 32C is a flow diagram depicting various example aspects of the referral management system, according to various example embodiments.

FIGS. 32A, 32B, and 32C are a flow diagram depicting various example aspects of the referral management system 200, consistent with various embodiments described above. For example, the flow diagram of FIGS. 32A, 32B, and 32C illustrates various operations associated with a purchase order using the referral management system 200.

Figure 33A:
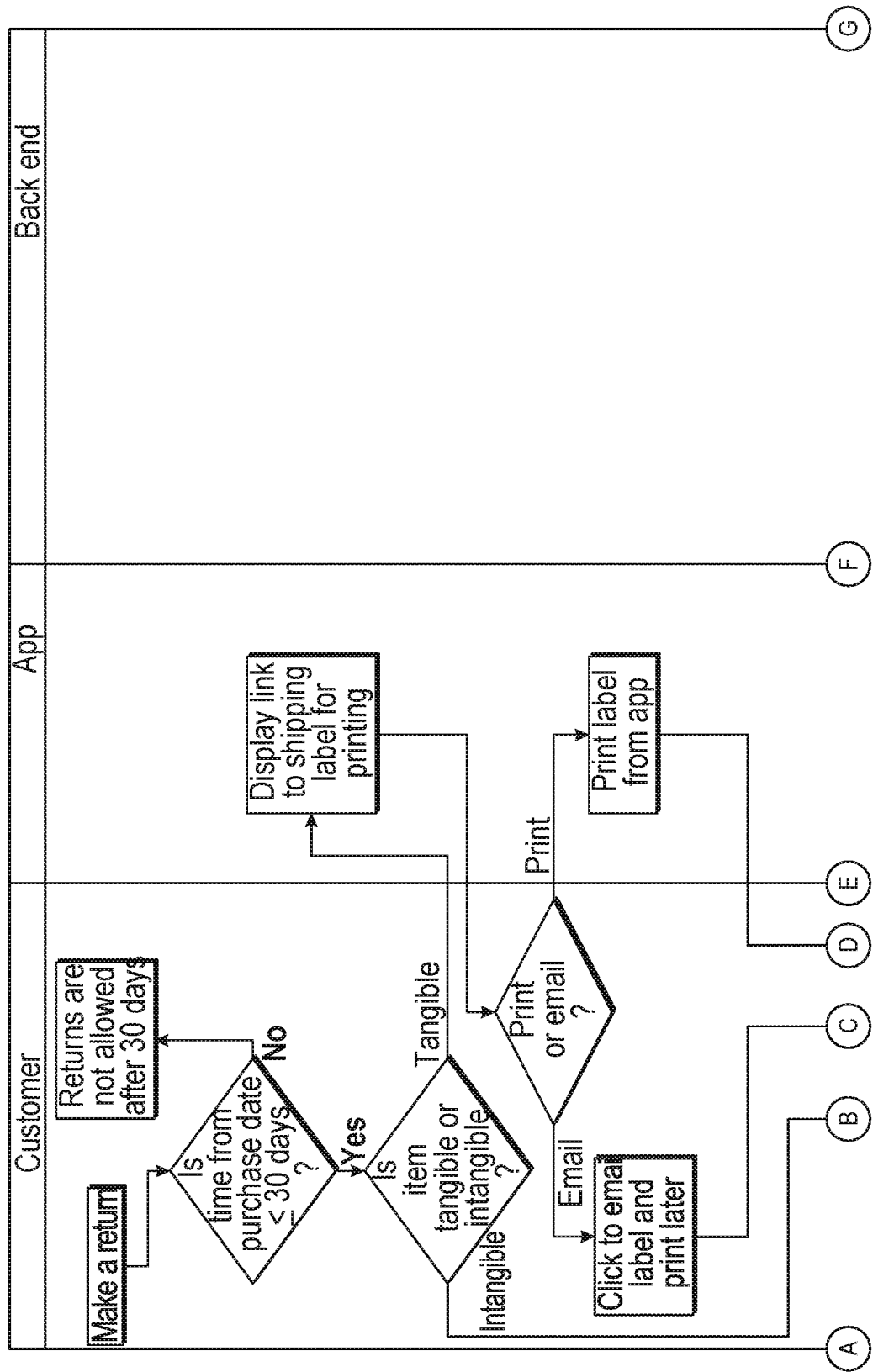
FIG. 33A is a flow diagram depicting various example aspects of the referral management system, according to various example embodiments.
Figure 33B:
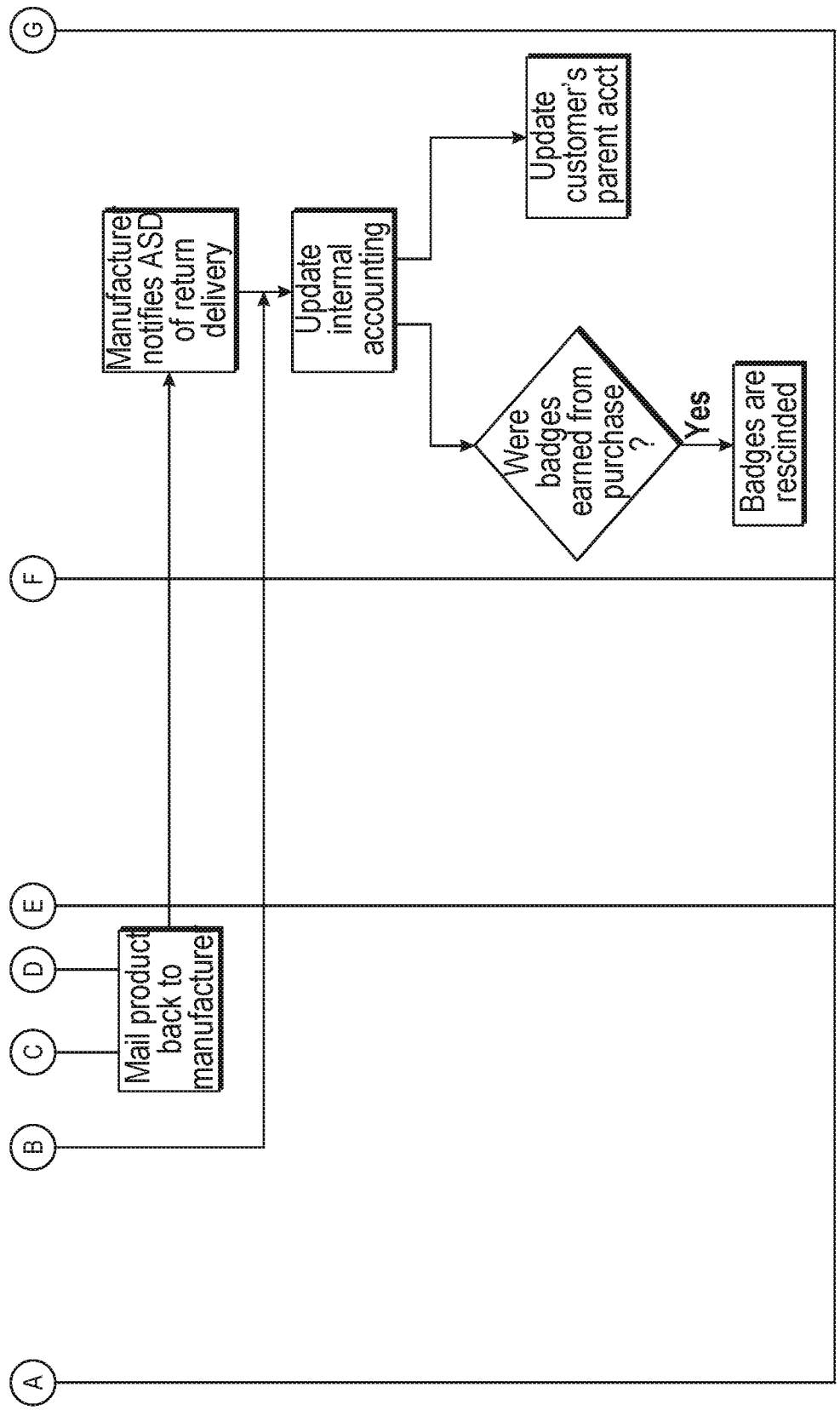
FIG. 33B is a flow diagram depicting various example aspects of the referral management system, according to various example embodiments.

FIGS. 33A and 33B are a flow diagram depicting various example aspects of the referral management system 200, consistent with various embodiments described above. For example, the flow diagram of FIGS. 33A and 33B illustrates various operations associated with a return of a purchase order using the referral management system 200.

Figure 34A:
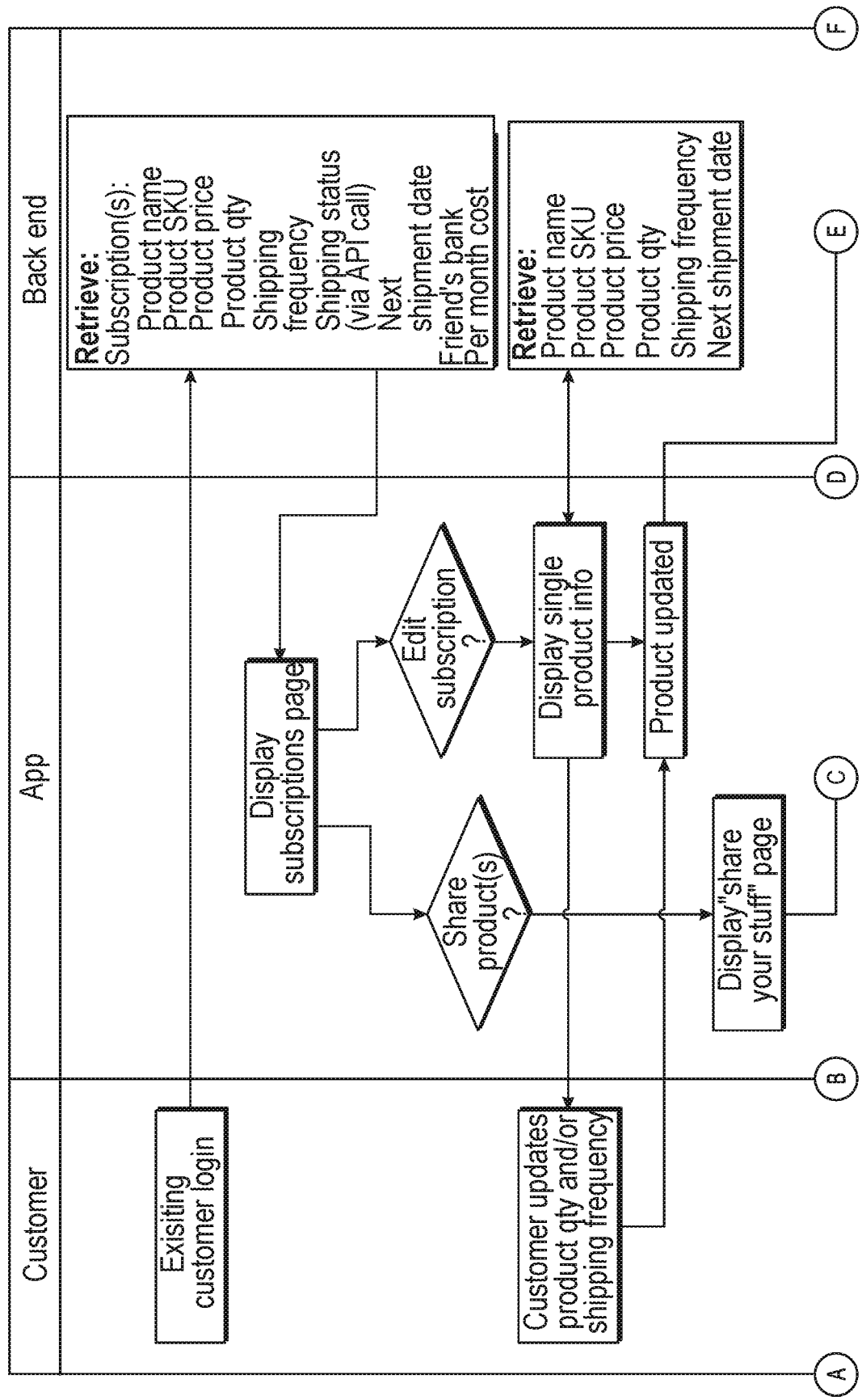
FIG. 34A is a flow diagram depicting various example aspects of the referral management system, according to various example embodiments.
Figure 34B:
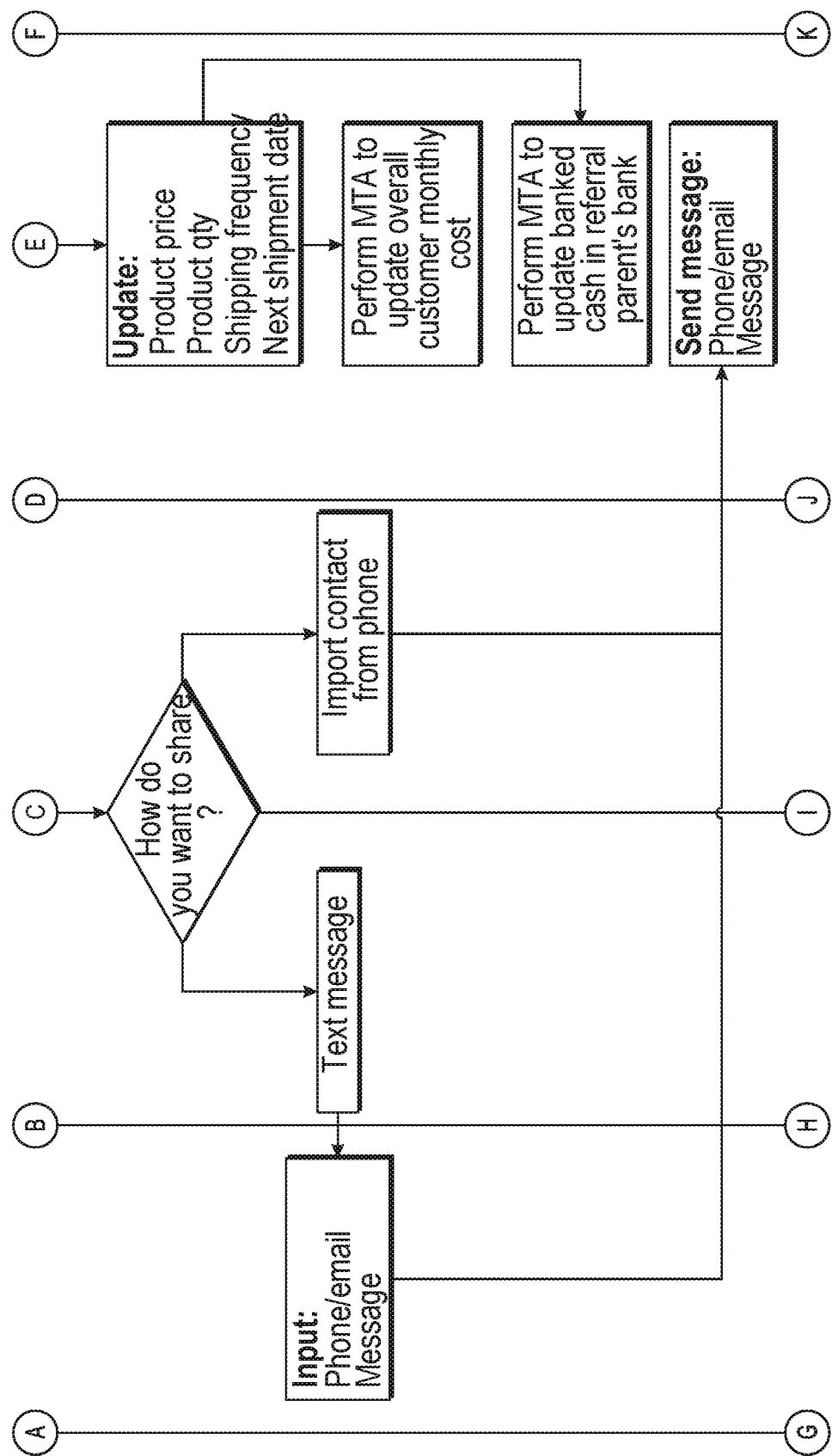
FIG. 34B is a flow diagram depicting various example aspects of the referral management system, according to various example embodiments.
Figure 34C:
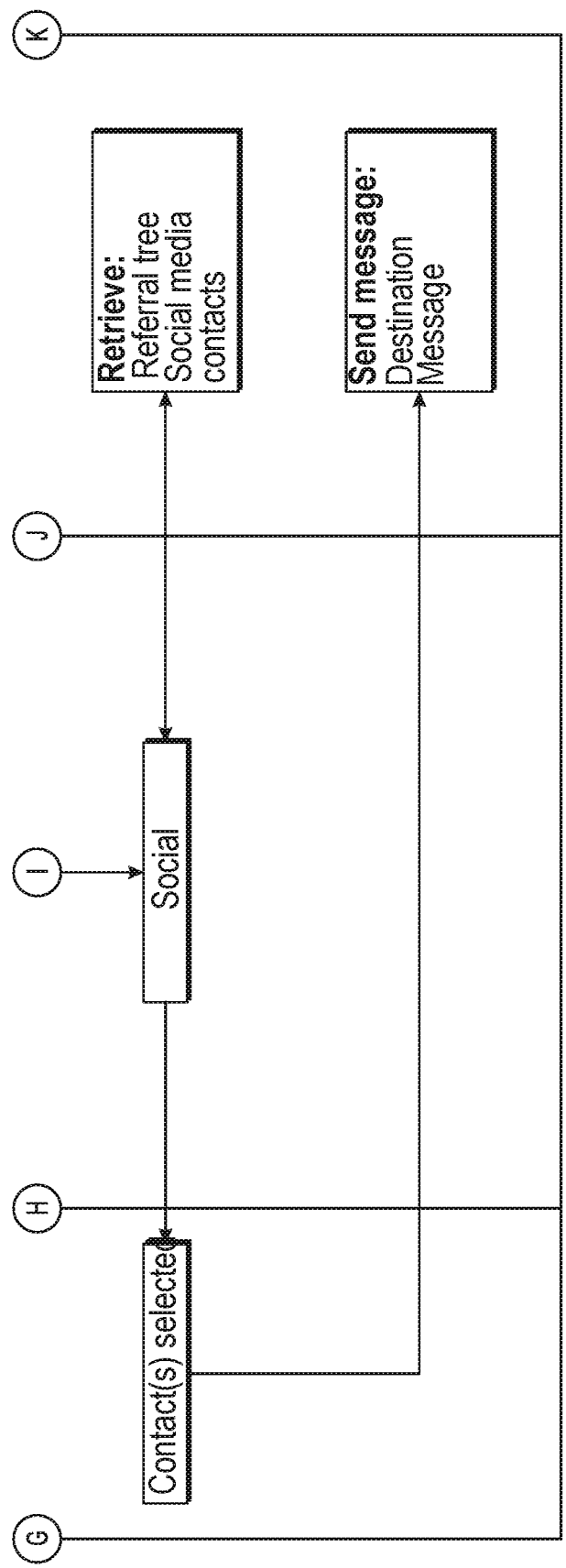
FIG. 34C is a flow diagram depicting various example aspects of the referral management system, according to various example embodiments.

FIGS. 34A, 34B, and 34C are a flow diagram depicting various example aspects of the referral management system 200, consistent with various embodiments described above. For example, the flow diagram of FIGS. 34A, 34B, and 34C illustrates various operations associated with sharing subscriptions using the referral management system 200.

Figure 35:
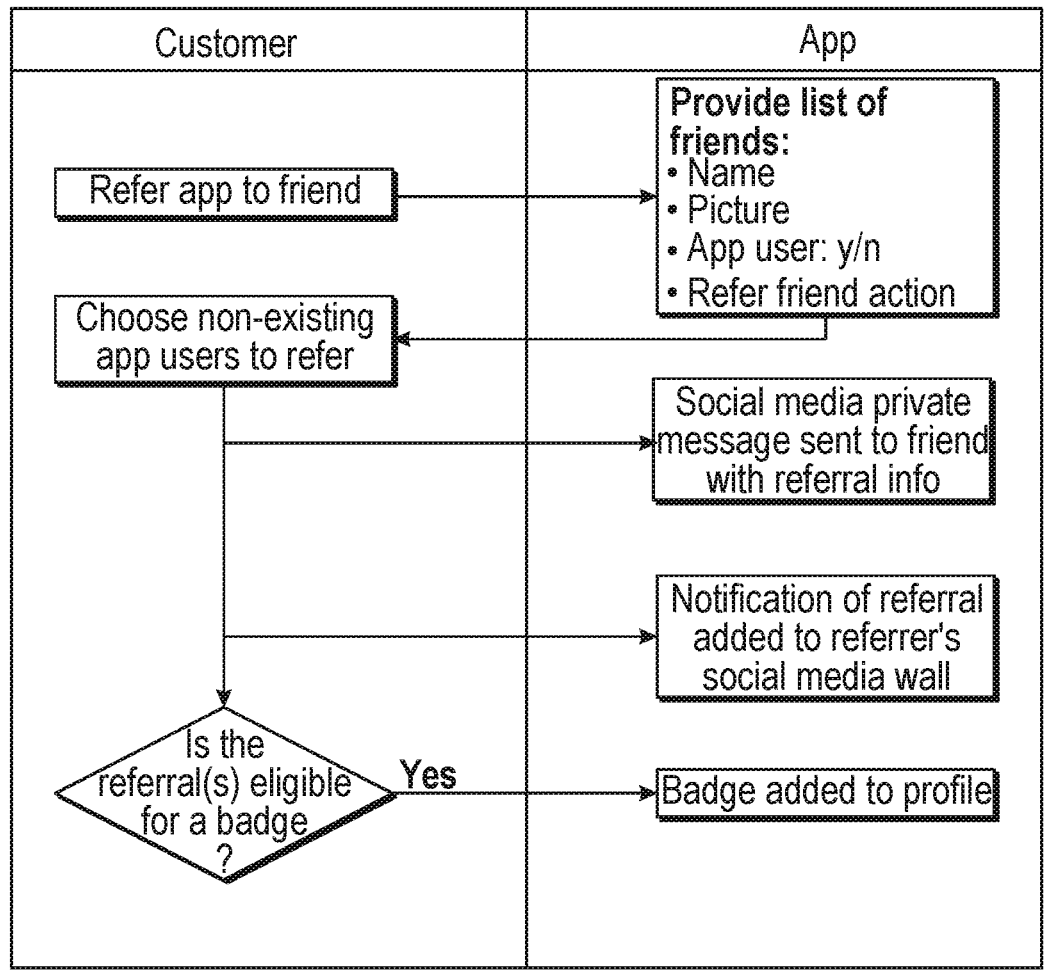
FIG. 35 is a flow diagram depicting various example aspects of the referral management system, according to various example embodiments.

FIG. 35 is a flow diagram depicting various example aspects of the referral management system 200, consistent with various embodiments described above. For example, the flow diagram of FIG. 35 illustrates various operations associated with sharing an app associated with the referral management system 200.

Figure 36:
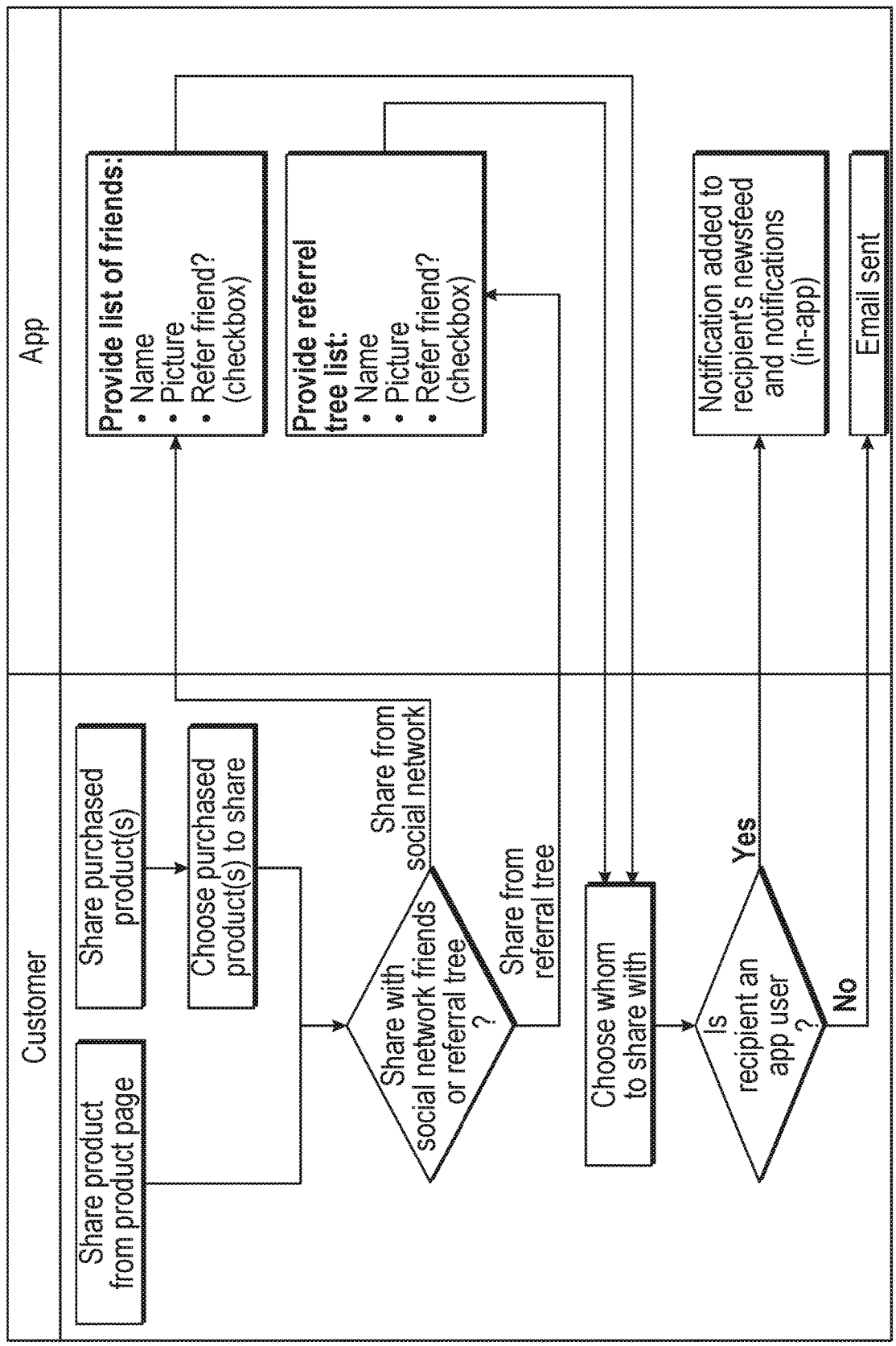
FIG. 36 is a flow diagram depicting various example aspects of the referral management system, according to various example embodiments.

FIG. 36 is a flow diagram depicting various example aspects of the referral management system 200, consistent with various embodiments described above. For example, the flow diagram of FIG. 36 illustrates various operations associated with sharing products and subscriptions associated with the referral management system 200.

Figure 37A:
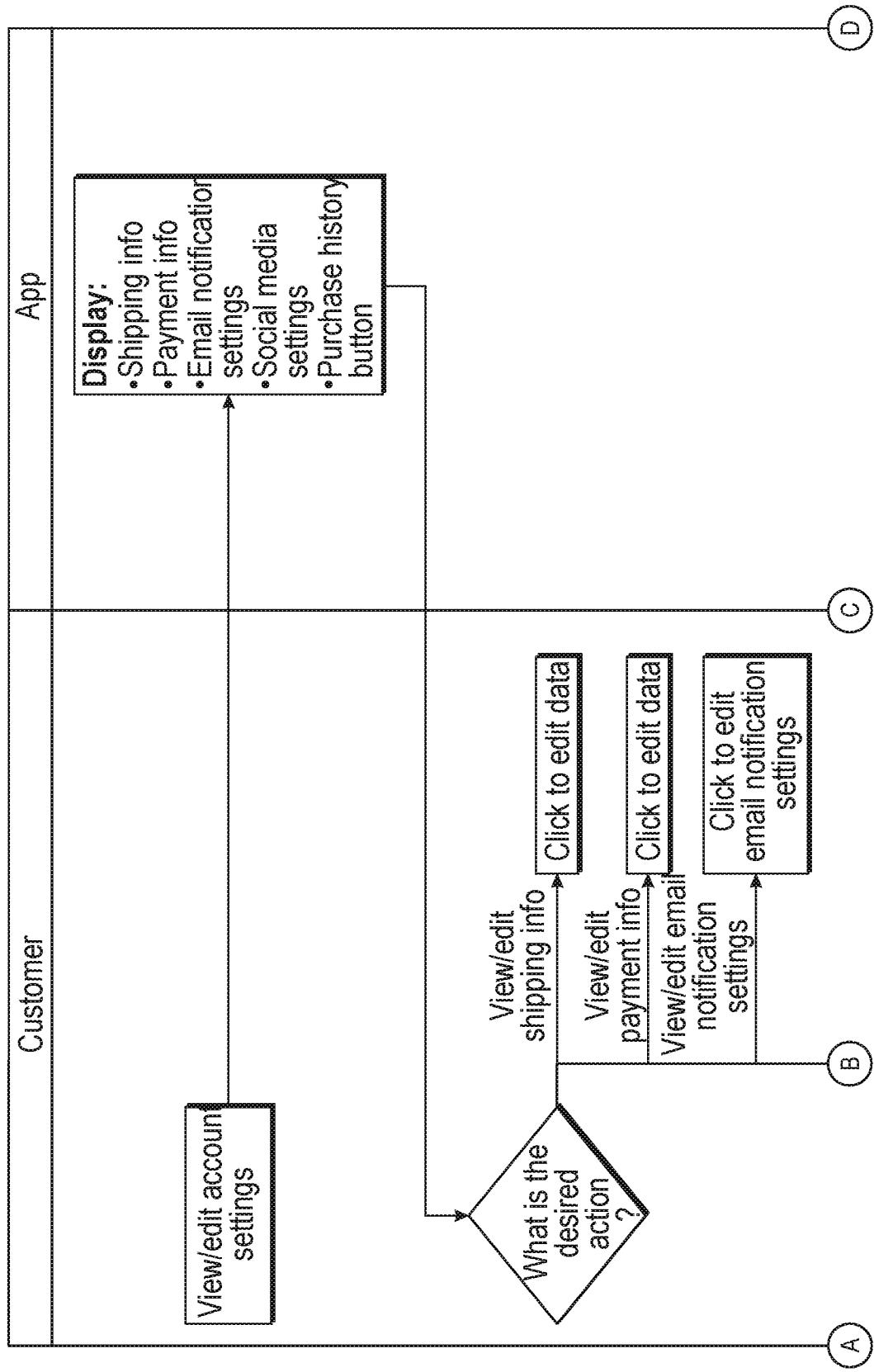
FIG. 37A is a flow diagram depicting various example aspects of the referral management system, according to various example embodiments.
Figure 37B:
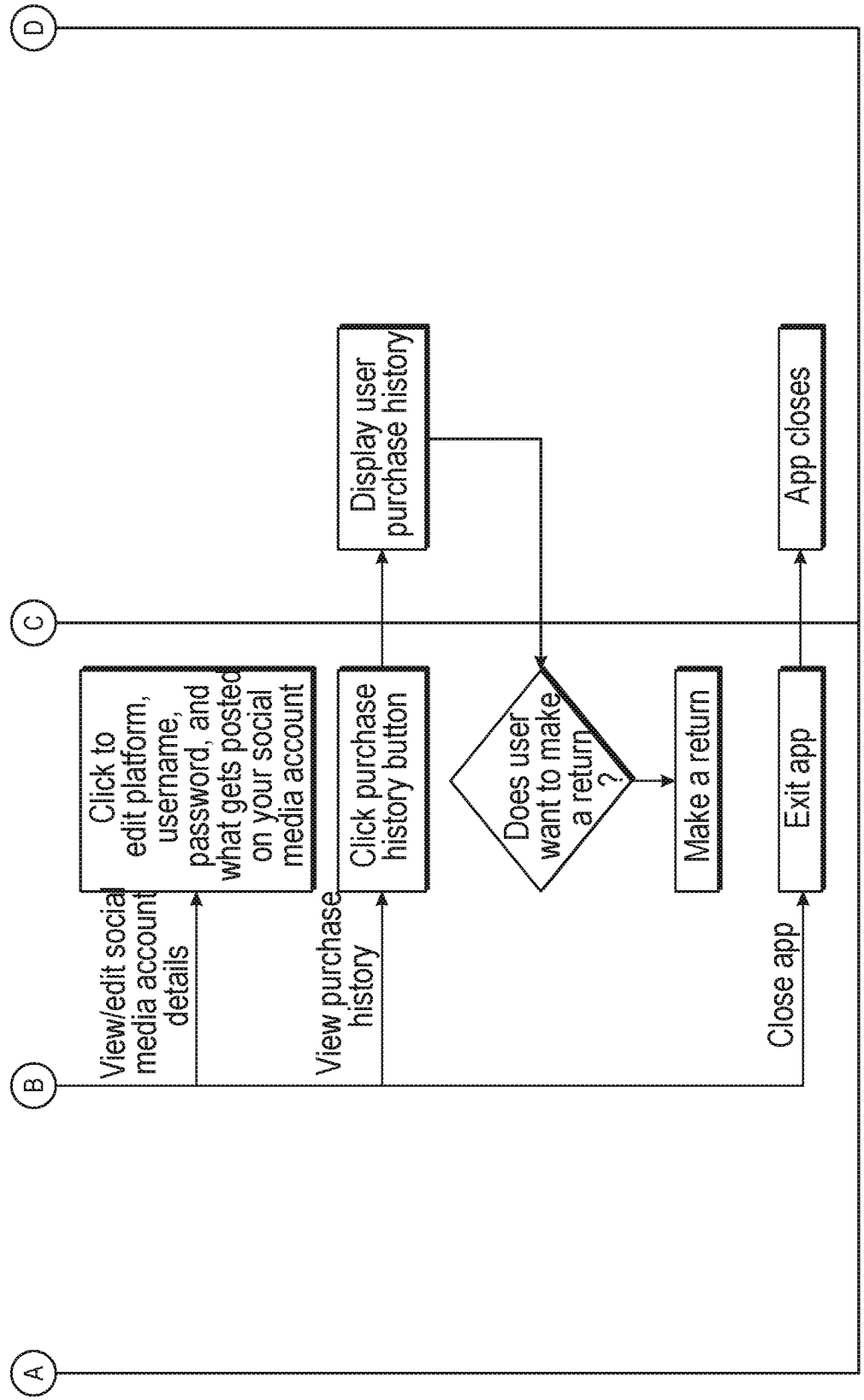
FIG. 37B is a flow diagram depicting various example aspects of the referral management system, according to various example embodiments.

FIGS. 37A and 37B are a flow diagram depicting various example aspects of the referral management system 200, consistent with various embodiments described above. For example, the flow diagram of FIGS. 37A and 37B illustrates various operations displaying and editing various data associated with the referral management system 200.

Figure 38:
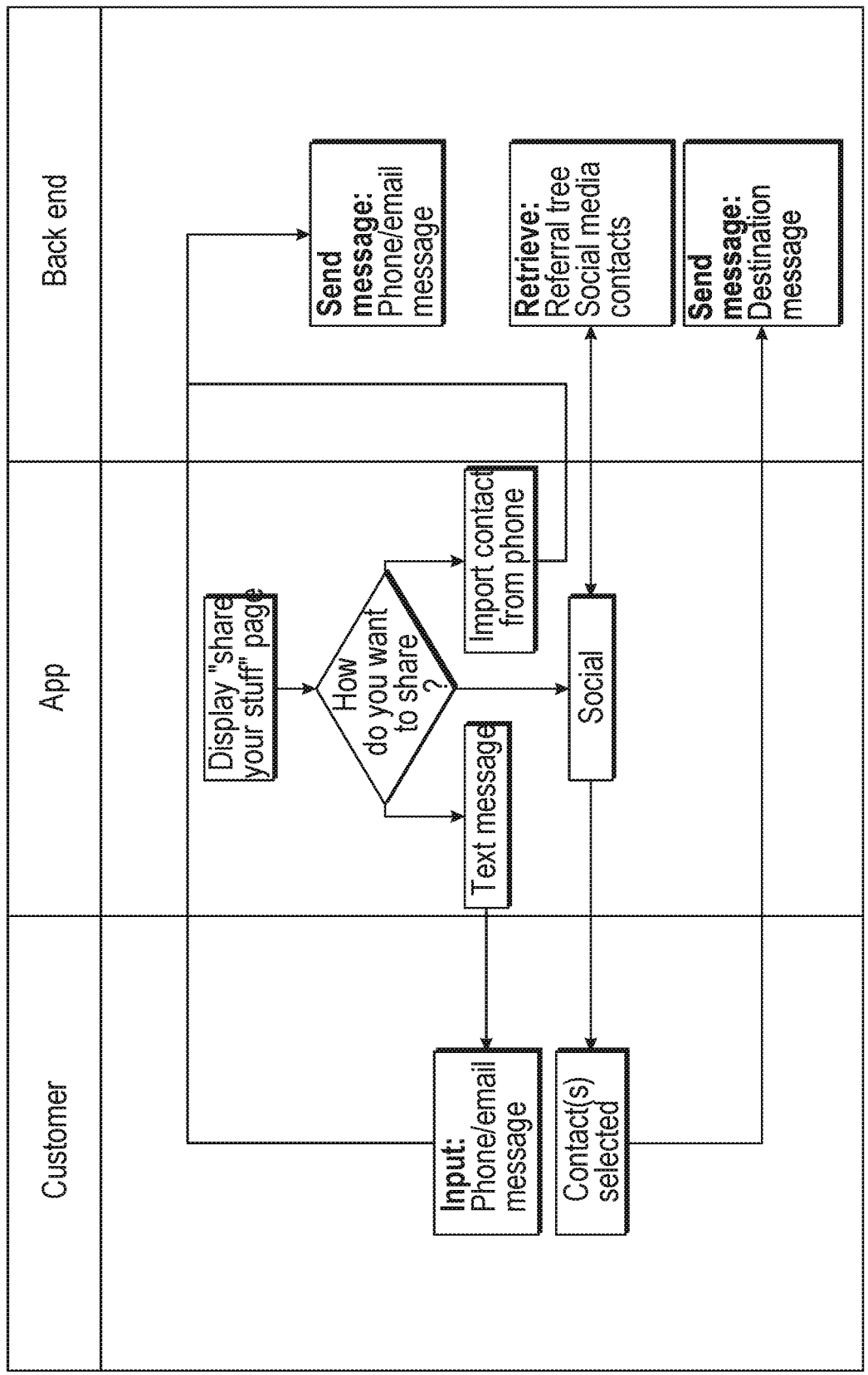
FIG. 38 is a flow diagram depicting various example aspects of the referral management system, according to various example embodiments.

FIG. 38 is a flow diagram depicting various example aspects of the referral management system 200, consistent with various embodiments described above. For example, the flow diagram of FIG. 38 illustrates various operations associated with messaging associated with the referral management system 200.

What is claimed is:

1. A method comprising:
   receiving, from a client device of a network site user, a referral request for a network service of a network site, the network site user having a user profile on a social network site;
   receiving, from the client device, a selection of multiple users of a social network site that are connected to the user profile on the social network site;
   transmitting, to the social network site, a social network site message to multiple users connected to the user profile on the social network site, the social network site message requesting the multiple users register with the network service through a social network site user interface associated with the network service of the network site;
   determining a ratio of a first quantity of the multiple users that were sent the social network site message to a second quantity of the multiple users that registered with the network service using the social network site user interface;
   determining that the referral request was submitted by a bot based on the ratio being lower than a pre-configured threshold; and
   in response to determining the referral request for the network service was submitted by the bot, banning, on the network site, a user account that submitted the referral request.

2. The method of claim 1, wherein the pre-configured threshold is a pre-configured numerical spam threshold.

3. The method of claim 2, further comprising:
   displaying, on the client device, a warning message indicating the pre-configured numerical spam threshold was not met.

4. The method of claim 1, further comprising:
   receiving, through the social network site user interface, a confirmation from one or more of the multiple users to register for the network service; and
   in response to receiving the confirmation, redirecting the one or more of the multiple users from the social network site to the network site.

5. The method of claim 4, further comprising:
   registering, on the network site, the one or more of the multiple users sent from the social network site for the network service of the network site.

6. The method of claim 5, wherein the second quantity is determined from an amount of users sent from the social network site, via the social network site message, that complete registration for the network service.

7. The method of claim 1, further comprising:
   retrieving, from an Application Programming Interface (API) of the social network site, the multiple users connected to the user profile on the social network site; and
   displaying, on the client device, a list user interface of the network site, the list user interface displaying a list of retrieved multiple users with selection elements.

8. The method of claim 7, wherein the selection is received on the list user interface of the network site.

9. The method of claim 7, further comprising:
   displaying a message creation user interface, wherein the social network site message is generated by client device on the message creation user interface.

10. The method of claim 9, wherein the social network site message generated on the message creation user interface is transmitted to the social network site to the multiple users through the API of the social network site.

11. The method of claim 10, where the social network site message is sent to message accounts of the multiple users on the social network site through the API.

12. A system comprising:
    a processor, and a memory including instructions, which when executed by the processor, cause the processor to perform operations comprising:
    receiving, from a client device of a network site user, a referral request for a network service of a network site, the network site user having a user profile on a social network site;
    receiving, from the client device, a selection of multiple users on the social network site that are connected to the user profile on the social network site;
    transmitting, to the social network site, a social network site message to the multiple users connected to the user profile on the social network site, the social network site message requesting the multiple users register with the network service through a social network site user interface associated with the network service of the network site;
    determining a ratio of a first quantity of the multiple users that were sent the social network site message to a second quantity of the multiple users that registered with the network service using the social network site user interface;
    determining that the referral request was submitted by a bot based on the ratio being lower than a pre-configured threshold; and in response to determining the referral request for the network service was submitted by the bot, banning, on the network site, a user account that submitted the referral request.

13. The system of claim 12, wherein the pre-configured threshold is a pre-configured numerical spam threshold.

14. The system of claim 12, the operations further comprising:
receiving, through the social network site user interface, a confirmation from one or more of the multiple users to register for the network service; and
in response to receiving the confirmation, redirecting the one or more of the multiple users from the social network site to the network site.

15. The system of claim 14, the operations further comprising:
registering, on the network site, the one or more of the multiple users sent from the social network site for the network service of the network site.

16. The system of claim 15, wherein the second quantity is determined from an amount of users sent from the social network site, via the social network site message, that complete registration for the network service.

17. The system of claim 12, the operations further comprising:
retrieving, from an Application Programming Interface (API) of the social network site, the multiple users connected to the user profile on the social network site; and
displaying, on the client device, a list user interface of the network site, the list user interface displaying a list of retrieved multiple users with selection elements.

18. The system of claim 17, wherein the selection is received on the list user interface of the network site.

19. The system of claim 17, the operations further comprising:
displaying a message creation user interface, wherein the social network site message is generated by client device on the message creation user interface.

20. A non-transitory machine-readable medium storing instructions that, when executed by at least one processor of a machine, cause the machine to perform operations comprising:
receiving, from a client device of a network site user, a referral request for a network service of a network site, the network site user having a user profile on a social network site;
receiving, from the client device, a selection of multiple users on the social network site that are connected to the user profile on the social network site;
transmitting, to the social network site, a social network site message to the multiple users connected to the user profile on the social network site, the social network site message requesting the multiple users register with the network service through a social network site user interface associated with the network service of the network site;
determining a ratio of a first quantity of the multiple users that were sent the social network site message to a second quantity of the multiple users that registered with the network service using the social network site user interface;
determining that the referral request was submitted by a bot based on the ratio being lower than a pre-configured threshold; and
in response to determining the referral request for the network service was submitted by the bot, banning, on the network site, a user account that submitted the referral request.

\* \* \* \* \*